US008540790B2

(12) United States Patent
Brown et al.

(10) Patent No.: US 8,540,790 B2
(45) Date of Patent: *Sep. 24, 2013

(54) FILTER ELEMENT

(75) Inventors: Gene W. Brown, Franklin, TN (US);
Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,349

(22) Filed: Apr. 25, 2012

(65) Prior Publication Data

US 2012/0205305 A1  Aug. 16, 2012

Related U.S. Application Data

(63) Continuation of application No. 11/939,662, filed on Nov. 14, 2007, now Pat. No. 8,277,531, and a continuation of application No. 10/979,876, filed on Nov. 2, 2004, now Pat. No. 7,318,851.

(51) Int. Cl.
*B01D 46/00* (2006.01)

(52) U.S. Cl.
USPC .............. 55/498; 55/502; 55/520; 55/521

(58) Field of Classification Search
USPC .......... 55/498, 502, 500, 511, 521, 493; 95/286, 287; 454/158
See application file for complete search history.

(56) References Cited

U.S. PATENT DOCUMENTS

| | | |
|---|---|---|
| 1,700,126 A | 1/1929 | Godloe |
| 1,943,080 A | 1/1934 | Langston |
| 1,947,066 A | 2/1934 | Sieg |
| 1,954,881 A | 4/1934 | List |
| 3,025,963 A | 3/1962 | Bauer |

(Continued)

FOREIGN PATENT DOCUMENTS

| | | |
|---|---|---|
| DE | 29 47 080 A1 | 5/1981 |
| EP | 0 630 672 A1 | 12/1994 |

(Continued)

OTHER PUBLICATIONS

List of Exhibits, *Brown et al.* v. *Schrage et al.*, dated Aug. 31, 2011, Patent Interference No. 105,799, United States Patent and Trademark Office, Board of Patent Appeals and Interferences.

(Continued)

*Primary Examiner* — Duane Smith
*Assistant Examiner* — Minh-Chau Pham
(74) *Attorney, Agent, or Firm* — Reinhart Boerner Van Deuren PC

(57) ABSTRACT

A filter element, and filter apparatus, include a filter pack, a seal member, and a seal support frame operatively connecting the seal member to the filter pack. The seal support frame includes an annular extension, which is preferably canted at an oblique angle to a longitudinal axis, for supporting the seal member. The seal support frame also preferably includes a first end thereof including the annular extension, and a second end thereof spaced from the first end thereof along the longitudinal axis, with the first and second ends of the seal support frame joined by a hub of the outer peripheral sidewall of the seal support frame to define a cavity within the seal support frame for receiving the filter pack. The first and second ends of the seal support frame, and the filter pack are preferably joined and sealed to one another by a single bead of adhesive.

20 Claims, 9 Drawing Sheets

(56) References Cited

U.S. PATENT DOCUMENTS

| | | | |
|---|---|---|---|
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,498,989 A | 2/1985 | Miyakawa et al. |
| 4,579,698 A | 4/1986 | Meyering et al. |
| 4,589,983 A | 5/1986 | Wydevan |
| 4,720,292 A | 1/1988 | Engel et al. |
| 4,747,944 A | 5/1988 | George |
| H556 H | 12/1988 | Tarko |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,472,379 A | 12/1995 | Andress et al. |
| 5,484,466 A | 1/1996 | Brown et al. |
| 5,543,007 A | 8/1996 | Takagaki et al. |
| 5,588,945 A | 12/1996 | Lauderbaugh |
| 5,609,711 A | 3/1997 | Miller |
| 5,720,790 A | 2/1998 | Kometani et al. |
| 5,755,843 A | 5/1998 | Sundquist |
| 5,772,883 A | 6/1998 | Rothman et al. |
| 5,792,242 A | 8/1998 | Haskett |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,022,305 A | 2/2000 | Choi et al. |
| 6,048,386 A | 4/2000 | Gillingham et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 | 12/2005 | Gillingham et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,090,712 B2 | 8/2006 | Gillingham et al. |
| 7,179,317 B2 | 2/2007 | Chung et al. |
| 7,211,124 B2 | 5/2007 | Gieseke et |
| 7,252,704 B2 | 8/2007 | Tokar et al. |
| 7,255,300 B2 | 8/2007 | Johnston |
| 7,270,692 B2 | 9/2007 | Gillingham et al. |
| 7,282,075 B2 | 10/2007 | Sporre et al. |
| 7,303,604 B2 | 12/2007 | Gieseke et al. |
| 7,316,723 B2 | 1/2008 | Chung et al. |
| 7,318,851 B2 * | 1/2008 | Brown et al. ............ 55/498 |
| 7,318,852 B2 | 1/2008 | Chung et al. |
| 7,323,029 B2 | 1/2008 | Engelland et al. |
| 7,329,326 B2 | 2/2008 | Wagner et al. |
| 7,338,544 B2 | 3/2008 | Sporre et al. |
| 7,341,613 B2 | 3/2008 | Kirsch |
| 7,351,270 B2 | 4/2008 | Engelland et al. |
| 7,393,375 B2 | 7/2008 | Xu et al. |
| 7,396,375 B2 | 7/2008 | Nepsund et al. |
| 7,396,376 B2 | 7/2008 | Schrage et al. |
| 7,674,308 B2 | 3/2010 | Krisko et al. |
| 7,695,539 B2 | 4/2010 | Waibel |
| 7,753,982 B2 | 7/2010 | Merritt |
| 7,931,724 B2 | 4/2011 | Schrage et al. |
| 7,931,725 B2 | 4/2011 | Wydeven et al. |
| 2002/0100262 A1 | 8/2002 | Gieseke et al. |
| 2002/0184864 A1 | 12/2002 | Bishop et al. |
| 2002/0185008 A1 | 12/2002 | Anderson et al. |
| 2003/0089654 A1 | 5/2003 | Jainek |
| 2003/0121845 A1 | 7/2003 | Wagner et al. |
| 2003/0146149 A1 | 8/2003 | Binder et al. |
| 2003/0182909 A1 | 10/2003 | Gieseke et al. |
| 2003/0217534 A1 | 11/2003 | Krisko et al. |
| 2003/0226800 A1 | 12/2003 | Brown et al. |
| 2004/0071940 A1 | 4/2004 | Frey |
| 2004/0118771 A1 | 6/2004 | Schukar et al. |
| 2004/0221555 A1 | 11/2004 | Engelland et al. |
| 2005/0029184 A1 | 2/2005 | Desmarais |
| 2005/0166561 A1 | 8/2005 | Schrage et al. |
| 2005/0229561 A1 | 10/2005 | Nepsund et al. |
| 2005/0252182 A1 | 11/2005 | Golden et al. |
| 2006/0090431 A1 | 5/2006 | Brown |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0137316 A1 | 6/2006 | Krull et al. |
| 2006/0151655 A1 | 7/2006 | Johnston |
| 2006/0163150 A1 | 7/2006 | Golden et al. |
| 2007/0039296 A1 | 2/2007 | Schrage et al. |
| 2007/0175194 A1 | 8/2007 | Nepsund et al. |
| 2007/0186528 A1 | 8/2007 | Wydeven et al. |
| 2007/0193236 A1 | 8/2007 | Merritt |
| 2007/0199285 A1 | 8/2007 | Gieseke et al. |
| 2007/0234903 A1 | 10/2007 | Xu et al. |
| 2007/0261374 A1 | 11/2007 | Nelson et al. |
| 2007/0289265 A1 | 12/2007 | Coulonvaux et al. |
| 2008/0010959 A1 | 1/2008 | Gillingham et al. |
| 2008/0016832 A1 | 1/2008 | Krisko et al. |
| 2008/0022641 A1 | 1/2008 | Engelland et al. |
| 2008/0060329 A1 * | 3/2008 | Brown et al. ............ 55/498 |

| | | | |
|---|---|---|---|
| 2008/0066434 | A1 | 3/2008 | Kuempel et al. |
| 2008/0086990 | A1 | 4/2008 | Kuempel et al. |
| 2008/0110142 | A1 | 5/2008 | Nelson et al. |
| 2008/0110822 | A1 | 5/2008 | Chung et al. |
| 2008/0115470 | A1 | 5/2008 | Kuempel et al. |
| 2008/0115758 | A1 | 5/2008 | Engelland et al. |
| 2008/0135471 | A1 | 6/2008 | Merritt et al. |
| 2008/0209874 | A1 | 9/2008 | Gieseke et al. |
| 2008/0216654 | A1 | 9/2008 | Wagner et al. |
| 2008/0250763 | A1 | 10/2008 | Widerski et al. |
| 2008/0250766 | A1 | 10/2008 | Schrage et al. |
| 2008/0264020 | A1 | 10/2008 | Schrage et al. |
| 2009/0114590 | A1 | 5/2009 | Merritt et al. |
| 2009/0241494 | A1 | 10/2009 | Schrage et al. |
| 2009/0255227 | A1 | 10/2009 | Schrage et al. |
| 2009/0266041 | A1 | 10/2009 | Schrage et al. |
| 2009/0301045 | A1 | 12/2009 | Nelson et al. |
| 2009/0320423 | A1 | 12/2009 | Merritt et al. |
| 2009/0320424 | A1 | 12/2009 | Merritt et al. |
| 2010/0000934 | A1 | 1/2010 | Brown |
| 2010/0011725 | A1 | 1/2010 | Babb |
| 2010/0044297 | A1 | 2/2010 | Krogue et al. |
| 2010/0115897 | A1 | 5/2010 | Krisko et al. |
| 2010/0242425 | A1 | 9/2010 | Swanson et al. |
| 2011/0197556 | A1 | 8/2011 | Brown et al. |
| 2012/0000170 | A1 | 1/2012 | Brown et al. |

FOREIGN PATENT DOCUMENTS

| | | |
|---|---|---|
| GB | 1 579 883 | 11/1980 |
| GB | 2 103 106 A | 2/1983 |
| JP | S60-112320 | 7/1985 |
| JP | S60-124622 | 8/1985 |
| JP | 63-122617 | 6/1988 |
| JP | 2-31131 | 8/1990 |
| WO | WO 03/047722 A2 | 6/2003 |
| WO | WO 2005/058461 A1 | 6/2005 |
| WO | WO 2005/077487 A1 | 8/2005 |
| WO | WO 2005/082484 A1 | 9/2005 |
| WO | WO 2005/123222 A1 | 12/2005 |
| WO | WO 2006/014941 A2 | 2/2006 |
| WO | WO 2006/017790 A2 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/087233 A3 | 8/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |

OTHER PUBLICATIONS

Brown 37 C.F.R. 41.106(f) Certificate of Service of Exhibits, *Brown et al.* v. *Schrage et al.*, dated Aug. 31, 2011, Patent Interference No. 105,799, United States Patent and Trademark Office, Board of Patent Appeals and Interferences.

Brown Notice Advising Schrage of Brown's Filing of a Priority Statement, *Brown et al.* v. *Schrage et al.*, dated Aug. 31, 2011, Patent Interference No. 105,799, United States Patent and Trademark Office, Board of Patent Appeals and Interferences.

Brown Motion 3-Indefiniteness, 112, Second, *Brown et al.* v. *Schrage et al.*, dated Aug. 31, 2011, Patent Interference No. 105,799, United States Patent and Trademark Office, Board of Patent Appeals and Interferences.

Brown Motion 4 Based Upon Prior Art, *Brown et al.* v. *Schrage et al.*, dated Aug. 31, 2011, Patent Interference No. 105,799, United States Patent and Trademark Office, Board of Patent Appeals and Interferences.

Brown Motion 5-Denial of Benefit, *Brown et al.* v. *Schrage et al.*, dated Aug. 31, 2011, Patent Interference No. 105,799, United States Patent and Trademark Office, Board of Patent Appeals and Interferences.

Brown Motion 6-Designate Claims, *Brown et al.* v. *Schrage et al.*, dated Aug. 31, 2011, Patent Interference No. 105,799, United States Patent and Trademark Office, Board of Patent Appeals and Interferences.

List of Exhibits as of Aug. 31, 2011, *Brown et al.* v. *Schrage et al.*, dated Aug. 31, 2011, Patent Interference No. 105,799, United States Patent and Trademark Office, Board of Patent Appeals and Interferences.

Schrage Notice of Filing Priority Statement, *Brown et al.* v. *Schrage et al.*, dated Aug. 31, 2011, Patent Interference No. 105,799, United States Patent and Trademark Office, Board of Patent Appeals and Interferences.

Schrage Substantive Motion 1, *Brown et al.* v. *Schrage et al.*, dated Aug. 31, 2011, Patent Interference No. 105,799, United States Patent and Trademark Office, Board of Patent Appeals and Interferences.

Schrage Objections to Brown's Evidence Served Aug. 31, 2011, *Brown et a.* v. *Schrage et al.*, dated Sep. 7, 2011, Patent Interference No. 105,799, United States Patent and Trademark Office, Board of Patent Appeals and Interferences.

Brown Updated SO 8.2 Notice of Related Proceedings, *Brown et al.* v. *Schrage et al.*, dated Sep. 14, 2011, Patent Interference No. 105,799, United States Patent and Trademark Office, Board of Patent Appeals and Interferences.

Brown Notice of Service of Supplemental Evidence, *Brown et al.* v. *Schrage et al.*, dated Sep. 19, 2011, Patent Interference No. 105,799, United States Patent and Trademark Office, Board of Patent Appeals and Interferences.

Brown Substitute Motion 2-Lack of Written Description, *Brown et al.* v. *Schrage et al.*, dated Oct. 6, 2011, Patent Interference No. 105,799, United States Patent and Trademark Office, Board of Patent Appeals and Interferences.

Order Expunge Unauthorized Paper BdR 7(a), *Brown et al.* v. *Schrage et al.*, dated Oct. 7, 2011, Patent Interference No. 105,799, United States Patent and Trademark Office, Board of Patent Appeals and Interferences.

Brown Request for Rehearing of Order Paper 117 Expunging Brown 2 Substitute Motion 2-Lack of Written Description Paper 116, *Brown et al.* v. *Schrage et al.*, dated Oct. 7, 2011, Patent Interference No. 105,799, United States Patent and Trademark Office, Board of Patent Appeals and Interferences.

Decision on Request for Rehearing BdR 125(c), *Brown et al.* v. *Schrage et al.*, dated Oct. 11, 2011, Patent Interference No. 105,799, United States Patent and Trademark Office, Board of Patent Appeals and Interferences.

Schrage Notice of Change in Schedule, *Brown et al.* v. *Schrage et al.*, dated Oct. 19, 2011, Patent Interference No. 105,799, United States Patent and Trademark Office, Board of Patent Appeals and Interferences.

Brown 37 C.F.R. 41.8(a)(2) Notice Oct. 22, 2011, *Brown et al.* v. *Schrage et al.*, dated Oct. 22, 2011, Patent Interference No. 105,799, United States Patent and Trademark Office, Board of Patent Appeals and Interferences.

Brown 37 C.F.R. 41.8(a)(2) Notice Oct. 22, 2011b, *Brown et al.* v. *Schrage et al.*, dated Oct. 22, 2011, Patent Interference No. 105,799, United States Patent and Trademark Office, Board of Patent Appeals and Interferences.

Schrage Notice of Deposition of Steve Merritt, *Brown et al.* v. *Schrage et al.*, dated Oct. 25, 2011, Patent Interference No. 105,799, United States Patent and Trademark Office, Board of Patent Appeals and Interferences.

Brown Motion 7-Miscellaneous, for 30 Additional Pages, *Brown et al.* v. *Schrage et al.*, dated Nov. 1, 2011, Patent Interference No. 105,799, United States Patent and Trademark Office, Board of Patent Appeals and Interferences.

Order Miscellaneous BdR 104(a), *Brown et al.* v. *Schrage et al.*, dated Nov. 2, 2011, Patent Interference No. 105,799, United States Patent and Trademark Office, Board of Patent Appeals and Interferences.

Brown Opposition 1, *Brown et al.* v. *Schrage et al.*, dated Nov. 15, 2011, Patent Interference No. 105,799, United States Patent and Trademark Office, Board of Patent Appeals and Interferences.

Brown 37 C.F.R. 41.106(f) Certificate of Service of Exhibits, *Brown et al.* v. *Schrage et al.*, dated Nov. 15, 2011, Patent Interference No. 105,799, United States Patent and Trademark Office, Board of Patent Appeals and Interferences.

Schrage Opposition 6, *Brown et al.* v. *Schrage et al.*, dated Nov. 15, 2011, Patent Interference No. 105,799, United States Patent and Trademark Office, Board of Patent Appeals and Interferences.

Schrage Exhibit List as of Nov. 15, 2011, *Brown et al.* v. *Schrage et al.*, dated Nov. 15, 2011, Patent Interference No. 105,799, United States Patent and Trademark Office, Board of Patent Appeals and Interferences.

Schrage Opposition 2, *Brown et al.* v. *Schrage et al.*, dated Nov. 15, 2011, Patent Interference No. 105,799, United States Patent and Trademark Office, Board of Patent Appeals and Interferences.

Schrage Opposition 3, *Brown et al.* v. *Schrage et al.*, dated Nov. 15, 2011, Patent Interference No. 105,799, United States Patent and Trademark Office, Board of Patent Appeals and Interferences.

Schrage Opposition 4, *Brown et al.* v. *Schrage et al.*, dated Nov. 15, 2011, Patent Interference No. 105,799, United States Patent and Trademark Office, Board of Patent Appeals and Interferences.

Schrage Opposition 5, *Brown et al.* v. *Schrage et al.*, dated Nov. 15, 2011, Patent Interference No. 105,799, United States Patent and Trademark Office, Board of Patent Appeals and Interferences.

Schrage Notice of Deposition of Steve Merritt, *Brown et al.* v. *Schrage et al.*, dated Interference No. 105,799, United States Patent and Trademark Office, Board of Patent Appeals and Interferences.

Order Miscellaneous BdR 104(a), *Brown et al.* v. *Schrage et al.*, dated Nov. 21, 2011, Patent Interference No. 105,799, United States Patent and Trademark Office, Board of Patent Appeals and Interferences.

Schrage Objections to Brown's Evidence Served Nov. 15, 2011, *Brown et al.* v. *Schrage et al.*, dated Nov. 22, 2011, Patent Interference No. 105,799, United States Patent and Trademark Office, Board of Patent Appeals and Interferences.

Brown Reply 2, *Brown et al.* v. *Schrage et al.*, dated Nov. 29, 2011, Patent Interference No. 105,799, United States Patent and Trademark Office, Board of Patent Appeals and Interferences.

Brown Reply 3, *Brown et al.* v. *Schrage et al.*, dated Nov. 29, 2011, Patent Interference No. 105,799, United States Patent and Trademark Office, Board of Patent Appeals and Interferences.

Brown Reply 4, *Brown et al.* v. *Schrage et al.*, dated Nov. 29, 2011, Patent Interference No. 105,799, United States Patent and Trademark Office, Board of Patent Appeals and Interferences.

Brown Reply 5, *Brown et al.* v. *Schrage et al.*, dated Nov. 29, 2011, Patent Interference No. 105,799, United States Patent and Trademark Office, Board of Patent Appeals and Interferences.

Brown Reply 6, *Brown et al.* v. *Schrage et al.*, dated Nov. 29, 2011, Patent Interference No. 105,799, United States Patent and Trademark Office, Board of Patent Appeals and Interferences.

Schrage Exhibit List as of Nov. 29, 2011, *Brown et al.* v. *Schrage et al.*, dated Nov. 29, 2011, Patent Interference No. 105,799, United States Patent and Trademark Office, Board of Patent Appeals and Interferences.

Schrage Reply 1, *Brown et al.* v. *Schrage et al.*, dated Nov. 29, 2011, Patent Interference No. 105,799, United States Patent and Trademark Office, Board of Patent Appeals and Interferences.

Brown 37 C.F.R. 41.106(f) Certificate of Service of Exhibits Nov. 29, 2011, *Brown et al.* v. *Schrage et al.*, dated Nov. 30, 2011, Patent Interference No. 105,799, United States Patent and Trademark Office, Board of Patent Appeals and Interferences.

Brown Notice of Service of Supplemental Evidence Dec. 1, 2011, *Brown et al.* v. *Schrage et al.*, dated Dec. 1, 2011, Patent Interference No. 105,799, United States Patent and Trademark Office, Board of Patent Appeals and Interferences.

Brown Request for Oral Hearing, *Brown et al.* v. *Schrage et al.*, dated Dec. 1, 2011, Patent Interference No. 105,799, United States Patent and Trademark Office, Board of Patent Appeals and Interferences.

Schrage Notice of Change in Schedule, *Brown et al.* v. *Schrage et al.*, dated Dec. 6, 2011, Patent Interference No. 105,799, United States Patent and Trademark Office, Board of Patent Appeals and Interferences.

Schrage Objections to Brown's Evidence Served Nov. 29, 2011, *Brown et al.* v. *Schrage et al.*, dated Dec. 6, 2011, Patent Interference No. 105,799, United States Patent and Trademark Office, Board of Patent Appeals and Interferences.

Schrage Notice of Deposition of Steve Merritt, *Brown et al.* v. *Schrage et al.*, dated Dec. 7, 2011, Patent Interference No. 105,799, United States Patent and Trademark Office, Board of Patent Appeals and Interferences.

Brown 37 C.F.R. 41.106(f) Certificate of Service of Exhibit Dec. 7, 2011, *Brown et al.* v. *Schrage et al.*, dated Dec. 7, 2011, Patent Interference No. 105,799, United States Patent and Trademark Office, Board of Patent Appeals and Interferences.

Schrage Request for Oral Argument, *Brown et al.* v. *Schrage et al.*, dated Dec. 13, 2011, Patent Interference No. 105,799, United States Patent and Trademark Office, Board of Patent Appeals and Interferences.

Schrage Motion 2 (To Exclude Brown Exhibits 2098, 2117-2123, and 2125), *Brown et al.* v. *Schrage et al.*, dated Dec. 13, 2011, Patent Interference No. 105,799, United States Patent and Trademark Office, Board of Patent Appeals and Interferences.

Schrage Exhibit List as of Dec. 13, 2011, *Brown et al.* v. *Schrage et al.*, dated Dec. 13, 2011, Patent Interference No. 105,799, United States Patent and Trademark Office, Board of Patent Appeals and Interferences.

Schrage Observations on Cross-Examination of Mr. Merritt, *Brown et al.* v. *Schrage et al.*, dated Dec. 13, 2011, Patent Interference No. 105,799, United States Patent and Trademark Office, Board of Patent Appeals and Interferences.

Blank Replace Duplicate Paper, *Brown et al.* v. *Schrage et al.*, dated Dec. 13, 2011, Patent Interference No. 105,799, United States Patent and Trademark Office, Board of Patent Appeals and Interferences.

Brown 37 C.F.R. 41.106(f) Certificate of Service of Exhibits Dec. 13, 2011, *Brown et al.* v. *Schrage et al.*, dated Dec. 13, 2011, Patent Interference No. 105,799, United States Patent and Trademark Office, Board of Patent Appeals and Interferences.

Brown Motion 8, *Brown et al.* v. *Schrage et al.*, dated Dec. 13, 2011, Patent Interference No. 105,799, United States Patent and Trademark Office, Board of Patent Appeals and Interferences.

Brown Response 2, *Brown et al.* v. *Schrage et al.*, dated Dec. 15, 2011, Patent Interference No. 105,799, United States Patent and Trademark Office, Board of Patent Appeals and Interferences.

Brown Opposition 2, *Brown et al.* v. *Schrage et al.*, dated Dec. 15, 2011, Patent Interference No. 105,799, United States Patent and Trademark Office, Board of Patent Appeals and Interferences.

Schrage Exhibit List as of Dec. 16, 2011, *Brown et al.* v. *Schrage et al.*, dated Dec. 16, 2011, Patent Interference No. 105,799, United States Patent and Trademark Office, Board of Patent Appeals and Interferences.

Schrage Opposition 8, *Brown et al.* v. *Schrage et al.*, dated Dec. 16, 2011, Patent Interference No. 105,799, United States Patent and Trademark Office, Board of Patent Appeals and Interferences.

Brown Notice of Service of Objections to Evidence Served Dec. 16, 2011, Notice of Objections to EX10230, *Brown et al.* v. *Schrage et al.*, dated Dec. 19, 2011, Patent Interference No. 105,799, United States Patent and Trademark Office, Board of Patent Appeals and Interferences.

Brown Reply 8, *Brown et al.* v. *Schrage et al.*, dated Dec. 19, 2011, Patent Interference No. 105,799, United States Patent and Trademark Office, Board of Patent Appeals and Interferences.

Schrage Reply 2, *Brown et al.* v. *Schrage et al.*, dated Dec. 20, 2011, Patent Interference No. 105,799, United States Patent and Trademark Office, Board of Patent Appeals and Interferences.

Schrage Exhibit List as of Dec. 20, 2011, *Brown et al.* v. *Schrage et al.*, dated Dec. 20, 2011, Patent Interference No. 105,799, United States Patent and Trademark Office, Board of Patent Appeals and Interferences.

Schrage Objections to Brown's Evidence Served Dec. 13, 2011, *Brown et a.* v. *Schrage et al.*, dated Dec. 20, 2011, Patent Interference No. 105,799, United States Patent and Trademark Office, Board of Patent Appeals and Interferences.

EX 2043, *Brown et al.* v. *Schrage et al.*, dated Dec. 25, 2011, Patent Interference No. 105,799, United States Patent and Trademark Office, Board of Patent Appeals and Interferences.

EX 2044, *Brown et al.* v. *Schrage et al.*, dated Dec. 25, 2011, Patent Interference No. 105,799, United States Patent and Trademark Office, Board of Patent Appeals and Interferences.
EX 2045, *Brown et al.* v. *Schrage et al.*, dated Dec. 25, 2011, Patent Interference No. 105,799, United States Patent and Trademark Office, Board of Patent Appeals and Interferences.
EX 2046, *Brown et al.* v. *Schrage et al.*, dated Dec. 25, 2011, Patent Interference No. 105,799, United States Patent and Trademark Office, Board of Patent Appeals and Interferences.
EX 2047, *Brown et al.* v. *Schrage et al.*, dated Dec. 25, 2011, Patent Interference No. 105,799, United States Patent and Trademark Office, Board of Patent Appeals and Interferences.
EX 2049, *Brown et al.* v. *Schrage et al.*, dated Dec. 25, 2011, Patent Interference No. 105,799, United States Patent and Trademark Office, Board of Patent Appeals and Interferences.
EX 2050, *Brown et al.* v. *Schrage et al.*, dated Dec. 25, 2011, Patent Interference No. 105,799, United States Patent and Trademark Office, Board of Patent Appeals and Interferences.
EX 2051, *Brown et al.* v. *Schrage et al.*, dated Dec. 25, 2011, Patent Interference No. 105,799, United States Patent and Trademark Office, Board of Patent Appeals and Interferences.
EX 2052, *Brown et al.* v. *Schrage et al.*, dated Dec. 25, 2011, Patent Interference No. 105,799, United States Patent and Trademark Office, Board of Patent Appeals and Interferences.
EX 2053, *Brown et al.* v. *Schrage et al.*, dated Dec. 25, 2011, Patent Interference No. 105,799, United States Patent and Trademark Office, Board of Patent Appeals and Interferences.
EX 2054, *Brown et al.* v. *Schrage et al.*, dated Dec. 25, 2011, Patent Interference No. 105,799, United States Patent and Trademark Office, Board of Patent Appeals and Interferences.
EX 2055, *Brown et al.* v. *Schrage et al.*, dated Dec. 25, 2011, Patent Interference No. 105,799, United States Patent and Trademark Office, Board of Patent Appeals and Interferences.
EX 2056, *Brown et al.* v. *Schrage et al.*, dated Dec. 25, 2011, Patent Interference No. 105,799, United States Patent and Trademark Office, Board of Patent Appeals and Interferences.
EX 2057, *Brown et al.* v. *Schrage et al.*, dated Dec. 25, 2011, Patent Interference No. 105,799, United States Patent and Trademark Office, Board of Patent Appeals and Interferences.
EX 2059, *Brown et al.* v. *Schrage et al.*, dated Dec. 25, 2011, Patent Interference No. 105,799, United States Patent and Trademark Office, Board of Patent Appeals and Interferences.
EX 2060, *Brown et al.* v. *Schrage et al.*, dated Dec. 25, 2011, Patent Interference No. 105,799, United States Patent and Trademark Office, Board of Patent Appeals and Interferences.
EX 2061, *Brown et al.* v. *Schrage et al.*, dated Dec. 25, 2011, Patent Interference No. 105,799, United States Patent and Trademark Office, Board of Patent Appeals and Interferences.
EX 2062, *Brown et al.* v. *Schrage et al.*, dated Dec. 25, 2011, Patent Interference No. 105,799, United States Patent and Trademark Office, Board of Patent Appeals and Interferences.
EX 2063, *Brown et al.* v. *Schrage et al.*, dated Dec. 25, 2011, Patent Interference No. 105,799, United States Patent and Trademark Office, Board of Patent Appeals and Interferences.
EX 2064, *Brown et al.* v. *Schrage et al.*, dated Dec. 25, 2011, Patent Interference No. 105,799, United States Patent and Trademark Office, Board of Patent Appeals and Interferences.
EX 2065, *Brown et al.* v. *Schrage et al.*, dated Dec. 25, 2011, Patent Interference No. 105,799, United States Patent and Trademark Office, Board of Patent Appeals and Interferences.
EX 2066, *Brown et al.* v. *Schrage et al.*, dated Dec. 25, 2011, Patent Interference No. 105,799, United States Patent and Trademark Office, Board of Patent Appeals and Interferences.
EX 2067, *Brown et al.* v. *Schrage et al.*, dated Dec. 25, 2011, Patent Interference No. 105,799, United States Patent and Trademark Office, Board of Patent Appeals and Interferences.
EX 2068, *Brown et al.* v. *Schrage et al.*, dated Dec. 25, 2011, Patent Interference No. 105,799, United States Patent and Trademark Office, Board of Patent Appeals and Interferences.
EX 2069, *Brown et al.* v. *Schrage et al.*, dated Dec. 25, 2011, Patent Interference No. 105,799, United States Patent and Trademark Office, Board of Patent Appeals and Interferences.
EX 2070, *Brown et al.* v. *Schrage et al.*, dated Dec. 25, 2011, Patent Interference No. 105,799, United States Patent and Trademark Office, Board of Patent Appeals and Interferences.
EX 2071, *Brown et al.* v. *Schrage et al.*, dated Dec. 25, 2011, Patent Interference No. 105,799, United States Patent and Trademark Office, Board of Patent Appeals and Interferences.
EX 2072, *Brown et al.* v. *Schrage et al.*, dated Dec. 25, 2011, Patent Interference No. 105,799, United States Patent and Trademark Office, Board of Patent Appeals and Interferences.
EX 2073, *Brown et al.* v. *Schrage et al.*, dated Dec. 25, 2011, Patent Interference No. 105,799, United States Patent and Trademark Office, Board of Patent Appeals and Interferences.
EX 2074, *Brown et al.* v. *Schrage et al.*, dated Dec. 25, 2011, Patent Interference No. 105,799, United States Patent and Trademark Office, Board of Patent Appeals and Interferences.
EX 2075, *Brown et al.* v. *Schrage et al.*, dated Dec. 25, 2011, Patent Interference No. 105,799, United States Patent and Trademark Office, Board of Patent Appeals and Interferences.
EX 2076, *Brown et al.* v. *Schrage et al.*, dated Dec. 25, 2011, Patent Interference No. 105,799, United States Patent and Trademark Office, Board of Patent Appeals and Interferences.
EX 2023, *Brown et al.* v. *Schrage et al.*, dated Jul. 7, 2011, Patent Interference No. 105,799, United States Patent and Trademark Office, Board of Patent Appeals and Interferences.
EX 2024, *Brown et al.* v. *Schrage et al.*, dated Jul. 7, 2011, Patent Interference No. 105,799, United States Patent and Trademark Office, Board of Patent Appeals and Interferences.
EX 2025, *Brown et al.* v. *Schrage et al.*, dated Jul. 7, 2011, Patent Interference No. 105,799, United States Patent and Trademark Office, Board of Patent Appeals and Interferences.
EX 2026, *Brown et al.* v. *Schrage et al.*, dated Jul. 7, 2011, Patent Interference No. 105,799, United States Patent and Trademark Office, Board of Patent Appeals and Interferences.
EX 2027, *Brown et al.* v. *Schrage et al.*, dated Jul. 7, 2011, Patent Interference No. 105,799, United States Patent and Trademark Office, Board of Patent Appeals and Interferences.
EX 2029, *Brown et al.* v. *Schrage et al.*, dated Jul. 7, 2011, Patent Interference No. 105,799, United States Patent and Trademark Office, Board of Patent Appeals and Interferences.
EX 2031, *Brown et al.* v. *Schrage et al.*, dated Jul. 7, 2011, Patent Interference No. 105,799, United States Patent and Trademark Office, Board of Patent Appeals and Interferences.
EX 2032, *Brown et al.* v. *Schrage et al.*, dated Jul. 7, 2011, Patent Interference No. 105,799, United States Patent and Trademark Office, Board of Patent Appeals and Interferences.
EX 2033, *Brown et al.* v. *Schrage et al.*, dated Jul. 7, 2011, Patent Interference No. 105,799, United States Patent and Trademark Office, Board of Patent Appeals and Interferences.
EX 2034, *Brown et al.* v. *Schrage et al.*, dated Jul. 7, 2011, Patent Interference No. 105,799, United States Patent and Trademark Office, Board of Patent Appeals and Interferences.
EX 2035, *Brown et al.* v. *Schrage et al.*, dated Jul. 7, 2011, Patent Interference No. 105,799, United States Patent and Trademark Office, Board of Patent Appeals and Interferences.
EX 2036, *Brown et al.* v. *Schrage et al.*, dated Jul. 7, 2011, Patent Interference No. 105,799, United States Patent and Trademark Office, Board of Patent Appeals and Interferences.
EX 2037, *Brown et al.* v. *Schrage et al.*, dated Jul. 7, 2011, Patent Interference No. 105,799, United States Patent and Trademark Office, Board of Patent Appeals and Interferences.
EX 2038, *Brown et al.* v. *Schrage et al.*, dated Jul. 7, 2011, Patent Interference No. 105,799, United States Patent and Trademark Office, Board of Patent Appeals and Interferences.
EX 2039, *Brown et al.* v. *Schrage et al.*, dated Jul. 7, 2011, Patent Interference No. 105,799, United States Patent and Trademark Office, Board of Patent Appeals and Interferences.
EX 2040, *Brown et al.* v. *Schrage et al.*, dated Jul. 7, 2011, Patent Interference No. 105,799, United States Patent and Trademark Office, Board of Patent Appeals and Interferences.
EX 2041, *Brown et al.* v. *Schrage et al.*, dated Jul. 7, 2011, Patent Interference No. 105,799, United States Patent and Trademark Office, Board of Patent Appeals and Interferences.

EX 2042, *Brown et al. v. Schrage et al.*, dated Jul. 7, 2011, Patent Interference No. 105,799, United States Patent and Trademark Office, Board of Patent Appeals and Interferences.
EX 2028, *Brown et al. v. Schrage et al.*, dated Jul. 7, 2011, Patent Interference No. 105,799, United States Patent and Trademark Office, Board of Patent Appeals and Interferences.
Errata, *Brown et al. v. Schrage et al.*, dated Jul. 8, 2011, Patent Interference No. 105,799, United States Patent and Trademark Office, Board of Patent Appeals and Interferences.
Order Miscellaneous BdR 104(a) Transferring Interference, *Brown et al. v. Schrage et al.*, dated Jul. 8, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 11, 2011, Patent Interference No. 105,799, United States Patent and Trademark Office, Board of Patent Appeals and Interferences.
Brown Request for Rehearing of Decision in Paper 30, *Brown et al. v. Schrage et al.*, dated Jul. 12, 2011, Patent Interference No. 105,799, United States Patent and Trademark Office, Board of Patent Appeals and Interferences.
EX 2008, *Brown et al. v. Schrage et al.*, dated Jul. 13, 2011, Patent Interference No. 105,799, United States Patent and Trademark Office, Board of Patent Appeals and Interferences.
EX 2009, *Brown et al. v. Schrage et al.*, dated Jul. 13, 2011, Patent Interference No. 105,799, United States Patent and Trademark Office, Board of Patent Appeals and Interferences.
EX 2011, *Brown et al. v. Schrage et al.*, dated Jul. 13, 2011, Patent Interference No. 105,799, United States Patent and Trademark Office, Board of Patent Appeals and Interferences.
EX 2019, *Brown et al. v. Schrage et al.*, dated Jul. 13, 2011, Patent Interference No. 105,799, United States Patent and Trademark Office, Board of Patent Appeals and Interferences.
EX 2020, *Brown et al. v. Schrage et al.*, dated Jul. 13, 2011, Patent Interference No. 105,799, United States Patent and Trademark Office, Board of Patent Appeals and Interferences.
EX 2021, *Brown et al. v. Schrage et al.*, dated Jul. 13, 2011, Patent Interference No. 105,799, United States Patent and Trademark Office, Board of Patent Appeals and Interferences.
EX 2022, *Brown et al. v. Schrage et al.*, dated Jul. 13, 2011, Patent Interference No. 105,799, United States Patent and Trademark Office, Board of Patent Appeals and Interferences.
EX 2030, *Brown et al. v. Schrage et al.*, dated Jul. 13, 2011, Patent Interference No. 105,799, United States Patent and Trademark Office, Board of Patent Appeals and Interferences.
Schrage Opposition 1, *Brown et al. v. Schrage et al.*, dated Jul. 15, 2011, Patent Interference No. 105,799, United States Patent and Trademark Office, Board of Patent Appeals and Interferences.
Schrage Objections to Brown's Evidence, *Brown et al. v. Schrage et al.*, dated Jul. 15, 2011, Patent Interference No. 105,799, United States Patent and Trademark Office, Board of Patent Appeals and Interferences.
Decision on Request for Rehearing BdR 125(c), *Brown et al. v. Schrage et al.*, dated Jul. 18, 2011, Patent Interference No. 105,799, United States Patent and Trademark Office, Board of Patent Appeals and Interferences.
Decision Interlocutory Motion BdR 125(b), *Brown et al. v. Schrage et al.*, dated Jul. 21, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 21, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 22, 2011, Patent Interference No. 105,799, United States Patent and Trademark Office, Board of Patent Appeals and Interferences.
Brown Notice of Service of Supplement to Evidence, *Brown et al. v. Schrage et al.*, dated Jul. 22, 2011, Patent Interference No. 105,799, United States Patent and Trademark Office, Board of Patent Appeals and Interferences.
Brown Notice of Service of Jul. 21, 2011 Order on Deere & Company, *Brown et al. v. Schrage et al.*, dated Jul. 25, 2011, Patent Interference No. 105,799, United States Patent and Trademark Office, Board of Patent Appeals and Interferences.

Notice Stipulated Changes in Time Periods 1-6, *Brown et al. v. Schrage et al.*, dated Jul. 25, 2011, Patent Interference No. 105,799, United States Patent and Trademark Office, Board of Patent Appeals and Interferences.
Brown Notice of Service of EX2067-2086, *Brown et al. v. Schrage et al.*, dated Jul. 27, 2011, Patent Interference No. 105,799, United States Patent and Trademark Office, Board of Patent Appeals and Interferences.
Schrage Notice of Change in Schedule, *Brown et al. v. Schrage et al.*, dated Jul. 29, 2011, Patent Interference No. 105,799, United States Patent and Trademark Office, Board of Patent Appeals and Interferences.
Order Miscellaneous BdR 104(a), *Brown et al. v. Schrage et al.*, dated Aug. 15, 2011, Patent Interference No. 105,799, United States Patent and Trademark Office, Board of Patent Appeals and Interferences.
Brown 37 C.F.R. 41.157(c)(3) and (4) Notice of Taking Direct Testimony, *Brown et al. v. Schrage et al.*, dated Aug. 17, 2011, Patent Interference No. 105,799, United States Patent and Trademark Office, Board of Patent Appeals and Interferences.
Schrage Notice of Change in Schedule, *Brown et al. v. Schrage et al.*, dated Aug. 17, 2011, Patent Interference No. 105,799, United States Patent and Trademark Office, Board of Patent Appeals and Interferences.
List of Exhibits Error with Systems, *Brown et al. v. Schrage et al.*, dated Aug. 31, 2011, Patent Interference No. 105,799, United States Patent and Trademark Office, Board of Patent Appeals and Interferences.
John Deere; 6200, 6200L, 6300, 6300L, 6400, 6400L, 6500 and 6500L Tractors Operation and Tests; Technical Manual; May 13, 1997; 7 pages; pp. BF00040454-BF00040460.
John Deere; 6200, 6200L, 6300, 6300L, 6400, 6400L, 6500 and 6500L Tractors Repair; Technical Manual; Aug. 3, 1997; 4 pages; pp. BF00040461-BF00040464.
John Deere; 6200, 6200L, 6300, 6300L, 6400, 6400L, 6500 and 6500L Tractors (from Serial No. 164 000); Operator's Manual; 1996; 4 pages.; pp. BF00040465-BF00040468; OMAL112048 Issue B6.
John Deere; 6200, 6200L, 6300, 6300L, 6400, 6400L, 6500 and 6500L Tractors, Operator's Manual, 1996, 4 pages, pp. BF00040469-BF00040472; OMAL77469 Issue G5.
John Deere, Pictures of John Deere AL111748 Filter referenced in Defendant's Prior Art Statement, May 2010; 19 pages.
Baldwin Filters, Inc.; Defendant's Prior Art Statement, May 28, 2010, 1077 pages; and Statement Accompanying Non-Patent Literature, 1 page.
Notice to Declare Interference, *Brown et al. v. Schrage et al.*, dated Apr. 6, 2011, Patent Interference No. 105,799, United States Patent and Trademark Office, Board of Patent Appeals and Interferences.
Standing Order, *Brown et al. v. Schrage et al.*, dated Apr. 6, 2011, Patent Interference No. 105,799, United States Patent and Trademark Office, Board of Patent Appeals and Interferences.
Brown Clean Claims, *Brown et al. v. Schrage et al.*, dated Apr. 19, 2011, Patent Interference No. 105,799, United States Patent and Trademark Office, Board of Patent Appeals and Interferences.
Brown Notice of Related Proceedings, *Brown et al. v. Schrage et al.*, dated Apr. 19, 2011, Patent Interference No. 105,799, United States Patent and Trademark Office, Board of Patent Appeals and Interferences.
Brown 37 C.F.R. 3.73(b) Showing of Interest, *Brown et al. v. Schrage et al.*, dated Apr. 19, 2011, Patent Interference No. 105,799, United States Patent and Trademark Office, Board of Patent Appeals and Interferences.
Brown Revocation and New Powers of Attorney, *Brown et al. v. Schrage et al.*, dated Apr. 19, 2011, Patent Interference No. 105,799, United States Patent and Trademark Office, Board of Patent Appeals and Interferences.
Brown Designation of Lead and Backup Counsel, *Brown et al. v. Schrage et al.*, dated Apr. 19, 2011, Patent Interference No. 105,799, United States Patent and Trademark Office, Board of Patent Appeals and Interferences.
Brown Notice of Real Party in Interest, *Brown et al. v. Schrage et al.*, dated Apr. 19, 2011, Patent Interference No. 105,799, United States Patent and Trademark Office, Board of Patent Appeals and Interferences.

Schrage Designation of Lead and Backup Counsel, *Brown et al. v. Schrage et al.*, dated Apr. 28, 2011, Patent Interference No. 105,799, United States Patent and Trademark Office, Board of Patent Appeals and Interferences.
Schrage Clean Claims, *Brown et al. v. Schrage et al.*, dated Apr. 28, 2011, Patent Interference No. 105,799, United States Patent and Trademark Office, Board of Patent Appeals and Interferences.
Schrage Notice of Related Proceedings, *Brown et al. v. Schrage et al.*, dated Apr. 28, 2011, Patent Interference No. 105,799, United States Patent and Trademark Office, Board of Patent Appeals and Interferences.
Schrage Request for File Copies, *Brown et al. v. Schrage et al.*, dated Apr. 28, 2011, Patent Interference No. 105,799, United States Patent and Trademark Office, Board of Patent Appeals and Interferences.
Schrage Identification of Real Party in Interest, *Brown et al. v. Schrage et al.*, dated Apr. 28, 2011, Patent Interference No. 105,799, United States Patent and Trademark Office, Board of Patent Appeals and Interferences.
Order BdR Authorizing Office Records, *Brown et al. v. Schrage et al.*, dated Apr. 29, 2011, Patent Interference No. 105,799, United States Patent and Trademark Office, Board of Patent Appeals and Interferences.
Brown Annotated Claims, *Brown et al. v. Schrage et al.*, dated May 4, 2011, Patent Interference No. 105,799, United States Patent and Trademark Office, Board of Patent Appeals and Interferences.
Order Miscellaneous BdR 104(a), *Brown et al. v. Schrage et al.*, dated May 10, 2011, Patent Interference No. 105,799, United States Patent and Trademark Office, Board of Patent Appeals and Interferences.
Order Errata, *Brown et al. v. Schrage et al.*, dated May 10, 2011, Patent Interference No. 105,799, United States Patent and Trademark Office, Board of Patent Appeals and Interferences.
Schrage Annotated Claims, *Brown et al. v. Schrage et al.*, dated May 12, 2011, Patent Interference No. 105,799, United States Patent and Trademark Office, Board of Patent Appeals and Interferences.
Brown 37 C.F.R. 41.8(a)(2) Notice, *Brown et al. v. Schrage et al.*, dated May 27, 2011, Patent Interference No. 105,799, United States Patent and Trademark Office, Board of Patent Appeals and Interferences.
Brown List of Proposed Motions, *Brown et al. v. Schrage et al.*, dated Jun. 9, 2011, Patent Interference No. 105,799, United States Patent and Trademark Office, Board of Patent Appeals and Interferences.
Schrage List of Proposed Motions, *Brown et al. v. Schrage et al.*, dated Jun. 9, 2011, Patent Interference No. 105,799, United States Patent and Trademark Office, Board of Patent Appeals and Interferences.
Order Motion Times BdR 104(c), *Brown et al. v. Schrage et al.*, dated Jun. 17, 2011, Patent Interference No. 105,799, United States Patent and Trademark Office, Board of Patent Appeals and Interferences.
Brown Request for Rehearing, *Brown et al. v. Schrage et al.*, dated Jun. 17, 2011, Patent Interference No. 105,799, United States Patent and Trademark Office, Board of Patent Appeals and Interferences.
Order Miscellaneous BdR 104(a), *Brown et al. v. Schrage et al.*, dated Jun. 21, 2011, Patent Interference No. 105,799, United States Patent and Trademark Office, Board of.
Order Motion Times BdR 104(c) Errata, *Brown et al. v. Schrage et al.*, dated Jun. 23, 2011, Patent Interference No. 105,799, United States Patent and Trademark Office, Board of Patent Appeals and Interferences.
Schrage Notice of Filing Inventors Declaration, *Brown et al. v. Schrage et al.*, dated Jun. 24, 2011, Patent Interference No. 105,799, United States Patent and Trademark Office, Board of Patent Appeals and Interferences.
Schrage Notice of Service of Physical Models 1,2, and 3, *Brown et al. v. Schrage et al.*, dated Jun. 28, 2011, Patent Interference No. 105,799, United States Patent and Trademark Office, Board of Patent Appeals and Interferences.
Brown Request for Clarification, *Brown et al. v. Schrage et al.*, dated Jun. 29, 2011, Patent Interference No. 105,799, United States Patent and Trademark Office, Board of Patent Appeals and Interferences.
Order Miscellaneous BdR 104(a), *Brown et al. v. Schrage et al.*, dated Jun. 29, 2011, Patent Interference No. 105,799, United States Patent and Trademark Office, Board of Patent Appeals and Interferences.
Order Miscellaneous BdR 104(a), *Brown et al. v. Schrage et al.*, dated Jul. 6, 2011, Patent Interference No. 105,799, United States Patent and Trademark Office, Board of Patent Appeals and Interferences.
Brown Motion 1 for Third Party Subpoena, *Brown et al. v. Schrage et al.*, dated Jul. 6, Patent Interference No. 105,799, United States Patent and Trademark Office, Board of Patent Appeals and Interferences.
Brown Motion 2—Lack of Written Description, *Brown et al. v. Schrage et al.*, dated Jul. 7, Patent Interference No. 105,799, United States Patent and Trademark Office, Board of Patent Appeals and Interferences.
Brown List of Exhibits, *Brown et al. v. Schrage et al.*, dated Jul. 7, 2011, Patent Interference No. 105,799, United States Patent and Trademark Office, Board of Patent Appeals and Interferences.
EX 2001, *Brown et al. v. Schrage et al.*, dated Jul. 7, 2011, Patent Interference No. 105,799, United States Patent and Trademark Office, Board of Patent Appeals and Interferences.
EX 2007, *Brown et al. v. Schrage et al.*, dated Jul. 7, 2011, Patent Interference No. 105,799, United States Patent and Trademark Office, Board of Patent Appeals and Interferences.
EX 2010, *Brown et al. v. Schrage et al.*, dated Jul. 7, 2011, Patent Interference No. 105,799, United States Patent and Trademark Office, Board of Patent Appeals and Interferences.
EX 2012, *Brown et al. v. Schrage et al.*, dated Jul. 7, 2011, Patent Interference No. 105,799, United States Patent and Trademark Office, Board of Patent Appeals and Interferences.
EX 2013, *Brown et al. v. Schrage et al.*, dated Jul. 7, 2011, Patent Interference No. 105,799, United States Patent and Trademark Office, Board of Patent Appeals and Interferences.
EX 2014, *Brown et al. v. Schrage et al.*, dated Jul. 7, 2011, Patent Interference No. 105,799, United States Patent and Trademark Office, Board of Patent Appeals and Interferences.
EX 2015, *Brown et al. v. Schrage et al.*, dated Jul. 7, 2011, Patent Interference No. 105,799, United States Patent and Trademark Office, Board of Patent Appeals and Interferences.
EX 2016, *Brown et al. v. Schrage et al.*, dated Jul. 7, 2011, Patent Interference No. 105,799, United States Patent and Trademark Office, Board of Patent Appeals and Interferences.
EX 2017, *Brown et al. v. Schrage et al.*, dated Jul. 7, 2011, Patent Interference No. 105,799, United States Patent and Trademark Office, Board of Patent Appeals and Interferences.
EX 2018, *Brown et al. v. Schrage et al.*, dated Jul. 7, 2011, Patent Interference No. 105,799, United States Patent and Trademark Office, Board of Patent Appeals and Interferences.
Declaration of Interference filed Apr. 6, 2011; 22 pages.
Brown List of Proposed Motions dated Jun. 9, 2011; 19 pages.
EX 2077, *Brown et al. v. Schrage et al.*, dated Dec. 25, 2011, Patent Interference No. 105,799, United States Patent and Trademark Office, Board of Patent Appeals and Interferences.
EX 2078, *Brown et al. v. Schrage et al.*, dated Dec. 25, 2011, Patent Interference No. 105,799, United States Patent and Trademark Office, Board of Patent Appeals and Interferences.
EX 2079, *Brown et al. v. Schrage et al.*, dated Dec. 25, 2011, Patent Interference No. 105,799, United States Patent and Trademark Office, Board of Patent Appeals and Interferences.
EX 2080, *Brown et al. v. Schrage et al.*, dated Dec. 25, 2011, Patent Interference No. 105,799, United States Patent and Trademark Office, Board of Patent Appeals and Interferences.
EX 2081, *Brown et al. v. Schrage et al.*, dated Dec. 25, 2011, Patent Interference No. 105,799, United States Patent and Trademark Office, Board of Patent Appeals and Interferences.
EX 2082, *Brown et al. v. Schrage et al.*, dated Dec. 25, 2011, Patent Interference No. 105,799, United States Patent and Trademark Office, Board of Patent Appeals and Interferences.
EX 2083, *Brown et al. v. Schrage et al.*, dated Dec. 25, 2011, Patent Interference No. 105,799, United States Patent and Trademark Office, Board of Patent Appeals and Interferences.
EX 2084, *Brown et al. v. Schrage et al.*, dated Dec. 25, 2011, Patent Interference No. 105,799, United States Patent and Trademark Office, Board of Patent Appeals and Interferences.
EX 2085, *Brown et al. v. Schrage et al.*, dated Dec. 25, 2011, Patent Interference No. 105,799, United States Patent and Trademark Office, Board of Patent Appeals and Interferences.

EX 2086, *Brown et al.* v. *Schrage et al.*, dated Dec. 25, 2011, Patent Interference No. 105,799, United States Patent and Trademark Office, Board of Patent Appeals and Interferences.
EX 2087, *Brown et al.* v. *Schrage et al.*, dated Dec. 25, 2011, Patent Interference No. 105,799, United States Patent and Trademark Office, Board of Patent Appeals and Interferences.
EX 2089, *Brown et al.* v. *Schrage et al.*, dated Dec. 25, 2011, Patent Interference No. 105,799, United States Patent and Trademark Office, Board of Patent Appeals and Interferences.
EX 2090, *Brown et al.* v. *Schrage et al.*, dated Dec. 25, 2011, Patent Interference No. 105,799, United States Patent and Trademark Office, Board of Patent Appeals and Interferences.
EX 2091, *Brown et al.* v. *Schrage et al.*, dated Dec. 25, 2011, Patent Interference No. 105,799, United States Patent and Trademark Office, Board of Patent Appeals and Interferences.
EX 2092, *Brown et al.* v. *Schrage et al.*, dated Dec. 25, 2011, Patent Interference No. 105,799, United States Patent and Trademark Office, Board of Patent Appeals and Interferences.
EX 2093, *Brown et al.* v. *Schrage et al.*, dated Dec. 25, 2011, Patent Interference No. 105,799, United States Patent and Trademark Office, Board of Patent Appeals and Interferences.
EX 2094, *Brown et al.* v. *Schrage et al.*, dated Dec. 25, 2011, Patent Interference No. 105,799, United States Patent and Trademark Office, Board of Patent Appeals and Interferences.
EX 2095, *Brown et al.* v. *Schrage et al.*, dated Dec. 25, 2011, Patent Interference No. 105,799, United States Patent and Trademark Office, Board of Patent Appeals and Interferences.
EX 2096, *Brown et al.* v. *Schrage et al.*, dated Dec. 25, 2011, Patent Interference No. 105,799, United States Patent and Trademark Office, Board of Patent Appeals and Interferences.
EX 2097, *Brown et al.* v. *Schrage et al.*, dated Dec. 25, 2011, Patent Interference No. 105,799, United States Patent and Trademark Office, Board of Patent Appeals and Interferences.
EX 2098, *Brown et al.* v. *Schrage et al.*, dated Dec. 25, 2011, Patent Interference No. 105,799, United States Patent and Trademark Office, Board of Patent Appeals and Interferences.
EX 2099, *Brown et al.* v. *Schrage et al.*, dated Dec. 25, 2011, Patent Interference No. 105,799, United States Patent and Trademark Office, Board of Patent Appeals and Interferences.
EX 2100, *Brown et al.* v. *Schrage et al.*, dated Dec. 25, 2011, Patent Interference No. 105,799, United States Patent and Trademark Office, Board of Patent Appeals and Interferences.
EX 2101, *Brown et al.* v. *Schrage et al.*, dated Dec. 25, 2011, Patent Interference No. 105,799, United States Patent and Trademark Office, Board of Patent Appeals and Interferences.
EX 2102, *Brown et al.* v. *Schrage et al.*, dated Dec. 25, 2011, Patent Interference No. 105,799, United States Patent and Trademark Office, Board of Patent Appeals and Interferences.
EX 2103, *Brown et al.* v. *Schrage et al.*, dated Dec. 25, 2011, Patent Interference No. 105,799, United States Patent and Trademark Office, Board of Patent Appeals and Interferences.
EX 2104, *Brown et al.* v. *Schrage et al.*, dated Dec. 25, 2011, Patent Interference No. 105,799, United States Patent and Trademark Office, Board of Patent Appeals and Interferences.
EX 2105, *Brown et al.* v. *Schrage et al.*, dated Dec. 25, 2011, Patent Interference No. 105,799, United States Patent and Trademark Office, Board of Patent Appeals and Interferences.
EX 2108, *Brown et al.* v. *Schrage et al.*, dated Dec. 25, 2011, Patent Interference No. 105,799, United States Patent and Trademark Office, Board of Patent Appeals and Interferences.
EX 2109, *Brown et al.* v. *Schrage et al.*, dated Dec. 25, 2011, Patent Interference No. 105,799, United States Patent and Trademark Office, Board of Patent Appeals and Interferences.
EX 2110, *Brown et al.* v. *Schrage et al.*, dated Dec. 25, 2011, Patent Interference No. 105,799, United States Patent and Trademark Office, Board of Patent Appeals and Interferences.
EX 2117, *Brown et al.* v. *Schrage et al.*, dated Dec. 25, 2011, Patent Interference No. 105,799, United States Patent and Trademark Office, Board of Patent Appeals and Interferences.
EX 2118, *Brown et al.* v. *Schrage et al.*, dated Dec. 25, 2011, Patent Interference No. 105,799, United States Patent and Trademark Office, Board of Patent Appeals and Interferences.
EX 2119, *Brown et al.* v. *Schrage et al.*, dated Dec. 25, 2011, Patent Interference No. 105,799, United States Patent and Trademark Office, Board of Patent Appeals and Interferences.
EX 2120, *Brown et al.* v. *Schrage et al.*, dated Dec. 25, 2011, Patent Interference No. 105,799, United States Patent and Trademark Office, Board of Patent Appeals and Interferences.
EX 2121, *Brown et al.* v. *Schrage et al.*, dated Dec. 25, 2011, Patent Interference No. 105,799, United States Patent and Trademark Office, Board of Patent Appeals and Interferences.
EX 2122, *Brown et al.* v. *Schrage et al.*, dated Dec. 25, 2011, Patent Interference No. 105,799, United States Patent and Trademark Office, Board of Patent Appeals and Interferences.
EX 2123, *Brown et al.* v. *Schrage et al.*, dated Dec. 25, 2011, Patent Interference No. 105,799, United States Patent and Trademark Office, Board of Patent Appeals and Interferences.
EX 2124, *Brown et al.* v. *Schrage et al.*, dated Dec. 25, 2011, Patent Interference No. 105,799, United States Patent and Trademark Office, Board of Patent Appeals and Interferences.
EX 2125, *Brown et al.* v. *Schrage et al.*, dated Dec. 25, 2011, Patent Interference No. 105,799, United States Patent and Trademark Office, Board of Patent Appeals and Interferences.
EX 2126, *Brown et al.* v. *Schrage et al.*, dated Dec. 25, 2011, Patent Interference No. 105,799, United States Patent and Trademark Office, Board of Patent Appeals and Interferences.
EX 2127, *Brown et al.* v. *Schrage et al.*, dated Dec. 25, 2011, Patent Interference No. 105,799, United States Patent and Trademark Office, Board of Patent Appeals and Interferences.
EX 2128, *Brown et al.* v. *Schrage et al.*, dated Dec. 25, 2011, Patent Interference No. 105,799, United States Patent and Trademark Office, Board of Patent Appeals and Interferences.
EX 2129, *Brown et al.* v. *Schrage et al.*, dated Dec. 25, 2011, Patent Interference No. 105,799, United States Patent and Trademark Office, Board of Patent Appeals and Interferences.
EX 2130, *Brown et al.* v. *Schrage et al.*, dated Dec. 25, 2011, Patent Interference No. 105,799, United States Patent and Trademark Office, Board of Patent Appeals and Interferences.
EX 2131, *Brown et al.* v. *Schrage et al.*, dated Dec. 25, 2011, Patent Interference No. 105,799, United States Patent and Trademark Office, Board of Patent Appeals and Interferences.
Brown Exhibit List, *Brown et al.* v. *Schrage et al.*, dated Dec. 25, 2011, Patent Interference No. 105,799, United States Patent and Trademark Office, Board of Patent Appeals and Interferences.
Schrage Submission of Record, *Brown et al.* v. *Schrage et al.*, dated Dec. 28, 2011, Patent Interference No. 105,799, United States Patent and Trademark Office, Board of Patent Appeals and Interferences.
Schrage Exhibit List as of Dec. 28, 2011, *Brown et al.* v. *Schrage et al.*, dated Dec. 28, 2011, Patent Interference No. 105,799, United States Patent and Trademark Office, Board of Patent Appeals and Interferences.
Brown Certificate of Service of Time Period 8 Papers, *Brown et al.* v. *Schrage et al.*, dated Dec. 28, 2011, Patent Interference No. 105,799, United States Patent and Trademark Office, Board of Patent Appeals and Interferences.
Schrage Exhibit 1001, *Brown et al.* v. *Schrage et al.*, dated Jan. 19, 2012, Patent Interference No. 105,799, United States Patent and Trademark Office, Board of Patent Appeals and Interferences.
Schrage Exhibit 1002, *Brown et al.* v. *Schrage et al.*, dated Jan. 19, 2012, Patent Interference No. 105,799, United States Patent and Trademark Office, Board of Patent Appeals and Interferences.
Schrage Exhibit 1003, *Brown et al.* v. *Schrage et al.*, dated Jan. 19, 2012, Patent Interference No. 105,799, United States Patent and Trademark Office, Board of Patent Appeals and Interferences.
Schrage Exhibit 1004, *Brown et al.* v. *Schrage et al.*, dated Jan. 19, 2012, Patent Interference No. 105,799, United States Patent and Trademark Office, Board of Patent Appeals and Interferences.
Schrage Exhibit 1005, *Brown et al.* v. *Schrage et al.*, dated Jan. 19, 2012, Patent Interference No. 105,799, United States Patent and Trademark Office, Board of Patent Appeals and Interferences.
Schrage Exhibit 1006, *Brown et al.* v. *Schrage et al.*, dated Jan. 19, 2012, Patent Interference No. 105,799, United States Patent and Trademark Office, Board of Patent Appeals and Interferences.

Schrage Exhibit 1007, *Brown et al.* v. *Schrage et al.*, dated Jan. 19, 2012, Patent Interference No. 105,799, United States Patent and Trademark Office, Board of Patent Appeals and Interferences.
Schrage Exhibit 1008, *Brown et al.* v. *Schrage et al.*, dated Jan. 19, 2012, Patent Interference No. 105,799, United States Patent and Trademark Office, Board of Patent Appeals and Interferences.
Schrage Exhibit 1009, *Brown et al.* v. *Schrage et al.*, dated Jan. 19, 2012, Patent Interference No. 105,799, United States Patent and Trademark Office, Board of Patent Appeals and Interferences.
Schrage Exhibit 1010, *Brown et al.* v. *Schrage et al.*, dated Jan. 19, 2012, Patent Interference No. 105,799, United States Patent and Trademark Office, Board of Patent Appeals and Interferences.
Schrage Exhibit 1011, *Brown et al.* v. *Schrage et al.*, dated Jan. 19, 2012, Patent Interference No. 105,799, United States Patent and Trademark Office, Board of Patent Appeals and Interferences.
Schrage Exhibit 1012, *Brown et al.* v. *Schrage et al.*, dated Jan. 19, 2012, Patent Interference No. 105,799, United States Patent and Trademark Office, Board of Patent Appeals and Interferences.
Schrage Exhibit 1013, *Brown et al.* v. *Schrage et al.*, dated Jan. 19, 2012, Patent Interference No. 105,799, United States Patent and Trademark Office, Board of Patent Appeals and Interferences.
Schrage Exhibit 1014, *Brown et al.* v. *Schrage et al.*, dated Jan. 19, 2012, Patent Interference No. 105,799, United States Patent and Trademark Office, Board of Patent Appeals and Interferences.
Schrage Exhibit 1015, *Brown et al.* v. *Schrage et al.*, dated Jan. 19, 2012, Patent Interference No. 105,799, United States Patent and Trademark Office, Board of Patent Appeals and Interferences.
Schrage Exhibit 1016, *Brown et al.* v. *Schrage et al.*, dated Jan. 19, 2012, Patent Interference No. 105,799, United States Patent and Trademark Office, Board of Patent Appeals and Interferences.
Schrage Exhibit 1017, *Brown et al.* v. *Schrage et al.*, dated Jan. 19, 2012, Patent Interference No. 105,799, United States Patent and Trademark Office, Board of Patent Appeals and Interferences.
Schrage Exhibit 1018, *Brown et al.* v. *Schrage et al.*, dated Jan. 19, 2012, Patent Interference No. 105,799, United States Patent and Trademark Office, Board of Patent Appeals and Interferences.
Schrage Exhibit 1019, *Brown et al.* v. *Schrage et al.*, dated Jan. 19, 2012, Patent Interference No. 105,799, United States Patent and Trademark Office, Board of Patent Appeals and Interferences.
Schrage Exhibit 1020, *Brown et al.* v. *Schrage et al.*, dated Jan. 19, 2012, Patent Interference No. 105,799, United States Patent and Trademark Office, Board of Patent Appeals and Interferences.
Schrage Exhibit 1021, *Brown et al.* v. *Schrage et al.*, dated Jan. 19, 2012, Patent Interference No. 105,799, United States Patent and Trademark Office, Board of Patent Appeals and Interferences.
Schrage Exhibit 1022, *Brown et al.* v. *Schrage et al.*, dated Jan. 19, 2012, Patent Interference No. 105,799, United States Patent and Trademark Office, Board of Patent Appeals and Interferences.
Schrage Exhibit 1023, *Brown et al.* v. *Schrage et al.*, dated Jan. 19, 2012, Patent Interference No. 105,799, United States Patent and Trademark Office, Board of Patent Appeals and Interferences.
Schrage Exhibit 1024, *Brown et al.* v. *Schrage et al.*, dated Jan. 19, 2012, Patent Interference No. 105,799, United States Patent and Trademark Office, Board of Patent Appeals and Interferences.
Schrage Exhibit 1025, *Brown et al.* v. *Schrage et al.*, dated Jan. 19, 2012, Patent Interference No. 105,799, United States Patent and Trademark Office, Board of Patent Appeals and Interferences.
Schrage Exhibit 1026, *Brown et al.* v. *Schrage et al.*, dated Jan. 19, 2012, Patent Interference No. 105,799, United States Patent and Trademark Office, Board of Patent Appeals and Interferences.
Schrage Exhibit 1027, *Brown et al.* v. *Schrage et al.*, dated Jan. 19, 2012, Patent Interference No. 105,799, United States Patent and Trademark Office, Board of Patent Appeals and Interferences.
Schrage Exhibit 1028, *Brown et al.* v. *Schrage et al.*, dated Jan. 19, 2012, Patent Interference No. 105,799, United States Patent and Trademark Office, Board of Patent Appeals and Interferences.
Schrage Exhibit 1029, *Brown et al.* v. *Schrage et al.*, dated Jan. 19, 2012, Patent Interference No. 105,799, United States Patent and Trademark Office, Board of Patent Appeals and Interferences.
Schrage Exhibit 1030, *Brown et al.* v. *Schrage et al.*, dated Jan. 19, 2012, Patent Interference No. 105,799, United States Patent and Trademark Office, Board of Patent Appeals and Interferences.
Schrage Exhibit 1031, *Brown et al.* v. *Schrage et al.*, dated Jan. 19, 2012, Patent Interference No. 105,799, United States Patent and Trademark Office, Board of Patent Appeals and Interferences.
Schrage Exhibit 1032, *Brown et al.* v. *Schrage et al.*, dated Jan. 19, 2012, Patent Interference No. 105,799, United States Patent and Trademark Office, Board of Patent Appeals and Interferences.
Order Transferring Interference, *Brown et al.* v. *Schrage et al.*, dated Jan. 26, 2012, Patent Interference No. 105,799, United States Patent and Trademark Office, Board of Patent Appeals and Interferences.
Brown Alphabetical Listing of Abbreviations, *Brown et al.* v. *Schrage et al.*, dated Jan. 26, 2012, Patent Interference No. 105,799, United States Patent and Trademark Office, Board of Patent Appeals and Interferences.
Brown Opposition to Moving into Evidence Annotated Claim Charts, *Brown et al.* v. *Schrage et al.*, dated Jan. 27, 2012, Patent Interference No. 105,799, United States Patent and Trademark Office, Board of Patent Appeals and Interferences.
Supplement to Interlocutory Order, *Brown et al.* v. *Schrage et al.*, dated Jan. 30, 2012, Patent Interference No. 105,799, United States Patent and Trademark Office, Board of Patent Appeals and Interferences.
Brown Response to Papers 286 and 283, *Brown et al.* v. *Schrage et al.*, dated Jan. 31, 2012, Patent Interference No. 105,799, United States Patent and Trademark Office, Board of Patent Appeals and Interferences.
Schrage Response to Interlocutory Order Paper 283, *Brown et al.* v. *Schrage et al.*, dated Jan. 31, 2012, Patent Interference No. 105,799, United States Patent and Trademark Office, Board of Patent Appeals and Interferences.
Brown Supplement to Brown Reply 2, *Brown et al.* v. *Schrage et al.*, dated Feb. 1, 2012, Patent Interference No. 105,799, United States Patent and Trademark Office, Board of Patent Appeals and Interferences.
Decision Admitting EX3001 and EX3002 in Evidence, *Brown et al.* v. *Schrage et al.*, dated Feb. 1, 2012, Patent Interference No. 105,799, United States Patent and Trademark Office, Board of Patent Appeals and Interferences.
Invitation for Input, *Brown et al.* v. *Schrage et al.*, dated Feb. 9, 2012, Patent Interference No. 105,799, United States Patent and Trademark Office, Board of Patent Appeals and Interferences.
Brown's Input in Response to Paper 291, *Brown et al.* v. *Schrage et al.*, dated Feb. 21, 2012, Patent Interference No. 105,799, United States Patent and Trademark Office, Board of Patent Appeals and Interferences.
Schrage Response to Invitation for Input Paper 291, *Brown et al.* v. *Schrage et al.*, dated Feb. 21, 2012, Patent Interference No. 105,799, United States Patent and Trademark Office, Board of Patent Appeals and Interferences.
Brown Reply to Schrage Input, *Brown et al.* v. *Schrage et al.*, dated Feb. 24, 2012, Patent Interference No. 105,799, United States Patent and Trademark Office, Board of Patent Appeals and Interferences.
Brown 37 C.F.R. 41.8(a)(2) Notice Oct. 22, 2011, *Brown et al.* v. *Schrage et al.*, dated Feb. 24, 2012, Patent Interference No. 105,799, United States Patent and Trademark Office, Board of Patent Appeals and Interferences.
Schrage Reply to Browns Input in Response to Paper 291, *Brown et al.* v. *Schrage et al.*, dated Feb. 24, 2012, Patent Interference No. 105,799, United States Patent and Trademark Office, Board of Patent Appeals and Interferences.
Order Miscellaneous BdR 104(a), *Brown et al.* v. *Schrage et al.*, dated Dec. 19, 2011, Patent Interference No. 105,799, United States Patent and Trademark Office, Board of Patent Appeals and Interferences.
EX 2189, *Brown et al.* v. *Schrage et al.*, dated Jan. 21, 2013, Patent Interference No. 105,799, United States Patent and Trademark Office, Board of Patent Appeals and Interferences.
EX 2191, *Brown et al.* v. *Schrage et al.*, dated Jan. 21, 2013, Patent Interference No. 105,799, United States Patent and Trademark Office, Board of Patent Appeals and Interferences.
EX 2192, *Brown et al.* v. *Schrage et al.*, dated Jan. 21, 2013, Patent Interference No. 105,799, United States Patent and Trademark Office, Board of Patent Appeals and Interferences.

EX 2193, *Brown et al.* v. *Schrage et al.*, dated Jan. 21, 2013, Patent Interference No. 105,799, United States Patent and Trademark Office, Board of Patent Appeals and Interferences.
EX 2194, *Brown et al.* v. *Schrage et al.*, dated Jan. 21, 2013, Patent Interference No. 105,799, United States Patent and Trademark Office, Board of Patent Appeals and Interferences.
EX 2195, *Brown et al.* v. *Schrage et al.*, dated Jan. 21, 2013, Patent Interference No. 105,799, United States Patent and Trademark Office, Board of Patent Appeals and Interferences.
EX 2196, *Brown et al.* v. *Schrage et al.*, dated Jan. 21, 2013, Patent Interference No. 105,799, United States Patent and Trademark Office, Board of Patent Appeals and Interferences.
EX 2197, *Brown et al.* v. *Schrage et al.*, dated Jan. 21, 2013, Patent Interference No. 105,799, United States Patent and Trademark Office, Board of Patent Appeals and Interferences.
EX 2198, *Brown et al.* v. *Schrage et al.*, dated Jan. 21, 2013, Patent Interference No. 105,799, United States Patent and Trademark Office, Board of Patent Appeals and Interferences.
EX 2199, *Brown et al.* v. *Schrage et al.*, dated Jan. 21, 2013, Patent Interference No. 105,799, United States Patent and Trademark Office, Board of Patent Appeals and Interferences.
EX 2200, *Brown et al.* v. *Schrage et al.*, dated Jan. 21, 2013, Patent Interference No. 105,799, United States Patent and Trademark Office, Board of Patent Appeals and Interferences.
EX 2201, *Brown et al.* v. *Schrage et al.*, dated Jan. 21, 2013, Patent Interference No. 105,799, United States Patent and Trademark Office, Board of Patent Appeals and Interferences.
EX 2202, *Brown et al.* v. *Schrage et al.*, dated Jan. 21, 2013, Patent Interference No. 105,799, United States Patent and Trademark Office, Board of Patent Appeals and Interferences.
EX 2203, *Brown et al.* v. *Schrage et al.*, dated Jan. 21, 2013, Patent Interference No. 105,799, United States Patent and Trademark Office, Board of Patent Appeals and Interferences.
EX 2204, *Brown et al.* v. *Schrage et al.*, dated Jan. 21, 2013, Patent Interference No. 105,799, United States Patent and Trademark Office, Board of Patent Appeals and Interferences.
EX 2205, *Brown et al.* v. *Schrage et al.*, dated Jan. 21, 2013, Patent Interference No. 105,799, United States Patent and Trademark Office, Board of Patent Appeals and Interferences.
EX 2206, *Brown et al.* v. *Schrage et al.*, dated Jan. 21, 2013, Patent Interference No. 105,799, United States Office, Board of Patent Appeals and Interferences.
EX 2207, *Brown et al.* v. *Schrage et al.*, dated Jan. 21, 2013, Patent Interference No. 105,799, United States Office, Board of Patent Appeals and Interferences.
EX 2208, *Brown et al.* v. *Schrage et al.*, dated Jan. 21, 2013, Patent Interference No. 105,799, United States Patent and Trademark Office, Board of Patent Appeals and Interferences.
EX 2209, *Brown et al.* v. *Schrage et al.*, dated Jan. 21, 2013, Patent Interference No. 105,799, United States Patent and Trademark Office, Board of Patent Appeals and Interferences.
EX 2210, *Brown et al.* v. *Schrage et al.*, dated Jan. 21, 2013, Patent Interference No. 105,799, United States Patent and Trademark Office, Board of Patent Appeals and Interferences.
EX 2211, *Brown et al.* v. *Schrage et al.*, dated Jan. 21, 2013, Patent Interference No. 105,799, United States Patent and Trademark Office, Board of Patent Appeals and Interferences.
EX 2212, *Brown et al.* v. *Schrage et al.*, dated Jan. 21, 2013, Patent Interference No. 105,799, United States Patent and Trademark Office, Board of Patent Appeals and Interferences.
EX 2213, *Brown et al.* v. *Schrage et al.*, dated Jan. 21, 2013, Patent Interference No. 105,799, United States Patent and Trademark Office, Board of Patent Appeals and Interferences.
EX 2214, *Brown et al.* v. *Schrage et al.*, dated Jan. 21, 2013, Patent Interference No. 105,799, United States Patent and Trademark Office, Board of Patent Appeals and Interferences.
EX 2215, *Brown et al.* v. *Schrage et al.*, dated Jan. 21, 2013, Patent Interference No. 105,799, United States Patent and Trademark Office, Board of Patent Appeals and Interferences.
EX 2216, *Brown et al.* v. *Schrage et al.*, dated Jan. 21, 2013, Patent Interference No. 105,799, United States Patent and Trademark Office, Board of Patent Appeals and Interferences.
EX 2217, *Brown et al.* v. *Schrage et al.*, dated Jan. 21, 2013, Patent Interference No. 105,799, United States Patent and Trademark Office, Board of Patent Appeals and Interferences.
EX 2218, *Brown et al.* v. *Schrage et al.*, dated Jan. 21, 2012, Patent Interference No. 105,799, United States Patent and Trademark Office, Board of Patent Appeals and Interferences.
EX 2219, *Brown et al.* v. *Schrage et al.*, dated Jan. 21, 2013, Patent Interference No. 105,799, United States Patent and Trademark Office, Board of Patent Appeals and Interferences.
EX 2220, *Brown et al.* v. *Schrage et al.*, dated Jan. 21, 2013, Patent Interference No. 105,799, United States Patent and Trademark Office, Board of Patent Appeals and Interferences.
EX 2221, *Brown et al.* v. *Schrage et al.*, dated Jan. 21, 2013, Patent Interference No. 105,799, United States Patent and Trademark Office, Board of Patent Appeals and Interferences.
EX 2222, *Brown et al.* v. *Schrage et al.*, dated Jan. 21, 2013, Patent Interference No. 105,799, United States Patent and Trademark Office, Board of Patent Appeals and Interferences.
EX 2223, *Brown et al.* v. *Schrage et al.*, dated Jan. 21, 2013, Patent Interference No. 105,799, United States Patent and Trademark Office, Board of Patent Appeals and Interferences.
EX 2224, *Brown et al.* v. *Schrage et al.*, dated Jan. 21, 2013, Patent Interference No. 105,799, United States Patent and Trademark Office, Board of Patent Appeals and Interferences.
EX 2225, *Brown et al.* v. *Schrage et al.*, dated Jan. 21, 2013, Patent Interference No. 105,799, United States Patent and Trademark Office, Board of Patent Appeals and Interferences.
EX 2226, *Brown et al.* v. *Schrage et al.*, dated Jan. 21, 2013, Patent Interference No. 105,799, United States Patent and Trademark Office, Board of Patent Appeals and Interferences.
EX 2227, *Brown et al.* v. *Schrage et al.*, dated Jan. 21, 2013, Patent Interference No. 105,799, United States Patent and Trademark Office, Board of Patent Appeals and Interferences.
EX 2228, *Brown et al.* v. *Schrage et al.*, dated Jan. 21, 2013, Patent Interference No. 105,799, United States Patent and Trademark Office, Board of Patent Appeals and Interferences.
EX 2229, *Brown et al.* v. *Schrage et al.*, dated Jan. 21, 2013, Patent Interference No. 105,799, United States Patent and Trademark Office, Board of Patent Appeals and Interferences.
EX 2230, *Brown et al.* v. *Schrage et al.*, dated Jan. 21, 2013, Patent Interference No. 105,799, United States Patent and Trademark Office, Board of Patent Appeals and Interferences.
EX 2231, *Brown et al.* v. *Schrage et al.*, dated Jan. 21, 2013, Patent Interference No. 105,799, United States Patent and Trademark Office, Board of Patent Appeals and Interferences.
EX 2232, *Brown et al.* v. *Schrage et al.*, dated Jan. 21, 2013, Patent Interference No. 105,799, United States Patent and Trademark Office, Board of Patent Appeals and Interferences.
EX 2233, *Brown et al.* v. *Schrage et al.*, dated Jan. 21, 2013, Patent Interference No. 105,799, United States Patent and Trademark Office, Board of Patent Appeals and Interferences.
EX 2234, *Brown et al.* v. *Schrage et al.*, dated Jan. 21, 2013, Patent Interference No. 105,799, United States Patent and Trademark Office, Board of Patent Appeals and Interferences.
EX 2235, *Brown et al.* v. *Schrage et al.*, dated Jan. 21, 2013, Patent Interference No. 105,799, United States Patent and Trademark Office, Board of Patent Appeals and Interferences.
EX 2236, *Brown et al.* v. *Schrage et al.*, dated Jan. 21, 2013, Patent Interference No. 105,799, United States Patent and Trademark Office, Board of Patent Appeals and Interferences.
EX 2237, *Brown et al.* v. *Schrage et al.*, dated Jan. 21, 2013, Patent Interference No. 105,799, United States Patent and Trademark Office, Board of Patent Appeals and Interferences.
EX 2238, *Brown et al.* v. *Schrage et al.*, dated Jan. 21, 2013, Patent Interference No. 105,799, United States Patent and Trademark Office, Board of Patent Appeals and Interferences.
EX 2239, *Brown et al.* v. *Schrage et al.*, dated Jan. 21, 2013, Patent Interference No. 105,799, United States Patent and Trademark Office, Board of Patent Appeals and Interferences.
EX 2139, *Brown et al.* v. *Schrage et al.*, dated Jan. 21, 2013, Patent Interference No. 105,799, United States Patent and Trademark Office, Board of Patent Appeals and Interferences.

EX 2140, *Brown et al.* v. *Schrage et al.*, dated Jan. 21, 2013, Patent Interference No. 105,799, United States Patent and Trademark Office, Board of Patent Appeals and Interferences.
EX 2141, *Brown et al.* v. *Schrage et al.*, dated Jan. 21, 2013, Patent Interference No. 105,799, United States Patent and Trademark Office, Board of Patent Appeals and Interferences.
EX 2142, *Brown et al.* v. *Schrage et al.*, dated Jan. 21, 2013, Patent Interference No. 105,799, United States Patent and Trademark Office, Board of Patent Appeals and Interferences.
EX 2143, *Brown et al.* v. *Schrage et al.*, dated Jan. 21, 2013, Patent Interference No. 105,799, United States Patent and Trademark Office, Board of Patent Appeals and Interferences.
EX 2144, *Brown et al.* v. *Schrage et al.*, dated Jan. 21, 2013, Patent Interference No. 105,799, United States Patent and Trademark Office, Board of Patent Appeals and Interferences.
EX 2145, *Brown et al.* v. *Schrage et al.*, dated Jan. 21, 2013, Patent Interference No. 105,799, United States Patent and Trademark Office, Board of Patent Appeals and Interferences.
EX 2146, *Brown et al.* v. *Schrage et al.*, dated Jan. 21, 2013, Patent Interference No. 105,799, United States Patent and Trademark Office, Board of Patent Appeals and Interferences.
EX 2147, *Brown et al.* v. *Schrage et al.*, dated Jan. 21, 2013, Patent Interference No. 105,799, United States Patent and Trademark Office, Board of Patent Appeals and Interferences.
EX 2148, *Brown et al.* v. *Schrage et al.*, dated Jan. 21, 2013, Patent Interference No. 105,799, United States Patent and Trademark Office, Board of Patent Appeals and Interferences.
EX 2149, *Brown et al.* v. *Schrage et al.*, dated Jan. 21, 2013, Patent Interference No. 105,799, United States Patent and Trademark Office, Board of Patent Appeals and Interferences.
EX 2150, *Brown et al.* v. *Schrage et al.*, dated Jan. 21, 2013, Patent Interference No. 105,799, United States Patent and Trademark Office, Board of Patent Appeals and Interferences.
EX 2151, *Brown et al.* v. *Schrage et al.*, dated Jan. 21, 2013, Patent Interference No. 105,799, United States Patent and Trademark Office, Board of Patent Appeals and Interferences.
EX 2152, *Brown et al.* v. *Schrage et al.*, dated Jan. 21, 2013, Patent Interference No. 105,799, United States Patent and Trademark Office, Board of Patent Appeals and Interferences.
EX 2153, *Brown et al.* v. *Schrage et al.*, dated Jan. 21, 2013, Patent Interference No. 105,799, United States Patent and Trademark Office, Board of Patent Appeals and Interferences.
EX 2154, *Brown et al.* v. *Schrage et al.*, dated Jan. 21, 2013, Patent Interference No. 105,799, United States Patent and Trademark Office, Board of Patent Appeals and Interferences.
EX 2155, *Brown et al.* v. *Schrage et al.*, dated Jan. 21, 2013, Patent Interference No. 105,799, United States Patent and Trademark Office, Board of Patent Appeals and Interferences.
EX 2156, *Brown et al.* v. *Schrage et al.*, dated Jan. 21, 2013, Patent Interference No. 105,799, United States Patent and Trademark Office, Board of Patent Appeals and Interferences.
EX 2157, *Brown et al.* v. *Schrage et al.*, dated Jan. 21, 2013, Patent Interference No. 105,799, United States Patent and Trademark Office, Board of Patent Appeals and Interferences.
EX 2158, *Brown et al.* v. *Schrage et al.*, dated Jan. 21, 2013, Patent Interference No. 105,799, United States Patent and Trademark Office, Board of Patent Appeals and Interferences.
EX 2159, *Brown et al.* v. *Schrage et al.*, dated Jan. 21, 2013, Patent Interference No. 105,799, United States Patent and Trademark Office, Board of Patent Appeals and Interferences.
EX 2160, *Brown et al.* v. *Schrage et al.*, dated Jan. 21, 2013, Patent Interference No. 105,799, United States Patent and Trademark Office, Board of Patent Appeals and Interferences.
EX 2161, *Brown et al.* v. *Schrage et al.*, dated Jan. 21, 2013, Patent Interference No. 105,799, United States Patent and Trademark Office, Board of Patent Appeals and Interferences.
EX 2162, *Brown et al.* v. *Schrage et al.*, dated Jan. 21, 2013, Patent Interference No. 105,799, United States Patent and Trademark Office, Board of Patent Appeals and Interferences.
EX 2163, *Brown et al.* v. *Schrage et al.*, dated Jan. 21, 2013, Patent Interference No. 105,799, United States Patent and Trademark Office, Board of Patent Appeals and Interferences.
EX 2164, *Brown et al.* v. *Schrage et al.*, dated Jan. 21, 2013, Patent Interference No. 105,799, United States Patent and Trademark Office, Board of Patent Appeals and Interferences.
EX 2165, *Brown et al.* v. *Schrage et al.*, dated Jan. 21, 2013, Patent Interference No. 105,799, United States Patent and Trademark Office, Board of Patent Appeals and Interferences.
EX 2166, *Brown et al.* v. *Schrage et al.*, dated Jan. 21, 2013, Patent Interference No. 105,799, United States Patent and Trademark Office, Board of Patent Appeals and Interferences.
EX 2167, *Brown et al.* v. *Schrage et al.*, dated Jan. 21, 2013, Patent Interference No. 105,799, United States Patent and Trademark Office, Board of Patent Appeals and Interferences.
EX 2168, *Brown et al.* v. *Schrage et al.*, dated Jan. 21, 2013, Patent Interference No. 105,799, United States Patent and Trademark Office, Board of Patent Appeals and Interferences.
EX 2169, *Brown et al.* v. *Schrage et al.*, dated Jan. 21, 2013, Patent Interference No. 105,799, United States Patent and Trademark Office, Board of Patent Appeals and Interferences.
EX 2170, *Brown et al.* v. *Schrage et al.*, dated Jan. 21, 2013, Patent Interference No. 105,799, United States Patent and Trademark Office, Board of Patent Appeals and Interferences.
EX 2171, *Brown et al.* v. *Schrage et al.*, dated Jan. 21, 2013, Patent Interference No. 105,799, United States Patent and Trademark Office, Board of Patent Appeals and Interferences.
EX 2172, *Brown et al.* v. *Schrage et al.*, dated Jan. 21, 2013, Patent Interference No. 105,799, United States Patent and Trademark Office, Board of Patent Appeals and Interferences.
EX 2173, *Brown et al.* v. *Schrage et al.*, dated Jan. 21, 2013, Patent Interference No. 105,799, United States Patent and Trademark Office, Board of Patent Appeals and Interferences.
EX 2174, *Brown et al.* v. *Schrage et al.*, dated Jan. 21, 2013, Patent Interference No. 105,799, United States Patent and Trademark Office, Board of Patent Appeals and Interferences.
EX 2175, *Brown et al.* v. *Schrage et al.*, dated Jan. 21, 2013, Patent Interference No. 105,799, United States Patent and Trademark Office, Board of Patent Appeals and Interferences.
EX 2176, *Brown et al.* v. *Schrage et al.*, dated Jan. 21, 2013, Patent Interference No. 105,799, United States Patent and Trademark Office, Board of Patent Appeals and Interferences.
EX 2177, *Brown et al.* v. *Schrage et al.*, dated Jan. 21, 2013, Patent Interference No. 105,799, United States Patent and Trademark Office, Board of Patent Appeals and Interferences.
EX 2178, *Brown et al.* v. *Schrage et al.*, dated Jan. 21, 2013, Patent Interference No. 105,799, United States Patent and Trademark Office, Board of Patent Appeals and Interferences.
EX 2179, *Brown et al.* v. *Schrage et al.*, dated Jan. 21, 2013, Patent Interference No. 105,799, United States Patent and Trademark Office, Board of Patent Appeals and Interferences.
EX 2180, *Brown et al.* v. *Schrage et al.*, dated Jan. 21, 2013, Patent Interference No. 105,799, United States Patent and Trademark Office, Board of Patent Appeals and Interferences.
EX 2181, *Brown et al.* v. *Schrage et al.*, dated Jan. 21, 2013, Patent Interference No. 105,799, United States Patent and Trademark Office, Board of Patent Appeals and Interferences.
EX 2182, *Brown et al.* v. *Schrage et al.*, dated Jan. 21, 2013, Patent Interference No. 105,799, United States Patent and Trademark Office, Board of Patent Appeals and Interferences.
EX 2183, *Brown et al.* v. *Schrage et al.*, dated Jan. 21, 2013, Patent Interference No. 105,799, United States Patent and Trademark Office, Board of Patent Appeals and Interferences.
EX 2184, *Brown et al.* v. *Schrage et al.*, dated Jan. 21, 2013, Patent Interference No. 105,799, United States Patent and Trademark Office, Board of Patent Appeals and Interferences.
EX 2185, *Brown et al.* v. *Schrage et al.*, dated Jan. 21, 2013, Patent Interference No. 105,799, United States Patent and Trademark Office, Board of Patent Appeals and Interferences.
EX 2186, *Brown et al.* v. *Schrage et al.*, dated Jan. 21, 2013, Patent Interference No. 105,799, United States Patent and Trademark Office, Board of Patent Appeals and Interferences.
EX 2187, *Brown et al.* v. *Schrage et al.*, dated Jan. 21, 2013, Patent Interference No. 105,799, United States Patent and Trademark Office, Board of Patent Appeals and Interferences.

EX 2188, *Brown et al.* v. *Schrage et al.*, dated Jan. 21, 2013, Patent Interference No. 105,799, United States Patent and Trademark Office, Board of Patent Appeals and Interferences.
EX 2290, *Brown et al.* v. *Schrage et al.*, dated Jan. 21, 2013, Patent Interference No. 105,799, United States Patent and Trademark Office, Board of Patent Appeals and Interferences.
EX 2291, *Brown et al.* v. *Schrage et al.*, dated Jan. 21, 2013, Patent Interference No. 105,799, United States Patent and Trademark Office, Board of Patent Appeals and Interferences.
EX 2292, *Brown et al.* v. *Schrage et al.*, dated Jan. 21, 2013, Patent Interference No. 105,799, United States Patent and Trademark Office, Board of Patent Appeals and Interferences.
EX 2293, *Brown et al.* v. *Schrage et al.*, dated Jan. 21, 2013, Patent Interference No. 105,799, United States Patent and Trademark Office, Board of Patent Appeals and Interferences.
EX 2294, *Brown et al.* v. *Schrage et al.*, dated Jan. 21, 2013, Patent Interference No. 105,799, United States Patent and Trademark Office, Board of Patent Appeals and Interferences.
EX 2295, *Brown et al.* v. *Schrage et al.*, dated Jan. 21, 2013, Patent Interference No. 105,799, United States Patent and Trademark Office, Board of Patent Appeals and Interferences.
EX 2296, *Brown et al.* v. *Schrage et al.*, dated Jan. 21, 2013, Patent Interference No. 105,799, United States Patent and Trademark Office, Board of Patent Appeals and Interferences.
EX 2297, *Brown et al.* v. *Schrage et al.*, dated Jan. 21, 2013, Patent Interference No. 105,799, United States Patent and Trademark Office, Board of Patent Appeals and Interferences.
EX 2298, *Brown et al.* v. *Schrage et al.*, dated Jan. 21, 2013, Patent Interference No. 105,799, United States Patent and Trademark Office, Board of Patent Appeals and Interferences.
EX 2299, *Brown et al.* v. *Schrage et al.*, dated Jan. 21, 2013, Patent Interference No. 105,799, United States Patent and Trademark Office, Board of Patent Appeals and Interferences.
EX 2300, *Brown et al.* v. *Schrage et al.*, dated Jan. 21, 2013, Patent Interference No. 105,799, United States Patent and Trademark Office, Board of Patent Appeals and Interferences.
EX 2301, *Brown et al.* v. *Schrage et al.*, dated Jan. 21, 2013, Patent Interference No. 105,799, United States Patent and Trademark Office, Board of Patent Appeals and Interferences.
EX 2302, *Brown et al.* v. *Schrage et al.*, dated Jan. 21, 2013, Patent Interference No. 105,799, United States Patent and Trademark Office, Board of Patent Appeals and Interferences.
EX 2303, *Brown et al.* v. *Schrage et al.*, dated Jan. 21, 2013, Patent Interference No. 105,799, United States Patent and Trademark Office, Board of Patent Appeals and Interferences.
EX 2304, *Brown et al.* v. *Schrage et al.*, dated Jan. 21, 2013, Patent Interference No. 105,799, United States Patent and Trademark Office, Board of Patent Appeals and Interferences.
EX 2305, *Brown et al.* v. *Schrage et al.*, dated Jan. 21, 2013, Patent Interference No. 105,799, United States Patent and Trademark Office, Board of Patent Appeals and Interferences.
EX 2306, *Brown et al.* v. *Schrage et al.*, dated Jan. 21, 2013, Patent Interference No. 105,799, United States Patent and Trademark Office, Board of Patent Appeals and Interferences.
EX 2307, *Brown et al.* v. *Schrage et al.*, dated Jan. 21, 2013, Patent Interference No. 105,799, United States Patent and Trademark Office, Board of Patent Appeals and Interferences.
EX 2308, *Brown et al.* v. *Schrage et al.*, dated Jan. 21, 2013, Patent Interference No. 105,799, United States Patent and Trademark Office, Board of Patent Appeals and Interferences.
EX 2309, *Brown et al.* v. *Schrage et al.*, dated Jan. 21, 2013, Patent Interference No. 105,799, United States Patent and Trademark Office, Board of Patent Appeals and Interferences.
EX 2310, *Brown et al.* v. *Schrage et al.*, dated Jan. 21, 2013, Patent Interference No. 105,799, United States Patent and Trademark Office, Board of Patent Appeals and Interferences.
EX 2311, *Brown et al.* v. *Schrage et al.*, dated Jan. 21, 2013, Patent Interference No. 105,799, United States Patent and Trademark Office, Board of Patent Appeals and Interferences.
EX 2312, *Brown et al.* v. *Schrage et al.*, dated Jan. 21, 2013, Patent Interference No. 105,799, United States Patent and Trademark Office, Board of Patent Appeals and Interferences.
EX 2313, *Brown et al.* v. *Schrage et al.*, dated Jan. 21, 2013, Patent Interference No. 105,799, United States Patent and Trademark Office, Board of Patent Appeals and Interferences.
EX 2314, *Brown et al.* v. *Schrage et al.*, dated Jan. 21, 2013, Patent Interference No. 105,799, United States Patent and Trademark Office, Board of Patent Appeals and Interferences.
EX 2315, *Brown et al.* v. *Schrage et al.*, dated Jan. 21, 2013, Patent Interference No. 105,799, United States Patent and Trademark Office, Board of Patent Appeals and Interferences.
EX 2316, *Brown et al.* v. *Schrage et al.*, dated Jan. 21, 2013, Patent Interference No. 105,799, United States Patent and Trademark Office, Board of Patent Appeals and Interferences.
EX 2317, *Brown et al.* v. *Schrage et al.*, dated Jan. 21, 2013, Patent Interference No. 105,799, United States Patent and Trademark Office, Board of Patent Appeals and Interferences.
EX 2318, *Brown et al.* v. *Schrage et al.*, dated Jan. 21, 2013, Patent Interference No. 105,799, United States Patent and Trademark Office, Board of Patent Appeals and Interferences.
EX 2319, *Brown et al.* v. *Schrage et al.*, dated Jan. 21, 2013, Patent Interference No. 105,799, United States Patent and Trademark Office, Board of Patent Appeals and Interferences.
EX 2320, *Brown et al.* v. *Schrage et al.*, dated Jan. 21, 2013, Patent Interference No. 105,799, United States Patent and Trademark Office, Board of Patent Appeals and Interferences.
EX 2321, *Brown et al.* v. *Schrage et al.*, dated Jan. 21, 2013, Patent Interference No. 105,799, United States Patent and Trademark Office, Board of Patent Appeals and Interferences.
EX 2322, *Brown et al.* v. *Schrage et al.*, dated Jan. 21, 2013, Patent Interference No. 105,799, United States Patent and Trademark Office, Board of Patent Appeals and Interferences.
EX 2323, *Brown et al.* v. *Schrage et al.*, dated Jan. 21, 2013, Patent Interference No. 105,799, United States Patent and Trademark Office, Board of Patent Appeals and Interferences.
EX 2324, *Brown et al.* v. *Schrage et al.*, dated Jan. 21, 2013, Patent Interference No. 105,799, United States Patent and Trademark Office, Board of Patent Appeals and Interferences.
EX 2325, *Brown et al.* v. *Schrage et al.*, dated Jan. 21, 2013, Patent Interference No. 105,799, United States Patent and Trademark Office, Board of Patent Appeals and Interferences.
EX 2326, *Brown et al.* v. *Schrage et al.*, dated Jan. 21, 2013, Patent Interference No. 105,799, United States Patent and Trademark Office, Board of Patent Appeals and Interferences.
EX 2327, *Brown et al.* v. *Schrage et al.*, dated Jan. 21, 2013, Patent Interference No. 105,799, United States Patent and Trademark Office, Board of Patent Appeals and Interferences.
EX 2328, *Brown et al.* v. *Schrage et al.*, dated Jan. 21, 2013, Patent Interference No. 105,799, United States Patent and Trademark Office, Board of Patent Appeals and Interferences.
EX 2329, *Brown et al.* v. *Schrage et al.*, dated Jan. 21, 2013, Patent Interference No. 105,799, United States Patent and Trademark Office, Board of Patent Appeals and Interferences.
EX 2330, *Brown et al.* v. *Schrage et al.*, dated Jan. 21, 2013, Patent Interference No. 105,799, United States Patent and Trademark Office, Board of Patent Appeals and Interferences.
EX 2331, *Brown et al.* v. *Schrage et al.*, dated Jan. 21, 2013, Patent Interference No. 105,799, United States Patent and Trademark Office, Board of Patent Appeals and Interferences.
EX 2332 *Brown et al.* v. *Schrage et al.*, dated Jan. 21, 2013, Patent Interference No. 105,799, United States Patent and Trademark Office, Board of Patent Appeals and Interferences.
EX 2333, *Brown et al.* v. *Schrage et al.*, dated Jan. 21, 2013, Patent Interference No. 105,799, United States Patent and Trademark Office, Board of Patent Appeals and Interferences.
EX 2334, *Brown et al.* v. *Schrage et al.*, dated Jan. 21, 2013, Patent Interference No. 105,799, United States Patent and Trademark Office, Board of Patent Appeals and Interferences.
EX 2335, *Brown et al.* v. *Schrage et al.*, dated Jan. 21, 2013, Patent Interference No. 105,799, United States Patent and Trademark Office, Board of Patent Appeals and Interferences.
EX 2336, *Brown et al.* v. *Schrage et al.*, dated Jan. 21, 2013, Patent Interference No. 105,799, United States Patent and Trademark Office, Board of Patent Appeals and Interferences.

EX 2337, *Brown et al.* v. *Schrage et al.*, dated Jan. 21, 2013, Patent Interference No. 105,799, United States Patent and Trademark Office, Board of Patent Appeals and Interferences.
EX 2338, *Brown et al.* v. *Schrage et al.*, dated Jan. 21, 2013, Patent Interference No. 105,799, United States Patent and Trademark Office, Board of Patent Appeals and Interferences.
EX 2389, *Brown et al.* v. *Schrage et al.*, dated Jan. 21, 2013, Patent Interference No. 105,799, United States Patent and Trademark Office, Board of Patent Appeals and Interferences.
EX 2390, *Brown et al.* v. *Schrage et al.*, dated Jan. 21, 2013, Patent Interference No. 105,799, United States Patent and Trademark Office, Board of Patent Appeals and Interferences.
EX 2391, *Brown et al.* v. *Schrage et al.*, dated Jan. 21, 2013, Patent Interference No. 105,799, United States Patent and Trademark Office, Board of Patent Appeals and Interferences.
EX 2392, *Brown et al.* v. *Schrage et al.*, dated Jan. 21, 2013, Patent Interference No. 105,799, United States Patent and Trademark Office, Board of Patent Appeals and Interferences.
EX 2393, *Brown et al.* v. *Schrage et al.*, dated Jan. 21, 2013, Patent Interference No. 105,799, United States Patent and Trademark Office, Board of Patent Appeals and Interferences.
EX 2394, *Brown et al.* v. *Schrage et al.*, dated Jan. 21, 2013, Patent Interference No. 105,799, United States Patent and Trademark Office, Board of Patent Appeals and Interferences.
EX 2395, *Brown et al.* v. *Schrage et al.*, dated Jan. 21, 2013, Patent Interference No. 105,799, United States Patent and Trademark Office, Board of Patent Appeals and Interferences.
EX 2396, *Brown et al.* v. *Schrage et al.*, dated Jan. 21, 2013, Patent Interference No. 105,799, United States Patent and Trademark Office, Board of Patent Appeals and Interferences.
EX 2397, *Brown et al.* v. *Schrage et al.*, dated Jan. 21, 2013, Patent Interference No. 105,799, United States Patent and Trademark Office, Board of Patent Appeals and Interferences.
Schrage Exhibit List as of Jan. 22, 2013, *Brown et al.* v. *Schrage et al.*, dated Jan. 22, 2013, Patent Interference No. 105,799, United States Patent and Trademark Office, Board of Patent Appeals and Interferences.
Schrage Exhibit 1127, *Brown et al.* v. *Schrage et al.*, dated Jan. 22, 2013, Patent Interference No. 105,799, United States Patent and Trademark Office, Board of Patent Appeals and Interferences.
Schrage Opposition 12, *Brown et al.* v. *Schrage et al.*, dated Jan. 22, 2013, Patent Interference No. 105,799, United States Patent and Trademark Office, Board of Patent Appeals and Interferences.
Schrage Submission of Record, *Brown et al.* v. *Schrage et al.*, dated Jan. 25, 2013, Patent Interference No. 105,799, United States Patent and Trademark Office, Board of Patent Appeals and Interferences.
Schrage Exhibit List as of Jan. 25, 2013, *Brown et al.* v. *Schrage et al.*, dated Jan. 25, 2013, Patent Interference No. 105,799, United States Patent and Trademark Office, Board of Patent Appeals and Interferences.
Schrage Corrected List of Issues to be Considered, B*Brown et al.* v. *Schrage et al.*, dated Jan. 25, 2013, Patent Interference No. 105,799, United States Patent and Trademark Office, Board of Patent Appeals and Interferences.
Brown Priority Record Filing and Service, *Brown et al.* v. *Schrage et al.*, dated Jan. 25, 2013, Patent Interference No. 105,799, United States Patent and Trademark Office, Board of Patent Appeals and Interferences.
Brown Notice of Related Proceedings (Updated), *Brown et al.* v. *Schrage et al.*, dated Apr. 1, 2013, Patent Interference No. 105,799, United States Patent and Trademark Office, Board of Patent Appeals and Interferences.
Order Miscellaneous Bd.R. 104(a) Transferring Interference, *Brown et al.* v. *Schrage et al.*, dated Apr. 5, 2013, Patent Interference No. 105,799, United States Patent and Trademark Office, Board of Patent Appeals and Interferences.
Order Oral Argument Bd.R. 124, *Brown et al.* v. *Schrage et al.*, dated Apr. 10, 2013, Patent Interference No. 105,799, United States Patent and Trademark Office, Board of Patent Appeals and Interferences.
Order Oral Argument Bd.R.124, *Brown et al.* v. *Schrage et al.*, dated Apr. 12, 2013, Patent Interference No. 105,799, United States Patent and Trademark Office, Board of Patent Appeals and Interferences.

Brown Demonstrative Exhibits, *Brown et al.* v. *Schrage et al.*, dated May 2, 2013, Patent Interference No. 105,799, United States Patent and Trademark Office, Board of Patent Appeals and Interferences.
Schrage Demonstratives 1-19 for Oral Hearing May 9, 2013, *Brown et al.* v. *Schrage et al.*, dated May 2, 2013, Patent Interference No. 105,799, United States Patent and Trademark Office, Board of Patent Appeals and Interferences.
EX 2190, *Brown et al.* v. *Schrage et al.*, dated Jan. 21, 2013, Patent Interference No. 105,799, United States Patent and Trademark Office, Board of Patent Appeals and Interferences.
Schrage Exhibit 1054, *Brown et al.* v. *Schrage et al.*, dated Jul. 9, 2013, Patent Interference No. 105,799, United States Patent and Trademark Office, Board of Patent Appeals and Interferences.
Decision on Motions, *Brown et al.* v. *Schrage et al.*, dated Mar. 23, 2012, Patent Interference No. 105,799, United States Patent and Trademark Office, Board of Patent Appeals and Interferences.
First Redeclaration Order, *Brown et al.* v. *Schrage et al.*, dated Mar. 23, 2012, Patent Interference No. 105,799, United States Patent and Trademark Office, Board of Patent Appeals and Interferences.
Order Setting Conference Call, *Brown et al.* v. *Schrage et al.*, dated Mar. 23, 2012, Patent Interference No. 105,799, United States Patent and Trademark Office, Board of Patent Appeals and Interferences.
Brown Request for Rehearing on Paper 297, *Brown et al.* v. *Schrage et al.*, dated Mar. 30, 2012, Patent Interference No. 105,799, United States Patent and Trademark Office, Board of Patent Appeals and Interferences.
Post Conference Call Order, *Brown et al.* v. *Schrage et al.*, dated Apr. 4, 2012, Patent Interference No. 105,799, United States Patent and Trademark Office, Board of Patent Appeals and Interferences.
Schrage Request for Rehearing, *Brown et al.* v. *Schrage et al.*, dated Apr. 6, 2012, Patent Interference No. 105,799, United States Patent and Trademark Office, Board of Patent Appeals and Interferences.
Brown Request for Rehearing on Paper 301, *Brown et al.* v. *Schrage et al.*, dated Apr. 10, 2012, Patent Interference No. 105,799, United States Patent and Trademark Office, Board of Patent Appeals and Interferences.
Order, *Brown et al.* v. *Schrage et al.*, dated Apr. 10, 2012, Patent Interference No. 105,799, United States Patent and Trademark Office, Board of Patent Appeals and Interferences.
Memorandum Opinion and Order, *Brown et al.* v. *Schrage et al.*, dated Apr. 13, 2012, Patent Interference No. 105,799, United States Patent and Trademark Office, Board of Patent Appeals and Interferences.
Communication, *Brown et al.* v. *Schrage et al.*, dated Apr. 13, 2012, Patent Interference No. 105,799, United States Patent and Trademark Office, Board of Patent Appeals and Interferences.
Brown Motion 9, *Brown et al.* v. *Schrage et al.*, dated Apr. 18, 2012, Patent Interference No. 105,799, United States Patent and Trademark Office, Board of Patent Appeals and Interferences.
Brown37 CFR 41.106(f) Certificate of Service of Exhibits Apr. 18, 2012, *Brown et al.* v. *Schrage et al.*, dated Apr. 18, 2012, Patent Interference No. 105,799, United States Patent and Trademark Office, Board of Patent Appeals and Interferences.
Order, *Brown et al.* v. *Schrage et al.*, dated Apr. 19, 2012, Patent Interference No. 105,799, United States Patent and Trademark Office, Board of Patent Appeals and Interferences.
Brown Motion 10, *Brown et al.* v. *Schrage et al.*, dated Apr. 23, 2012, Patent Interference No. 105,799, United States Patent and Trademark Office, Board of Patent Appeals and Interferences.
Brown37 CFR 41.106(f) Certificate of Service of Exhibits Apr. 22, 2012, *Brown et al.* v. *Schrage et al.*, dated Apr. 23, 2012, Patent Interference No. 105,799, United States Patent and Trademark Office, Board of Patent Appeals and Interferences.
Order, *Brown et al.* v. *Schrage et al.*, dated Apr. 23, 2012, Patent Interference No. 105,799, United States Patent and Trademark Office, Board of Patent Appeals and Interferences.
Brown Motion 10 Supplement, *Brown et al.* v. *Schrage et al.*, dated Apr. 24, 2012, Patent Interference No. 105,799, United States Patent and Trademark Office, Board of Patent Appeals and Interferences.
Brown SO 8.2 Notice Apr. 24, 2012, *Brown et al.* v. *Schrage et al.*, dated Apr. 25, 2012, Patent Interference No. 105,799, United States Patent and Trademark Office, Board of Patent Appeals and Interferences.

Brown 37 CFR 41.8 Mandatory Notice Apr. 29, 2012, *Brown et al. v. Schrage et al.*, dated Apr. 29, 2012, Patent Interference No. 105,799, United States Patent and Trademark Office, Board of Patent Appeals and Interferences.

Brown37 CFR 41.106(f) Certificate of Service of Exhibits Apr. 22, 2012, *Brown et al. v. Schrage et al.*, dated Apr. 29, 2012, Patent Interference No. 105,799, United States Patent and Trademark Office, Board of Patent Appeals and Interferences.

Schrage Exhibit List as of Apr. 30, 2012, *Brown et al. v. Schrage et al.*, dated Apr. 30, 2012, Patent Interference No. 105,799, United States Patent and Trademark Office, Board of Patent Appeals and Interferences.

Schrage Exhibit 1033, *Brown et al. v. Schrage et al.*, dated Apr. 30, 2012, Patent Interference No. 105,799, United States Patent and Trademark Office, Board of Patent Appeals and Interferences.

Schrage Exhibit 1034, *Brown et al. v. Schrage et al.*, dated Apr. 30, 2012, Patent Interference No. 105,799, United States Patent and Trademark Office, Board of Patent Appeals and Interferences.

Schrage Exhibit 1035, *Brown et al. v. Schrage et al.*, dated Apr. 30, 2012, Patent Interference No. 105,799, United States Patent and Trademark Office, Board of Patent Appeals and Interferences.

Schrage Exhibit 1036, *Brown et al. v. Schrage et al.*, dated Apr. 30, 2012, Patent Interference No. 105,799, United Office, Board of Patent Appeals and Interferences.

Schrage Exhibit 1037, *Brown et al. v. Schrage et al.*, dated Apr. 30, 2012, Patent Interference No. 105,799, United States Patent and Trademark Office, Board of Patent Appeals and Interferences.

Schrage Exhibit 1038, *Brown et al. v. Schrage et al.*, dated Apr. 30, 2012, Patent Interference No. 105,799, United States Patent and Trademark Office, Board of Patent Appeals and Interferences.

Schrage Opposition 10, *Brown et al. v. Schrage et al.*, dated Apr. 30, 2012, Patent Interference No. 105,799, United States Patent and Trademark Office, Board of Patent Appeals and Interferences.

Brown Notice of Service of Objections to EX 1033-1038, *Brown et al. v. Schrage et al.*, dated May 2, 2012, Patent Interference No. 105,799, United States Patent and Trademark Office, Board of Patent Appeals and Interferences.

Order Times for Priority Phase and Second Redeclaration, *Brown et al. v. Schrage et al.*, dated May 7, 2012, Patent Interference No. 105,799, United States Patent and Trademark Office, Board of Patent Appeals and Interferences.

Brown Supplement to Request for Rehearing, *Brown et al. v. Schrage et al.*, dated Jun. 7, 2012, Patent Interference No. 105,799, United States Patent and Trademark Office, Board of Patent Appeals and Interferences.

Schrage Notice of Change in Schedule, *Brown et al. v. Schrage et al.*, dated Jun. 22, 2012, Patent Interference No. 105,799, United States Patent and Trademark Office, Board of Patent Appeals and Interferences.

Schrage Motion 11, *Brown et al. v. Schrage et al.*, dated Jul. 9, 2012, Patent Interference No. 105,799, United States Patent and Trademark Office, Board of Patent Appeals and Interferences.

Schrage Motion 12, *Brown et al. v. Schrage et al.*, dated Jul. 9, 2012, Patent Interference No. 105,799, United States Patent and Trademark Office, Board of Patent Appeals and Interferences.

Schrage Exhibit List as of Jul. 9, 2012, *Brown et al. v. Schrage et al.*, dated Jul. 9, 2012, Patent Interference No. 105,799, United States Patent and Trademark Office, Board of Patent Appeals and Interferences.

Schrage Exhibit 1039, *Brown et al. v. Schrage et al.*, dated Jul. 9, 2012, Patent Interference No. 105,799, United States Patent and Trademark Office, Board of Patent Appeals and Interferences.

Schrage Exhibit 1040, *Brown et al. v. Schrage et al.*, dated Jul. 9, 2012, Patent Interference No. 105,799, United States Patent and Trademark Office, Board of Patent Appeals and Interferences.

Schrage Exhibit 1041, *Brown et al. v. Schrage et al.*, dated Jul. 9, 2012, Patent Interference No. 105,799, United States Patent and Trademark Office, Board of Patent Appeals and Interferences.

Schrage Exhibit 1042, *Brown et al. v. Schrage et al.*, dated Jul. 9, 2012, Patent Interference No. 105,799, United States Patent and Trademark Office, Board of Patent Appeals and Interferences.

Schrage Exhibit 1043, *Brown et al. v. Schrage et al.*, dated Jul. 9, 2012, Patent Interference No. 105,799, United States Patent and Trademark Office, Board of Patent Appeals and Interferences.

Schrage Exhibit 1044, *Brown et al. v. Schrage et al.*, dated Jul. 9, 2012, Patent Interference No. 105,799, United States Patent and Trademark Office, Board of Patent Appeals and Interferences.

Schrage Exhibit 1045, *Brown et al. v. Schrage et al.*, dated Jul. 9, 2012, Patent Interference No. 105,799, United States Patent and Trademark Office, Board of Patent Appeals and Interferences.

Schrage Exhibit 1046, *Brown et al. v. Schrage et al.*, dated Jul. 9, 2012, Patent Interference No. 105,799, United States Patent and Trademark Office, Board of Patent Appeals and Interferences.

Schrage Exhibit 1047, *Brown et al. v. Schrage et al.*, dated Jul. 9, 2012, Patent Interference No. 105,799, United States Patent and Trademark Office, Board of Patent Appeals and Interferences.

Schrage Exhibit 1048, *Brown et al. v. Schrage et al.*, dated Jul. 9, 2012, Patent Interference No. 105,799, United States Patent and Trademark Office, Board of Patent Appeals and Interferences.

Schrage Exhibit 1049, *Brown et al. v. Schrage et al.*, dated Jul. 9, 2012, Patent Interference No. 105,799, United States Patent and Trademark Office, Board of Patent Appeals and Interferences.

Schrage Exhibit 1050, *Brown et al. v. Schrage et al.*, dated Jul. 9, 2012, Patent Interference No. 105,799, United States Patent and Trademark Office, Board of Patent Appeals and Interferences.

Schrage Exhibit 1051, *Brown et al. v. Schrage et al.*, dated Jul. 9, 2012, Patent Interference No. 105,799, United States Patent and Trademark Office, Board of Patent Appeals and Interferences.

Schrage Exhibit 1052, *Brown et al. v. Schrage et al.*, dated Jul. 9, 2012, Patent Interference No. 105,799, United States Patent and Trademark Office, Board of Patent Appeals and Interferences.

Schrage Exhibit 1053, *Brown et al. v. Schrage et al.*, dated Jul. 9, 2012, Patent Interference No. 105,799, United States Patent and Trademark Office, Board of Patent Appeals and Interferences.

Schrage Exhibit 1105, *Brown et al. v. Schrage et al.*, dated Jul. 9, 2012, Patent Interference No. 105,799, United States Patent and Trademark Office, Board of Patent Appeals and Interferences.

37 CFR 1.646(e) Certificate of Service, *Brown et al. v. Schrage et al.*, dated Jul. 16, 2012, Patent Interference No. 105,799, United States Patent and Trademark Office, Board of Patent Appeals and Interferences.

37 CFR 1.646(e) Certificate of Service, *Brown et al. v. Schrage et al.*, dated Jul. 19, 2012, Patent Interference No. 105,799, United States Patent and Trademark Office, Board of Patent Appeals and Interferences.

Order Miscellaneous Bd.R. 104(a) Transferring Interference, *Brown et al. v. Schrage et al.*, dated Jul. 23, 2012, Patent Interference No. 105,799, United States Patent and Trademark Office, Board of Patent Appeals and Interferences.

Brown Request for Rehearing, *Brown et al. v. Schrage et al.*, dated Jul. 27, 2012, Patent Interference No. 105,799, United States Patent and Trademark Office, Board of Patent Appeals and Interferences.

Order Miscellaneous Bd.R. 104(a), *Brown et al. v. Schrage et al.*, dated Jul. 27, 2012, Patent Interference No. 105,799, United States Patent and Trademark Office, Board of Patent Appeals and Interferences.

Brown Motion 11, *Brown et al. v. Schrage et al.*, dated Aug. 16, 2012, Patent Interference No. 105,799, United States Patent and Trademark Office, Board of Patent Appeals and Interferences.

Brown 37 CFR 41.106(f) Certificate for Exhibits 2137-2336, *Brown et al. v. Schrage et al.*, dated Aug. 16, 2012, Patent Interference No. 105,799, United States Patent and Trademark Office, Board of Patent Appeals and Interferences.

Brown Response to the Schrage Request for Rehearing, *Brown et al. v. Schrage et al.*, dated Aug. 20, 2012, Patent Interference No. 105,799, United States Patent and Trademark Office, Board of Patent Appeals and Interferences.

Schrage Reply to Brown's Request for Rehearing on Paper 297, *Brown et al. v. Schrage et al.*, dated Aug. 21, 2012, Patent Interference No. 105,799, United States Patent and Trademark Office, Board of Patent Appeals and Interferences.

Schrage Reply to Brown's Request for Rehearing on Paper 301, *Brown et al.* v. *Schrage et al.*, dated Aug. 21, 2012, Patent Interference No. 105,799, United States Patent and Trademark Office, Board of Patent Appeals and Interferences.

Schrage Reply to Brown's Supplement to Request for Rehearing on Paper 327, *Brown et al.* v. *Schrage et al.*, dated Aug. 21, 2012, Patent Interference No. 105,799, United States Patent and Trademark Office, Board of Patent Appeals and Interferences.

Schrage Certificate of Service of Objections (37 CFR 1.646(e)), *Brown et al.* v. *Schrage et al.*, dated Aug. 23, 2012, Patent Interference No. 105,799, United States Patent and Trademark Office, Board of Patent Appeals and Interferences.

Decision on Request for Rehearing Bd.R. 125(c), *Brown et al.* v. *Schrage et al.*, dated Aug. 31, 2012, Patent Interference No. 105,799, United States Patent and Trademark Office, Board of Patent Appeals and Interferences.

Brown 37 CFR 41.157(c)(4) Notice of Deposition of 7 Witnesses, *Brown et al.* v. *Schrage et al.*, dated Sep. 6, 2012, Patent Interference No. 105,799, United States Patent and Trademark Office, Board of Patent Appeals and Interferences.

Brown 37 CFR 41.106(f) Certificate of Service of Exhibits Sep. 6, 2012, *Brown et al.* v. *Schrage et al.*, dated Sep. 6, 2012, Patent Interference No. 105,799, United States Patent and Trademark Office, Board of Patent Appeals and Interferences.

Brown 37 CFR 41.157(c)(4) Notice of Canceled Depositions, *Brown et al.* v. *Schrage et al.*, dated Sep. 8, 2012, Patent Interference No. 105,799, United States Patent and Trademark Office, Board of Patent Appeals and Interferences.

Joint Stipulation of Change in Schedule, *Brown et al.* v. *Schrage et al.*, dated Sep. 11, 2012, Patent Interference No. 105,799, United States Patent and Trademark Office, Board of Patent Appeals and Interferences.

Schrage Substitute Designation of Lead and Backup Counsel, *Brown et al.* v. *Schrage et al.*, dated Sep. 12, 2012, Patent Interference No. 105,799, United States Patent and Trademark Office, Board of Patent Appeals and Interferences.

Schrage Certificate of Service of Objections (37 CFR 1.646(e)), *Brown et al.* v. *Schrage et al.*, dated Sep. 13, 2012, Patent Interference No. 105,799, United States Patent and Trademark Office, Board of Patent Appeals and Interferences.

Brown Second Notice of Deposition of 7 Witnesses, *Brown et al.* v. *Schrage et al.*, dated Sep. 14, 2012, Patent Interference No. 105,799, United States Patent and Trademark Office, Board of Patent Appeals and Interferences.

Schrage 37 CFR 41.157(c)(4) Notice of Deposition of 8 Witnesses, *Brown et al.* v. *Schrage et al.*, dated Sep. 14, 2012, Patent Interference No. 105,799, United States Patent and Trademark Office, Board of Patent Appeals and Interferences.

Brown Notice of Service of Supplement to Evidence, *Brown et al.* v. *Schrage et al.*, dated Sep. 19, 2012, Patent Interference No. 105,799, United States Patent and Trademark Office, Board of Patent Appeals and Interferences.

Schrage Notice of Deposition of Gene Brown, *Brown et al.* v. *Schrage et al.*, dated Oct. 9, 2012, Patent Interference No. 105,799, United States Patent and Trademark Office, Board of Patent Appeals and Interferences.

Schrage Notice of Deposition of Andrew Heinisch, *Brown et al.* v. *Schrage et al.*, dated Oct. 10, 2012, Patent Interference No. 105,799, United States Patent and Trademark Office, Board of Patent Appeals and Interferences.

Schrage Notice of Deposition of Kyle Swanson, *Brown et al.* v. *Schrage et al.*, dated Oct. 10, 2012, Patent Interference No. 105,799, United States Patent and Trademark Office, Board of Patent Appeals and Interferences.

Schrage Notice of Deposition of Charles "Chuck" Oslakovic, *Brown et al.* v. *Schrage et al.*, dated Oct. 10, 2012, Patent Interference No. 105,799, United States Patent and Trademark Office, Board of Patent Appeals and Interferences.

Brown Notice of Canceled of Deposition, *Brown et al.* v. *Schrage et al.*, dated Oct. 17, 2012, Patent Interference No. 105,799, United States Patent and Trademark Office, Board of Patent Appeals and Interferences.

Joint Stipulation of Change in Schedule, *Brown et al.* v. *Schrage et al.*, dated Oct. 22, 2012, Patent Interference No. 105,799, United States Patent and Trademark Office, Board of Patent Appeals and Interferences.

Order Following Conference Call 37 C.F.R. 41.104(a), *Brown et al.* v. *Schrage et al.*, dated Oct. 30, 2012, Patent Interference No. 105,799, United States Patent and Trademark Office, Board of Patent Appeals and Interferences.

Joint Stipulation of Change in Schedule, *Brown et al.* v. *Schrage et al.*, dated Nov. 8, 2012, Patent Interference No. 105,799, United States Patent and Trademark Office, Board of Patent Appeals and Interferences.

Joint Stipulation of Change in Schedule, *Brown et al.* v. *Schrage et al.*, dated Nov. 15, 2012, Patent Interference No. 105,799, United States Patent and Trademark Office, Board of Patent Appeals and Interferences.

Brown 37 CFR 41.106(f) Certificate of Service, *Brown et al.* v. *Schrage et al.*, dated Dec. 10, 2012, Patent Interference No. 105,799, United States Patent and Trademark Office, Board of Patent Appeals and Interferences.

Brown Notice of Deposition of Mr. Schrage, *Brown et al.* v. *Schrage et al.*, dated Dec. 10, 2012, Patent Interference No. 105,799, United States Patent and Trademark Office, Board of Patent Appeals and Interferences.

Brown 37 CFR 41.106(f) Certificate of Service, *Brown et al.* v. *Schrage et al.*, dated Dec. 12, 2012, Patent Interference No. 105,799, United States Patent and Trademark Office, Board of Patent Appeals and Interferences.

Brown Additional Backup Counsel, *Brown et al.* v. *Schrage et al.*, dated Dec. 12, 2012, Patent Interference No. 105,799, United States Patent and Trademark Office, Board of Patent Appeals and Interferences.

Joint Stipulation of Change in Schedule, *Brown et al.* v. *Schrage et al.*, dated Dec. 18, 2012, Patent Interference No. 105,799, United States Patent and Trademark Office, Board of Patent Appeals and Interferences.

Brown Opposition 11 (Count 2), *Brown et al.* v. *Schrage et al.*, dated Dec. 26, 2012, Patent Interference No. 105,799, United States Patent and Trademark Office, Board of Patent Appeals and Interferences.

Brown Opposition 12 (Counts 3 and 4), *Brown et al.* v. *Schrage et al.*, dated Dec. 26, 2012, Patent Interference No. 105,799, United States Patent and Trademark Office, Board of Patent Appeals and Interferences.

Brown 37 CFR 41.106(f) Certificate of Service, *Brown et al.* v. *Schrage et al.*, dated Dec. 26, 2012, Patent Interference No. 105,799, United States Patent and Trademark Office, Board of Patent Appeals and Interferences.

Schrage Opposition 11, *Brown et al.* v. *Schrage et al.*, dated Dec. 27, 2012, Patent Interference No. 105,799, United States Patent and Trademark Office, Board of Patent Appeals and Interferences.

Schrage Exhibit List as of Dec. 27, 2012, *Brown et al.* v. *Schrage et al.*, dated Dec. 27, 2012, Patent Interference No. 105,799, United States Patent and Trademark Office, Board of Patent Appeals and Interferences.

Schrage Exhibit 1106, *Brown et al.* v. *Schrage et al.*, dated Dec. 27, 2012, Patent Interference No. 105,799, United States Patent and Trademark Office, Board of Patent Appeals and Interferences.

Schrage Exhibit 1107, *Brown et al.* v. *Schrage et al.*, dated Dec. 27, 2012, Patent Interference No. 105,799, United States Patent and Trademark Office, Board of Patent Appeals and Interferences.

Schrage Exhibit 1108, *Brown et al.* v. *Schrage et al.*, dated Dec. 27, 2012, Patent Interference No. 105,799, United States Patent and Trademark Office, Board of Patent Appeals and Interferences.

Schrage Exhibit 1109, *Brown et al.* v. *Schrage et al.*, dated Dec. 27, 2012, Patent Interference No. 105,799, United States Patent and Trademark Office, Board of Patent Appeals and Interferences.

Schrage Exhibit 1110, *Brown et al.* v. *Schrage et al.*, dated Dec. 27, 2012, Patent Interference No. 105,799, United States Patent and Trademark Office, Board of Patent Appeals and Interferences.

Schrage Exhibit 1111, *Brown et al.* v. *Schrage et al.*, dated Dec. 27, 2012, Patent Interference No. 105,799, United States Patent and Trademark Office, Board of Patent Appeals and Interferences.

Schrage Exhibit 1112, *Brown et al.* v. *Schrage et al.*, dated Dec. 27, 2012, Patent Interference No. 105,799, United States Patent and Trademark Office, Board of Patent Appeals and Interferences.
Schrage Exhibit 1113, *Brown et al.* v. *Schrage et al.*, dated Dec. 27, 2012, Patent Interference No. 105,799, United States Patent and Trademark Office, Board of Patent Appeals and Interferences.
Schrage Exhibit 1055, *Brown et al.* v. *Schrage et al.*, dated Jul. 9, 2012, Patent Interference No. 105,799, United States Patent and Trademark Office, Board of Patent Appeals and Interferences.
Schrage Exhibit 1056, *Brown et al.* v. *Schrage et al.*, dated Jul. 9, 2012, Patent Interference No. 105,799, United States Patent and Trademark Office, Board of Patent Appeals and Interferences.
Schrage Exhibit 1057, *Brown et al.* v. *Schrage et al.*, dated Jul. 9, 2012, Patent Interference No. 105,799, United States Patent and Trademark Office, Board of Patent Appeals and Interferences.
Schrage Exhibit 1058, *Brown et al.* v. *Schrage et al.*, dated Jul. 9, 2012, Patent Interference No. 105,799, United States Patent and Trademark Office, Board of Patent Appeals and Interferences.
Schrage Exhibit 1059, *Brown et al.* v. *Schrage et al.*, dated Jul. 9, 2012, Patent Interference No. 105,799, United States Patent and Trademark Office, Board of Patent Appeals and Interferences.
Schrage Exhibit 1060, *Brown et al.* v. *Schrage et al.*, dated Jul. 9, 2012, Patent Interference No. 105,799, United States Patent and Trademark Office, Board of Patent Appeals and Interferences.
Schrage Exhibit 1061, *Brown et al.* v. *Schrage et al.*, dated Jul. 9, 2012, Patent Interference No. 105,799, United States Patent and Trademark Office, Board of Patent Appeals and Interferences.
Schrage Exhibit 1062, *Brown et al.* v. *Schrage et al.*, dated Jul. 9, 2012, Patent Interference No. 105,799, United States Patent and Trademark Office, Board of Patent Appeals and Interferences.
Schrage Exhibit 1063, *Brown et al.* v. *Schrage et al.*, dated Jul. 9, 2012, Patent Interference No. 105,799, United States Patent and Trademark Office, Board of Patent Appeals and Interferences.
Schrage Exhibit 1064, *Brown et al.* v. *Schrage et al.*, dated Jul. 9, 2012, Patent Interference No. 105,799, United States Patent and Trademark Office, Board of Patent Appeals and Interferences.
Schrage Exhibit 1065, *Brown et al.* v. *Schrage et al.*, dated Jul. 9, 2012, Patent Interference No. 105,799, United States Patent and Trademark Office, Board of Patent Appeals and Interferences.
Schrage Exhibit 1066, *Brown et al.* v. *Schrage et al.*, dated Jul. 9, 2012, Patent Interference No. 105,799, United States Patent and Trademark Office, Board of Patent Appeals and Interferences.
Schrage Exhibit 1067, *Brown et al.* v. *Schrage et al.*, dated Jul. 9, 2012, Patent Interference No. 105,799, United States Patent and Trademark Office, Board of Patent Appeals and Interferences.
Schrage Exhibit 1068, *Brown et al.* v. *Schrage et al.*, dated Jul. 9, 2012, Patent Interference No. 105,799, United States Patent and Trademark Office, Board of Patent Appeals and Interferences.
Schrage Exhibit 1069, *Brown et al.* v. *Schrage et al.*, dated Jul. 9, 2012, Patent Interference No. 105,799, United States Patent and Trademark Office, Board of Patent Appeals and Interferences.
Schrage Exhibit 1070, *Brown et al.* v. *Schrage et al.*, dated Jul. 9, 2012, Patent Interference No. 105,799, United States Patent and Trademark Office, Board of Patent Appeals and Interferences.
Schrage Exhibit 1071, *Brown et al.* v. *Schrage et al.*, dated Jul. 9, 2012, Patent Interference No. 105,799, United States Patent and Trademark Office, Board of Patent Appeals and Interferences.
Schrage Exhibit 1072, *Brown et al.* v. *Schrage et al.*, dated Jul. 9, 2012, Patent Interference No. 105,799, United States Patent and Trademark Office, Board of Patent Appeals and Interferences.
Schrage Exhibit 1073, *Brown et al.* v. *Schrage et al.*, dated Jul. 9, 2012, Patent Interference No. 105,799, United States Patent and Trademark Office, Board of Patent Appeals and Interferences.
Schrage Exhibit 1074, *Brown et al.* v. *Schrage et al.*, dated Jul. 9, 2012, Patent Interference No. 105,799, United States Patent and Trademark Office, Board of Patent Appeals and Interferences.
Schrage Exhibit 1075, *Brown et al.* v. *Schrage et al.*, dated Jul. 9, 2012, Patent Interference No. 105,799, United States Patent and Trademark Office, Board of Patent Appeals and Interferences.
Schrage Exhibit 1076, *Brown et al.* v. *Schrage et al.*, dated Jul. 9, 2012, Patent Interference No. 105,799, United States Patent and Trademark Office, Board of Patent Appeals and Interferences.
Schrage Exhibit 1077, *Brown et al.* v. *Schrage et al.*, dated Jul. 9, 2012, Patent Interference No. 105,799, United States Patent and Trademark Office, Board of Patent Appeals and Interferences.
Schrage Exhibit 1078, *Brown et al.* v. *Schrage et al.*, dated Jul. 9, 2012, Patent Interference No. 105,799, United States Patent and Trademark Office, Board of Patent Appeals and Interferences.
Schrage Exhibit 1079, *Brown et al.* v. *Schrage et al.*, dated Jul. 9, 2012, Patent Interference No. 105,799, United States Patent and Trademark Office, Board of Patent Appeals and Interferences.
Schrage Exhibit 1080, *Brown et al.* v. *Schrage et al.*, dated Jul. 9, 2012, Patent Interference No. 105,799, United States Patent and Trademark Office, Board of Patent Appeals and Interferences.
Schrage Exhibit 1081, *Brown et al.* v. *Schrage et al.*, dated Jul. 9, 2012, Patent Interference No. 105,799, United States Patent and Trademark Office, Board of Patent Appeals and Interferences.
Schrage Exhibit 1082, *Brown et al.* v. *Schrage et al.*, dated Jul. 9, 2012, Patent Interference No. 105,799, United States Patent and Trademark Office, Board of Patent Appeals and Interferences.
Schrage Exhibit 1083, *Brown et al.* v. *Schrage et al.*, dated Jul. 9, 2012, Patent Interference No. 105,799, United States Patent and Trademark Office, Board of Patent Appeals and Interferences.
Schrage Exhibit 1084, *Brown et al.* v. *Schrage et al.*, dated Jul. 9, 2012, Patent Interference No. 105,799, United States Patent and Trademark Office, Board of Patent Appeals and Interferences.
Schrage Exhibit 1085, *Brown et al.* v. *Schrage et al.*, dated Jul. 9, 2012, Patent Interference No. 105,799, United States Patent and Trademark Office, Board of Patent Appeals and Interferences.
Schrage Exhibit 1086, *Brown et al.* v. *Schrage et al.*, dated Jul. 9, 2012, Patent Interference No. 105,799, United States Patent and Trademark Office, Board of Patent Appeals and Interferences.
Schrage Exhibit 1087, *Brown et al.* v. *Schrage et al.*, dated Jul. 9, 2012, Patent Interference No. 105,799, United States Patent and Trademark Office, Board of Patent Appeals and Interferences.
Schrage Exhibit 1088, *Brown et al.* v. *Schrage et al.*, dated Jul. 9, 2012, Patent Interference No. 105,799, United States Patent and Trademark Office, Board of Patent Appeals and Interferences.
Schrage Exhibit 1089, *Brown et al.* v. *Schrage et al.*, dated Jul. 9, 2012, Patent Interference No. 105,799, United States Patent and Trademark Office, Board of Patent Appeals and Interferences.
Schrage Exhibit 1090, *Brown et al.* v. *Schrage et al.*, dated Jul. 9, 2012, Patent Interference No. 105,799, United States Patent and Trademark Office, Board of Patent Appeals and Interferences.
Schrage Exhibit 1091, *Brown et al.* v. *Schrage et al.*, dated Jul. 9, 2012, Patent Interference No. 105,799, United States Patent and Trademark Office, Board of Patent Appeals and Interferences.
Schrage Exhibit 1092, *Brown et al.* v. *Schrage et al.*, dated Jul. 9, 2012, Patent Interference No. 105,799, United States Patent and Trademark Office, Board of Patent Appeals and Interferences.
Schrage Exhibit 1093, *Brown et al.* v. *Schrage et al.*, dated Jul. 9, 2012, Patent Interference No. 105,799, United States Patent and Trademark Office, Board of Patent Appeals and Interferences.
Schrage Exhibit 1094, *Brown et al.* v. *Schrage et al.*, dated Jul. 9, 2012, Patent Interference No. 105,799, United States Patent and Trademark Office, Board of Patent Appeals and Interferences.
Schrage Exhibit 1095, *Brown et al.* v. *Schrage et al.*, dated Jul. 9, 2012, Patent Interference No. 105,799, United States Patent and Trademark States Office, Board of Patent Appeals and Interferences.
Schrage Exhibit 1096, *Brown et al.* v. *Schrage et al.*, et al., dated Jul. 9, 2012, Patent Interference No. 105,799, United States Patent and Trademark Office, Board of Patent Appeals and Interferences.
Schrage Exhibit 1097, *Brown et al.* v. *Schrage et al.*, dated Jul. 9, 2012, Patent Interference No. 105,799, United States Patent and Trademark Office, Board of Patent Appeals and Interferences.
Schrage Exhibit 1098, *Brown et al.* v. *Schrage et al.*, dated Jul. 9, 2012, Patent Interference No. 105,799, United States Patent and Trademark Office, Board of Patent Appeals and Interferences.
Schrage Exhibit 1099, *Brown et al.* v. *Schrage et al.*, dated Jul. 9, 2012, Patent Interference No. 105,799, UnitedStates Patent and Trademark Office, Board of Patent Appeals and Interferences.
Schrage Exhibit 1100, *Brown et al.* v. *Schrage et al.*, dated Jul. 9, 2012, Patent Interference No. 105,799, United States Patent and Trademark Office, Board of Patent Appeals and Interferences.

Schrage Exhibit 1101, *Brown et al.* v. *Schrage et al.*, dated Jul. 9, 2012, Patent Interference No. 105,799, United States Patent and Trademark Office, Board of Patent Appeals and Interferences.
Schrage Exhibit 1102, *Brown et al.* v. *Schrage et al.*, dated Jul. 9, 2012, Patent Interference No. 105,799, United States Patent and Trademark Office, Board of Patent Appeals and Interferences.
Schrage Exhibit 1103, *Brown et al.* v. *Schrage et al.*, dated Jul. 9, 2012, Patent Interference No. 105,799, United States Patent and Trademark Office, Board of Patent Appeals and Interferences.
Schrage Exhibit 1104, *Brown et al.* v. *Schrage et al.*, dated Jul. 9, 2012, Patent Interference No. 105,799, United States Patent and Trademark Office, Board of Patent Appeals and Interferences.
Schrage Exhibit 1114, *Brown et al.* v. *Schrage et al.*, dated Dec. 27, 2012, Patent Interference No. 105,799, United States Patent and Trademark Office, Board of Patent Appeals and Interferences.
Schrage Exhibit 1115, *Brown et al.* v. *Schrage et al.*, dated Dec. 27, 2012, Patent Interference No. 105,799, United States Patent and Trademark Office, Board of Patent Appeals and Interferences.
Schrage Exhibit 1116, *Brown et al.* v. *Schrage et al.*, dated Dec. 27, 2012, Patent Interference No. 105,799, United States Patent and Trademark Office, Board of Patent Appeals and Interferences.
Schrage Exhibit 1117, *Brown et al.* v. *Schrage et al.*, dated Dec. 27, 2012, Patent Interference No. 105,799, United States Patent and Trademark Office, Board of Patent Appeals and Interferences.
Brown 37 CFR 1.106(f) Certificate of Service of Objections, *Brown et al.* v. *Schrage et al.*, dated Dec. 28, 2012, Patent Interference No. 105,799, United States Patent and Trademark Office, Board of Patent Appeals and Interferences.
Schrage Certificate of Service of Objections (37 CFR 1.646(e)), *Brown et al.* v. *Schrage et al.*, dated Dec. 28, 2012, Patent Interference No. 105,799, United States Patent and Trademark Office, Board of Patent Appeals and Interferences.
Brown Notice of Deposition of Daniel Adamek, *Brown et al.* v. *Schrage et al.*, dated Jan. 4, 2013, Patent Interference No. 105,799, United States Patent and Trademark Office, Board of Patent Appeals and Interferences.
Brown Request for Rehearing on Paper 376, *Brown et al.* v. *Schrage et al.*, dated Jan. 4, 2013, Patent Interference No. 105,799, United States Patent and Trademark Office, Board of Patent Appeals and Interferences.
Order Following Conference Call 37 CFR 41.104(a), *Brown et al.* v. *Schrage et al.*, dated Jan. 4, 2013, Patent Interference No. 105,799, United States Patent and Trademark Office, Board of Patent Appeals and Interferences.
Schrage Notice of Deposition of Steve Merritt, *Brown et al.* v. *Schrage et al.*, dated Jan. 4, 2013, Patent Interference No. 105,799, United States Patent and Trademark Office, Board of Patent Appeals and Interferences.
Joint Notice of Change in Schedule, *Brown et al.* v. *Schrage et al.*, dated Jan. 4, 2013, Patent Interference No. 105,799, United States Patent and Trademark Office, Board of Patent Appeals and Interferences.
Brown 37 CFR 41.106(f) Certificate of Service Jun. 1, 2013, *Brown et al.* v. *Schrage et al.*, dated Jan. 6, 2013, Patent Interference No. 105,799, United States Patent and Trademark Office, Board of Patent Appeals and Interferences.
Brown Second Notice of Deposition of Daniel Adamek, *Brown et al.* v. *Schrage et al.*, dated Jan. 8, 2013, Patent Interference No. 105,799, United States Patent and Trademark Office, Board of Patent Appeals and Interferences.
Brown Notice of Service of Supplemental Evidence Jan. 15, 2013, *Brown et al.* v. *Schrage et al.*, dated Jan. 15, 2013, Patent Interference No. 105,799, United States Patent and Trademark Office, Board of Patent Appeals and Interferences.
Brown 37 CFR 41.106(f) Certificate of Service Jan. 15, 2013, *Brown et al.* v. *Schrage et al.*, dated Jan. 15, 2013, Patent Interference No. 105,799, United States Patent and Trademark Office, Board of Patent Appeals and Interferences.
Brown Reply 11, *Brown et al.* v. *Schrage et al.*, dated Jan. 15, 2013, Patent Interference No. 105,799, United States Patent and Trademark Office, Board of Patent Appeals and Interferences.
Brown 37 CFR 41.106(f) Certificate of Service Jan. 16, 2013, *Brown et al.* v. *Schrage et al.*, dated Jan. 16, 2013, Patent Interference No. 105,799, United States Patent and Trademark Office, Board of Patent Appeals and Interferences.
Brown Motion 12 to Exclude Evidence, *Brown et al.* v. *Schrage et al.*, dated Jan. 16, 2013, Patent Interference No. 105,799, United States Patent and Trademark Office, Board of Patent Appeals and Interferences.
Brown Request for Oral Hearing, *Brown et al.* v. *Schrage et al.*, dated Jan. 16, 2013, Patent Interference No. 105,799, United States Patent and Trademark Office, Board of Patent Appeals and Interferences.
Brown List of Issues to be Considered, *Brown et al.* v. *Schrage et al.*, dated Jan. 16, 2013, Patent Interference No. 105,799, United States Patent and Trademark Office, Board of Patent Appeals and Interferences.
Schrage Motion 13, *Brown et al.* v. *Schrage et al.*, dated Jan. 16, 2013, Patent Interference No. 105,799, United States Patent and Trademark Office, Board of Patent Appeals and Interferences.
Schrage Request for Oral Argument, *Brown et al.* v. *Schrage et al.*, dated Jan. 16, 2013, Patent Interference No. 105,799, United States Patent and Trademark Office, Board of Patent Appeals and Interferences.
Schrage Reply 11, *Brown et al.* v. *Schrage et al.*, dated Jan. 16, 2013, Patent Interference No. 105,799, United States Patent and Trademark Office, Board of Patent Appeals and Interferences.
Schrage Reply 12, *Brown et al.* v. *Schrage et al.*, dated Jan. 16, 2013, Patent Interference No. 105,799, United States Patent and Trademark Office, Board of Patent Appeals and Interferences.
Schrage Exhibit List as of Jan. 16, 2013, *Brown et al.* v. *Schrage et al.*, dated Jan. 16, 2013, Patent Interference No. 105,799, United States Patent and Trademark Office, Board of Patent Appeals and Interferences.
Schrage Exhibit 1118, *Brown et al.* v. *Schrage et al.*, dated Jan. 16, 2013, Patent Interference No. 105,799, United States Patent and Trademark Office, Board of Patent Appeals and Interferences.
Schrage Exhibit 1119, *Brown et al.* v. *Schrage et al.*, dated Jan. 16, 2013, Patent Interference No. 105,799, United States Patent and Trademark Office, Board of Patent Appeals and Interferences.
Schrage Exhibit 1120, *Brown et al.* v. *Schrage et al.*, dated Jan. 16, 2013, Patent Interference No. 105,799, United States Patent and Trademark Office, Board of Patent Appeals and Interferences.
Schrage Exhibit 1121, *Brown et al.* v. *Schrage et al.*, dated Jan. 16, 2013, Patent Interference No. 105,799, United States Patent and Trademark Office, Board of Patent Appeals and Interferences.
Schrage Exhibit 1122, *Brown et al.* v. *Schrage et al.*, dated Jan. 16, 2013, Patent Interference No. 105,799, United States Patent and Trademark Office, Board of Patent Appeals and Interferences.
Schrage Exhibit 1123, *Brown et al.* v. *Schrage et al.*, dated Jan. 16, 2013, Patent Interference No. 105,799, United States Patent and Trademark Office, Board of Patent Appeals and Interferences.
Schrage Exhibit 1124, *Brown et al.* v. *Schrage et al.*, dated Jan. 16, 2013, Patent Interference No. 105,799, United States Patent and Trademark Office, Board of Patent Appeals and Interferences.
Schrage Exhibit 1125, *Brown et al.* v. *Schrage et al.*, dated Jan. 16, 2013, Patent Interference No. 105,799, United States Patent and Trademark Office, Board of Patent Appeals and Interferences.
Schrage Exhibit 1126, *Brown et al.* v. *Schrage et al.*, dated Jan. 16, 2013, Patent Interference No. 105,799, United States Patent and Trademark Office, Board of Patent Appeals and Interferences.
Schrage List of Issues to be Considered, *Brown et al.* v. *Schrage et al.*, dated Jan. 16, 2013, Patent Interference No. 105,799, United States Patent and Trademark Office, Board of Patent Appeals and Interferences.
Brown Certificate of Prior Filing and Service, *Brown et al.* v. *Schrage et al.*, dated Jan. 18, 2013, Patent Interference No. 105,799, United States Patent and Trademark Office, Board of Patent Appeals and Interferences.
Brown Opposition 13, *Brown et al.* v. *Schrage et al.*, dated Jan. 21, 2013, Patent Interference No. 105,799, United States Patent and Trademark Office, Board of Patent Appeals and Interferences.

Brown 37 CFR 41.106(f) Certificate of Service Jan. 21, 2013, *Brown et al. v. Schrage et al.*, dated Jan. 21, 2013, Patent Interference No. 105,799, United States Patent and Trademark Office, Board of Patent Appeals and Interferences.

Brown Exhibit List, *Brown et al. v. Schrage et al.*, dated Jan. 21, 2013, Patent Interference No. 105,799, United States Patent and Trademark Office, Board of Patent Appeals and Interferences.

EX 2132, *Brown et al. v. Schrage et al.*, dated Jan. 21, 2013, Patent Interference No. 105,799, United States Patent and Trademark Office, Board of Patent Appeals and Interferences.

EX 2133, *Brown et al. v. Schrage et al.*, dated Jan. 21, 2013, Patent Interference No. 105,799, United States Patent and Trademark Office, Board of Patent Appeals and Interferences.

EX 2134, *Brown et al. v. Schrage et al.*, dated Jan. 21, 2013, Patent Interference No. 105,799, United States Patent and Trademark Office, Board of Patent Appeals and Interferences.

EX 2135, *Brown et al. v. Schrage et al.*, dated Jan. 21, 2013, Patent Interference No. 105,799, United States Patent and Trademark Office, Board of Patent Appeals and Interferences.

EX 2136, *Brown et al. v. Schrage et al.*, dated Jan. 21, 2013, Patent Interference No. 105,799, United States Patent and Trademark Office, Board of Patent Appeals and Interferences.

EX 2137, *Brown et al. v. Schrage et al.*, dated Jan. 21, 2013, Patent Interference No. 105,799, United States Patent and Trademark Office, Board of Patent Appeals and Interferences.

EX 2138, *Brown et al. v. Schrage et al.*, dated Jan. 21, 2013, Patent Interference No. 105,799, United States Patent and Trademark Office, Board of Patent Appeals and Interferences.

EX 2339, *Brown et al. v. Schrage et al.*, dated Jan. 21, 2013, Patent Interference No. 105,799, United States Patent and Trademark Office, Board of Patent Appeals and Interferences.

EX 2340, *Brown et al. v. Schrage et al.*, dated Jan. 21, 2013, Patent Interference No. 105,799, United States Patent and Trademark Office, Board of Patent Appeals and Interferences.

EX 2341, *Brown et al. v. Schrage et al.*, dated Jan. 21, 2013, Patent Interference No. 105,799, United States Patent and Trademark Office, Board of Patent Appeals and Interferences.

EX 2342, *Brown et al. v. Schrage et al.*, dated Jan. 21, 2013, Patent Interference No. 105,799, United States Patent and Trademark Office, Board of Patent Appeals and Interferences.

EX 2343, *Brown et al. v. Schrage et al.*, dated Jan. 21, 2013, Patent Interference No. 105,799, United States Patent and Trademark Office, Board of Patent Appeals and Interferences.

EX 2344, *Brown et al. v. Schrage et al.*, dated Jan. 21, 2013, Patent Interference No. 105,799, United States Patent and Trademark Office, Board of Patent Appeals and Interferences.

EX 2345, *Brown et al. v. Schrage et al.*, dated Jan. 21, 2013, Patent Interference No. 105,799, United States Patent and Trademark Office, Board of Patent Appeals and Interferences.

EX 2346, *Brown et al. v. Schrage et al.*, dated Jan. 21, 2013, Patent Interference No. 105,799, United States Patent and Trademark Office, Board of Patent Appeals and Interferences.

EX 2347, *Brown et al. v. Schrage et al.*, dated Jan. 21, 2013, Patent Interference No. 105,799, United States Patent and Trademark Office, Board of Patent Appeals and Interferences.

EX 2348, *Brown et al. v. Schrage et al.*, dated Jan. 21, 2013, Patent Interference No. 105,799, United States Patent and Trademark Office, Board of Patent Appeals and Interferences.

EX 2349, *Brown et al. v. Schrage et al.*, dated Jan. 21, 2013, Patent Interference No. 105,799, United States Patent and Trademark Office, Board of Patent Appeals and Interferences.

EX 2350, *Brown et al. v. Schrage et al.*, dated Jan. 21, 2013, Patent Interference No. 105,799, United States Patent and Trademark Office, Board of Patent Appeals and Interferences.

EX 2351, *Brown et al. v. Schrage et al.*, dated Jan. 21, 2013, Patent Interference No. 105,799, United States Patent and Trademark Office, Board of Patent Appeals and Interferences.

EX 2352, *Brown et al. v. Schrage et al.*, dated Jan. 21, 2013, Patent Interference No. 105,799, United States Patent and Trademark Office, Board of Patent Appeals and Interferences.

EX 2353, *Brown et al. v. Schrage et al.*, dated Jan. 21, 2013, Patent Interference No. 105,799, United States Patent and Trademark Office, Board of Patent Appeals and Interferences.

EX 2354, *Brown et al. v. Schrage et al.*, dated Jan. 21, 2013, Patent Interference No. 105,799, United States Patent and Trademark Office, Board of Patent Appeals and Interferences.

EX 2355, *Brown et al. v. Schrage et al.*, dated Jan. 21, 2013, Patent Interference No. 105,799, United States Patent and Trademark Office, Board of Patent Appeals and Interferences.

EX 2356, *Brown et al. v. Schrage et al.*, dated Jan. 21, 2013, Patent Interference No. 105,799, United States Patent and Trademark Office, Board of Patent Appeals and Interferences.

EX 2357, *Brown et al. v. Schrage et al.*, dated Jan. 21, 2013, Patent Interference No. 105,799, United States Patent and Trademark Office, Board of Patent Appeals and Interferences.

EX 2358, *Brown et al. v. Schrage et al.*, dated Jan. 21, 2013, Patent Interference No. 105,799, United States Patent and Trademark Office, Board of Patent Appeals and Interferences.

EX 2359, *Brown et al. v. Schrage et al.*, dated Jan. 21, 2013, Patent Interference No. 105,799, United States Patent and Trademark Office, Board of Patent Appeals and Interferences.

EX 2360, *Brown et al. v. Schrage et al.*, dated Jan. 21, 2013, Patent Interference No. 105,799, United States Patent and Trademark Office, Board of Patent Appeals and Interferences.

EX 2361, *Brown et al. v. Schrage et al.*, dated Jan. 21, 2013, Patent Interference No. 105,799, United States Patent and Trademark Office, Board of Patent Appeals and Interferences.

EX 2362, *Brown et al. v. Schrage et al.*, dated Jan. 21, 2013, Patent Interference No. 105,799, United States Patent and Trademark Office, Board of Patent Appeals and Interferences.

EX 2363, *Brown et al. v. Schrage et al.*, dated Jan. 21, 2013, Patent Interference No. 105,799, United States Patent and Trademark Office, Board of Patent Appeals and Interferences.

EX 2364, *Brown et al. v. Schrage et al.*, dated Jan. 21, 2013, Patent Interference No. 105,799, United States Patent and Trademark Office, Board of Patent Appeals and Interferences.

EX 2365, *Brown et al. v. Schrage et al.*, dated Jan. 21, 2013, Patent Interference No. 105,799, United States Patent and Trademark Office, Board of Patent Appeals and Interferences.

EX 2366, *Brown et al. v. Schrage et al.*, dated Jan. 21, 2013, Patent Interference No. 105,799, United States Patent and Trademark Office, Board of Patent Appeals and Interferences.

EX 2367, *Brown et al. v. Schrage et al.*, dated Jan. 21, 2013, Patent Interference No. 105,799, United States Patent and Trademark Office, Board of Patent Appeals and Interferences.

EX 2368, *Brown et al. v. Schrage et al.*, dated Jan. 21, 2013, Patent Interference No. 105,799, United States Patent and Trademark Office, Board of Patent Appeals and Interferences.

EX 2369, *Brown et al. v. Schrage et al.*, dated Jan. 21, 2013, Patent Interference No. 105,799, United States Patent and Trademark Office, Board of Patent Appeals and Interferences.

EX 2370, *Brown et al. v. Schrage et al.*, dated Jan. 21, 2013, Patent Interference No. 105,799, United States Patent and Trademark Office, Board of Patent Appeals and Interferences.

EX 2371, *Brown et al. v. Schrage et al.*, dated Jan. 21, 2013, Patent Interference No. 105,799, United States Patent and Trademark Office, Board of Patent Appeals and Interferences.

EX 2372, *Brown et al. v. Schrage et al.*, dated Jan. 21, 2013, Patent Interference No. 105,799, United States Patent and Trademark Office, Board of Patent Appeals and Interferences.

EX 2373, *Brown et al. v. Schrage et al.*, dated Jan. 21, 2013, Patent Interference No. 105,799, United States Patent and Trademark Office, Board of Patent Appeals and Interferences.

EX 2374, *Brown et al. v. Schrage et al.*, dated Jan. 21, 2013, Patent Interference No. 105,799, United States Patent and Trademark Office, Board of Patent Appeals and Interferences.

EX 2375, *Brown et al. v. Schrage et al.*, dated Jan. 21, 2013, Patent Interference No. 105,799, United States Patent and Trademark Office, Board of Patent Appeals and Interferences.

EX 2376, *Brown et al. v. Schrage et al.*, dated Jan. 21, 2013, Patent Interference No. 105,799, United States Patent and Trademark Office, Board of Patent Appeals and Interferences.

EX 2377, *Brown et al. v. Schrage et al.*, dated Jan. 21, 2013, Patent Interference No. 105,799, United States Patent and Trademark Office, Board of Patent Appeals and Interferences.

EX 2378, *Brown et al.* v. *Schrage et al.*, dated Jan. 21, 2013, Patent Interference No. 105,799, United States Patent and Trademark Office, Board of Patent Appeals and Interferences.
EX 2379, *Brown et al.* v. *Schrage et al.*, dated Jan. 21, 2013, Patent Interference No. 105,799, United States Patent and Trademark Office, Board of Patent Appeals and Interferences.
EX 2380, *Brown et al.* v. *Schrage et al.*, dated Jan. 21, 2013, Patent Interference No. 105,799, United States Patent and Trademark Office, Board of Patent Appeals and Interferences.
EX 2381, *Brown et al.* v. *Schrage et al.*, dated Jan. 21, 2013, Patent Interference No. 105,799, United States Patent and Trademark Office, Board of Patent Appeals and Interferences.
EX 2382, *Brown et al.* v. *Schrage et al.*, dated Jan. 21, 2013, Patent Interference No. 105,799, United States Patent and Trademark Office, Board of Patent Appeals and Interferences.
EX 2383, *Brown et al.* v. *Schrage et al.*, dated Jan. 21, 2013, Patent Interference No. 105,799, United States Patent and Trademark Office, Board of Patent Appeals and Interferences.
EX 2384, *Brown et al.* v. *Schrage et al.*, dated Jan. 21, 2013, Patent Interference No. 105,799, United States Patent and Trademark Office, Board of Patent Appeals and Interferences.
EX 2385, *Brown et al.* v. *Schrage et al.*, dated Jan. 21, 2013, Patent Interference No. 105,799, United States Patent and Trademark Office, Board of Patent Appeals and Interferences.
EX 2386, *Brown et al.* v. *Schrage et al.*, dated Jan. 21, 2013, Patent Interference No. 105,799, United States Patent and Trademark Office, Board of Patent Appeals and Interferences.
EX 2387, *Brown et al.* v. *Schrage et al.*, dated Jan. 21, 2013, Patent Interference No. 105,799, United States Patent and Trademark Office, Board of Patent Appeals and Interferences.
EX 2388, *Brown et al.* v. *Schrage et al.*, dated Jan. 21, 2013, Patent Interference No. 105,799, United States Patent and Trademark Office, Board of Patent Appeals and Interferences.
EX 2240, *Brown et al.* v. *Schrage et al.*, dated Jan. 21, 2013, Patent Interference No. 105,799, United States Patent and Trademark Office, Board of Patent Appeals and Interferences.
EX 2241, *Brown et al.* v. *Schrage et al.*, dated Jan. 21, 2013, Patent Interference No. 105,799, United States Patent and Trademark Office, Board of Patent Appeals and Interferences.
EX 2242, *Brown et al.* v. *Schrage et al.*, dated Jan. 21, 2013, Patent Interference No. 105,799, United States Patent and Trademark Office, Board of Patent Appeals and Interferences.
EX 2243, *Brown et al.* v. *Schrage et al.*, dated Jan. 21, 2013, Patent Interference No. 105,799, United States Patent and Trademark Office, Board of Patent Appeals and Interferences.
EX 2244, *Brown et al.* v. *Schrage et al.*, dated Jan. 21, 2013, Patent Interference No. 105,799, United States Patent d T Office, Board of Patent Appeals and Interferences.
EX 2245, *Brown et al.* v. *Schrage et al.*, dated Jan. 21, 2013, Patent Interference No. 105,799, United States Patent and Trademark Office, Board of Patent Appeals and Interferences.
EX 2246, *Brown et al.* v. *Schrage et al.*, dated Jan. 21, 2013, Patent Interference No. 105,799, United States Patent and Trademark Office, Board of Patent Appeals and Interferences.
EX 2247, *Brown et al.* v. *Schrage et al.*, dated Jan. 21, 2013, Patent Interference No. 105,799, United States Patent and Trademark Office, Board of Patent Appeals and Interferences.
EX 2248, *Brown et al.* v. *Schrage et al.*, dated Jan. 21, 2013, Patent Interference No. 105,799, United States Patent and Trademark Office, Board of Patent Appeals and Interferences.
EX 2249, *Brown et al.* v. *Schrage et al.*, dated Jan. 21, 2013, Patent Interference No. 105,799, United States Patent and Trademark Office, Board of Patent Appeals and Interferences.
EX 2250, *Brown et al.* v. *Schrage et al.*, dated Jan. 21, 2013, Patent Interference No. 105,799, United States Patent and Trademark Office, Board of Patent Appeals and Interferences.
EX 2251, *Brown et al.* v. *Schrage et al.*, dated Jan. 21, 2013, Patent Interference No. 105,799, United States Patent and Trademark Office, Board of Patent Appeals and Interferences.
EX 2252, *Brown et al.* v. *Schrage et al.*, dated Jan. 21, 2013, Patent Interference No. 105,799, United States Patent Office, Board of Patent Appeals and Interferences.
EX 2253, *Brown et al.* v. *Schrage et al.*, dated Jan. 21, 2013, Patent Interference No. 105,799, United States Patent and Trademark Office, Board of Patent Appeals and Interferences.
EX 2254, *Brown et al.* v. *Schrage et al.*, dated Jan. 21, 2013, Patent Interference No. 105,799, United States Patent and Trademark Office, Board of Patent Appeals and Interferences.
EX 2255, *Brown et al.* v. *Schrage et al.*, dated Jan. 21, 2013, Patent Interference No. 105,799, United States Patent and Trademark Office, Board of Patent Appeals and Interferences.
EX 2256, *Brown et al.* v. *Schrage et al.*, dated Jan. 21, 2013, Patent Interference No. 105,799, United States Patent and Trademark Office, Board of Patent Appeals and Interferences.
EX 2257, *Brown et al.* v. *Schrage et al.*, dated Jan. 21, 2013, Patent Interference No. 105,799, United States Patent and Trademark Office, Board of Patent Appeals and Interferences.
EX 2258, *Brown et al.* v. *Schrage et al.*, dated Jan. 21, 2013, Patent Interference No. 105,799, United States Patent and Trademark Office, Board of Patent Appeals and Interferences.
EX 2259, *Brown et al.* v. *Schrage et al.*, dated Jan. 21, 2013, Patent Interference No. 105,799, United States Patent and Trademark Office, Board of Patent Appeals and Interferences.
EX 2260, *Brown et al.* v. *Schrage et al.*, dated Jan. 21, 2013, Patent Interference No. 105,799, United States Patent and Trademark Office, Board of Patent Appeals and Interferences.
EX 2261, *Brown et al.* v. *Schrage et al.*, dated Jan. 21, 2013, Patent Interference No. 105,799, United States Patent and Trademark Office, Board of Patent Appeals and Interferences.
EX 2262, *Brown et al.* v. *Schrage et al.*, dated Jan. 21, 2013, Patent Interference No. 105,799, United States Patent and Trademark Office, Board of Patent Appeals and Interferences.
EX 2263, *Brown et al.* v. *Schrage et al.*, dated Jan. 21, 2013, Patent Interference No. 105,799, United States Patent and Trademark Office, Board of Patent Appeals and Interferences.
EX 2264, *Brown et al.* v. *Schrage et al.*, dated Jan. 21, 2013, Patent Interference No. 105,799, United States Patent and Trademark Office, Board of Patent Appeals and Interferences.
EX 2265, *Brown et al.* v. *Schrage et al.*, dated Jan. 21, 2013, Patent Interference No. 105,799, United States Patent and Trademark Office, Board of Patent Appeals and Interferences.
EX 2266, *Brown et al.* v. *Schrage et al.*, dated Jan. 21, 2013, Patent Interference No. 105,799, United States Patent and Trademark Office, Board of Patent Appeals and Interferences.
EX 2267, *Brown et al.* v. *Schrage et al.*, dated Jan. 21, 2013, Patent Interference No. 105,799, United States Patent and Trademark Office, Board of Patent Appeals and Interferences.
EX 2268, *Brown et al.* v. *Schrage et al.*, dated Jan. 21, 2013, Patent Interference No. 105,799, United States Patent and Trademark Office, Board of Patent Appeals and Interferences.
EX 2269, *Brown et al.* v. *Schrage et al.*, dated Jan. 21, 2013, Patent Interference No. 105,799, United States Patent and Trademark Office, Board of Patent Appeals and Interferences.
EX 2270, *Brown et al.* v. *Schrage et al.*, dated Jan. 21, 2013, Patent Interference No. 105,799, United States Patent and Trademark Office, Board of Patent Appeals and Interferences.
EX 2271, *Brown et al.* v. *Schrage et al.*, dated Jan. 21, 2013, Patent Interference No. 105,799, United States Patent and Trademark Office, Board of Patent Appeals and Interferences.
EX 2272, *Brown et al.* v. *Schrage et al.*, dated Jan. 21, 2013, Patent Interference No. 105,799, United States Patent and Trademark Office, Board of Patent Appeals and Interferences.
EX 2273, *Brown et al.* v. *Schrage et al.*, dated Jan. 21, 2013, Patent Interference No. 105,799, United States Patent and Trademark Office, Board of Patent Appeals and Interferences.
EX 2274, *Brown et al.* v. *Schrage et al.*, dated Jan. 21, 2013, Patent Interference No. 105,799, United States Patent and Trademark Office, Board of Patent Appeals and Interferences.
EX 2275, *Brown et al.* v. *Schrage et al.*, dated Jan. 21, 2013, Patent Interference No. 105,799, United States Patent and Trademark Office, Board of Patent Appeals and Interferences.
EX 2276, *Brown et al.* v. *Schrage et al.*, dated Jan. 21, 2013, Patent Interference No. 105,799, United States Patent and Trademark Office, Board of Patent Appeals and Interferences.

EX 2277, *Brown et al.* v. *Schrage et al.*, dated Jan. 21, 2013, Patent Interference No. 105,799, United States Patent and Trademark Office, Board of Patent Appeals and Interferences.
EX 2278, *Brown et al.* v. *Schrage et al.*, dated Jan. 21, 2013, Patent Interference No. 105,799, United States Patent and Trademark Office, Board of Patent Appeals and Interferences.
EX 2279, *Brown et al.* v. *Schrage et al.*, dated Jan. 21, 2013, Patent Interference No. 105,799, United States Patent and Trademark Office, Board of Patent Appeals and Interferences.
EX 2280, *Brown et al.* v. *Schrage et al.*, dated Jan. 21, 2013, Patent Interference No. 105,799, United States Patent and Trademark Office, Board of Patent Appeals and Interferences.
EX 2281, *Brown et al.* v. *Schrage et al.*, dated Jan. 21, 2013, Patent Interference No. 105,799, United States Patent and Trademark Office, Board of Patent Appeals and Interferences.
EX 2282, *Brown et al.* v. *Schrage et al.*, dated Jan. 21, 2013, Patent Interference No. 105,799, United States Patent and Trademark Office, Board of Patent Appeals and Interferences.
EX 2283, *Brown et al.* v. *Schrage et al.*, dated Jan. 21, 2013, Patent Interference No. 105,799, United States Patent and Trademark Office, Board of Patent Appeals and Interferences.
EX 2284, *Brown et al.* v. *Schrage et al.*, dated Jan. 21, 2013, Patent Interference No. 105,799, United States Patent and Trademark Office, Board of Patent Appeals and Interferences.
EX 2285, *Brown et al.* v. *Schrage et al.*, dated Jan. 21, 2013, Patent Interference No. 105,799, United States Patent and Trademark Office, Board of Patent Appeals and Interferences.
EX 2286, *Brown et al.* v. *Schrage et al.*, dated Jan. 21, 2013, Patent Interference No. 105,799, United States Patent and Trademark Office, Board of Patent Appeals and Interferences.
EX 2287, *Brown et al.* v. *Schrage et al.*, dated Jan. 21, 2013, Patent Interference No. 105,799, United States Patent and Trademark Office, Board of Patent Appeals and Interferences.
EX 2288, *Brown et al.* v. *Schrage et al.*, dated Jan. 21, 2013, Patent Interference No. 105,799, United States Patent and Trademark Office, Board of Patent Appeals and Interferences.
EX 2289, *Brown et al.* v. *Schrage et al.*, dated Jan. 21, 2013, Patent Interference No. 105,799, United States Patent and Trademark Office, Board of Patent Appeals and Interferences.

\* cited by examiner

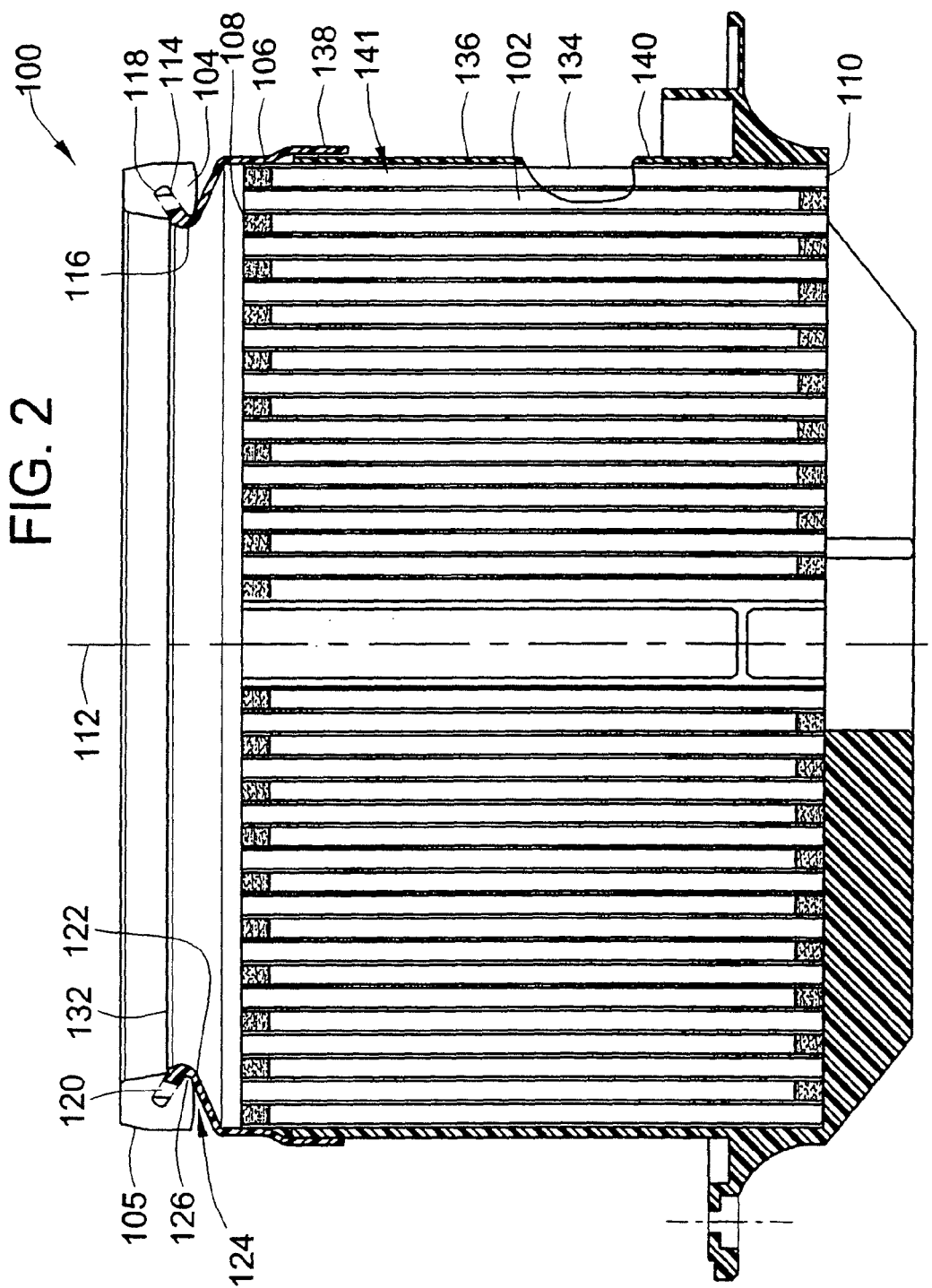

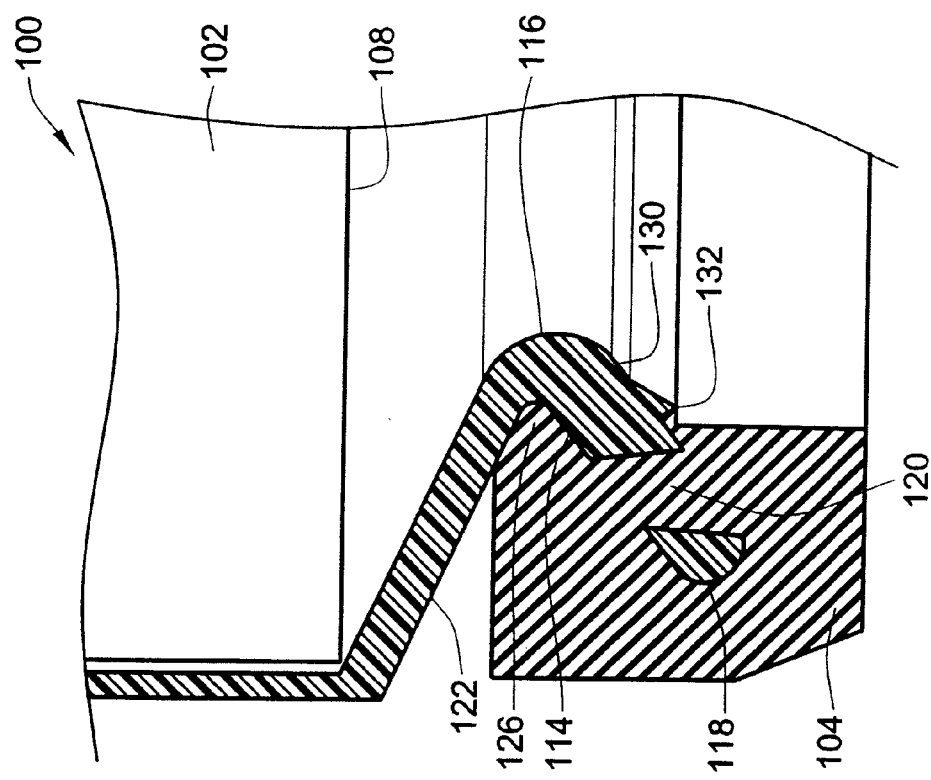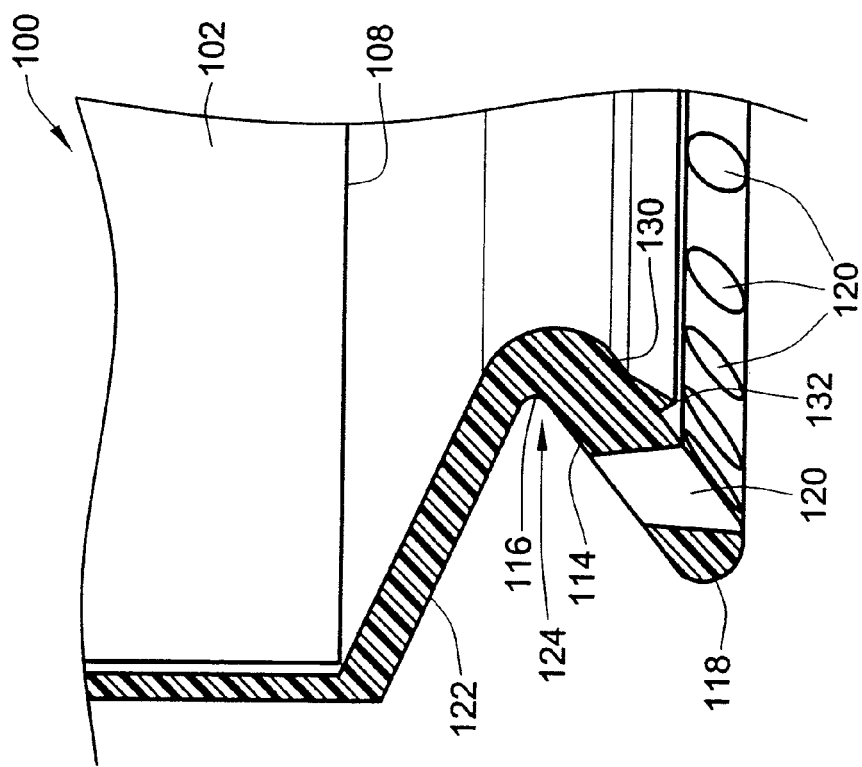

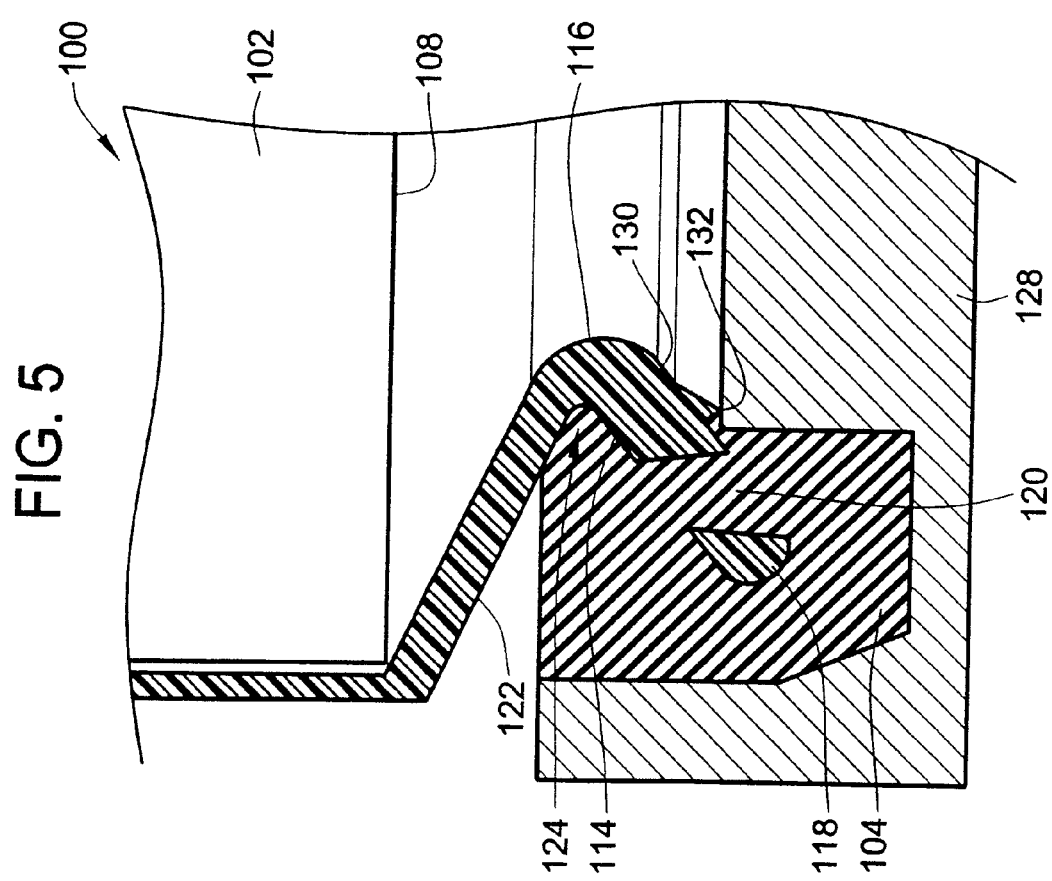

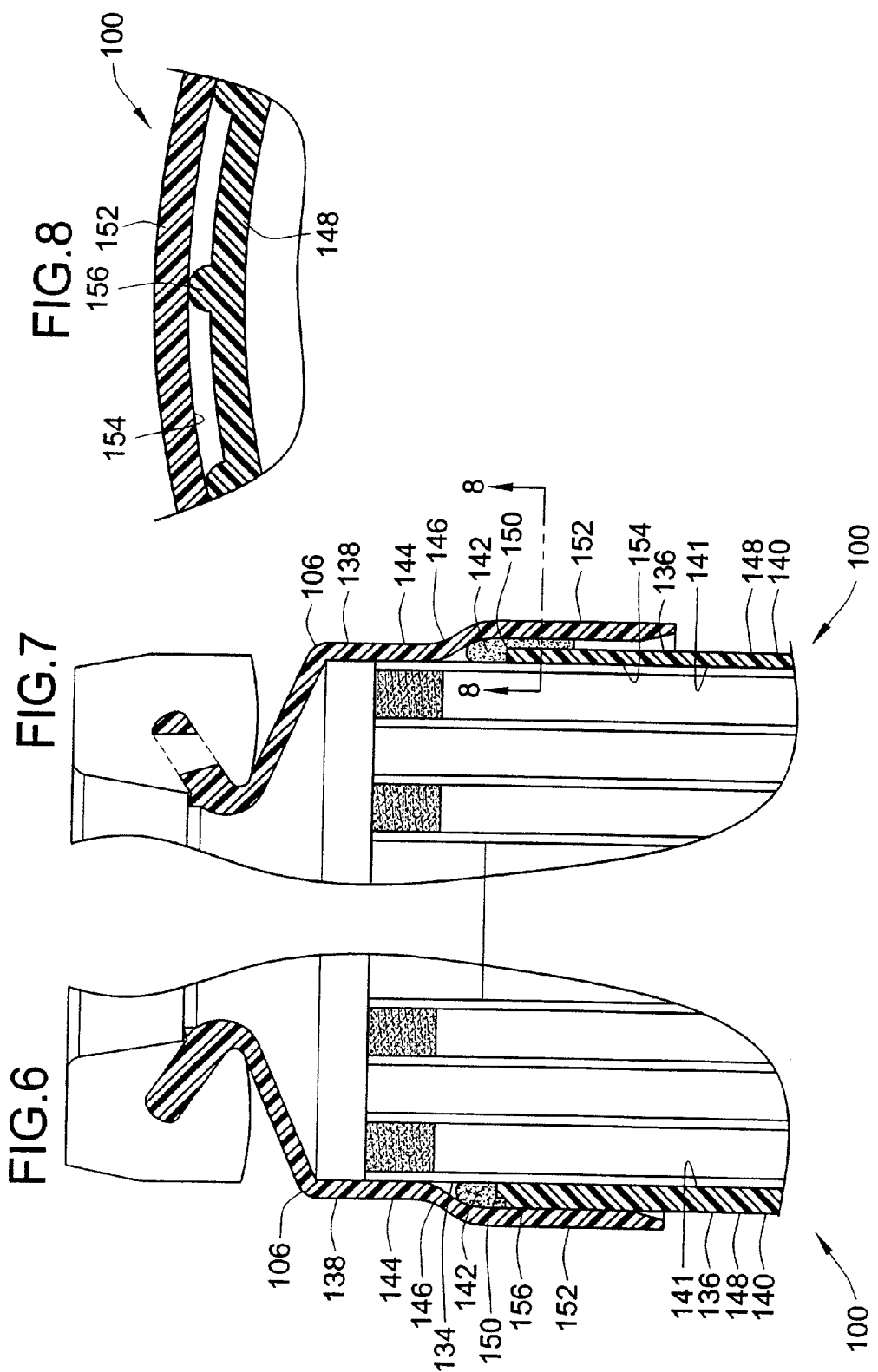

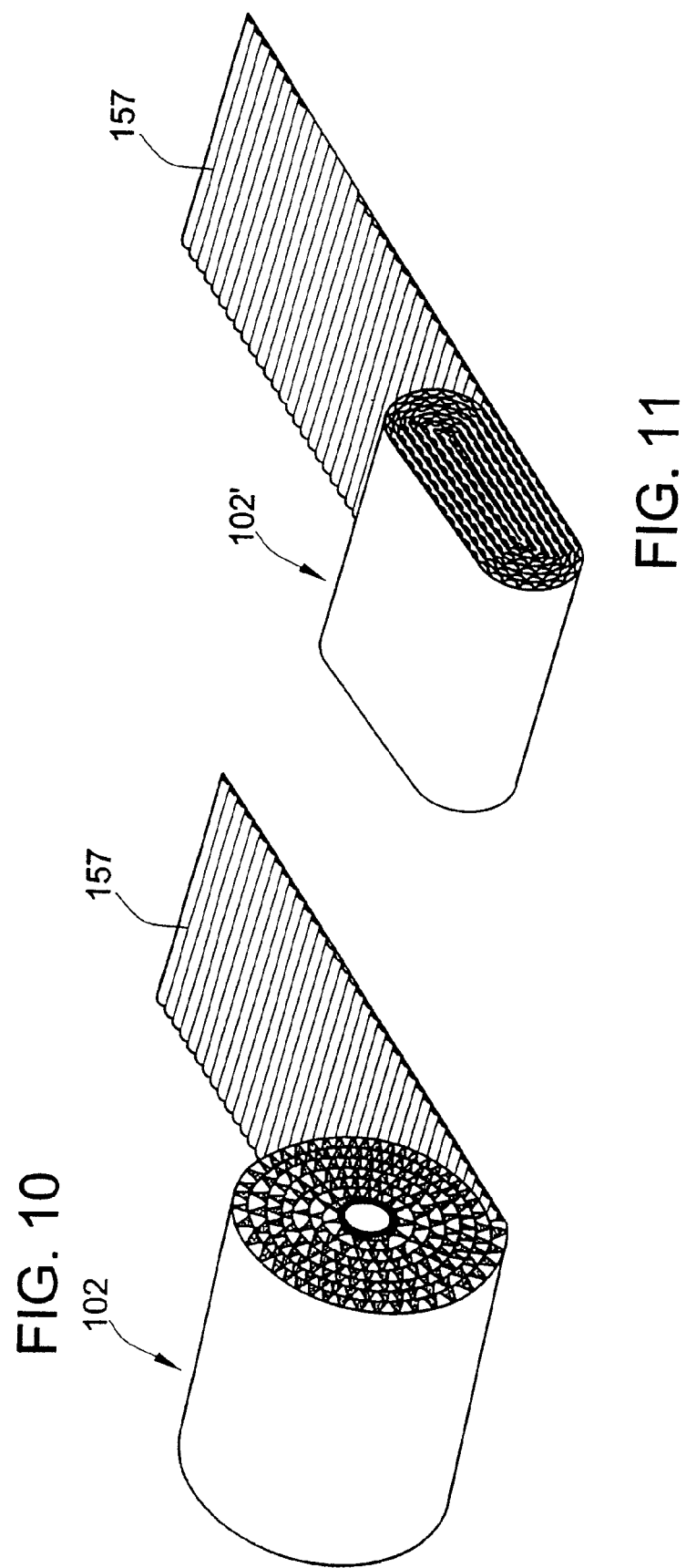

FILTER ELEMENT

CROSS-REFERENCE TO RELATED PATENT APPLICATIONS

This patent application is a continuation of co-pending U.S. patent application Ser. No. 11/939,662, filed Nov. 14, 2007, which published as U.S. Publication No. 2008/0060329, which is a continuation of U.S. patent application Ser. No. 10/979,876, filed Nov. 2, 2004, which was issued as U.S. Pat. No. 7,318,851, the entire disclosure of which is hereby incorporated by reference.

FIELD OF THE INVENTION

This invention relates to fluid filters, and more particularly to filters having a housing adapted for receiving a filter element including a seal member for sealing a juncture between the filter housing and the filter element when the filter element is installed in filter housing.

BACKGROUND OF THE INVENTION

Filters of the type used for filtering particulate matter from fluid sometimes include a filter housing having an inlet for receiving the fluid with entrained particulate matter, and an outlet for delivering the filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

In such filters, the particulate matter is typically removed by a filter element that is installed within the filter housing in such a manner that the fluid must flow through a filter element, including a filter pack of porous filter material, which removes the particulate matter from the fluid. Over time, the filter pack of the filter element becomes plugged or coated with particulate matter, necessitating removal and replacement of the filter element in order for the filter to continue in its function of supplying particulate-free fluid at the outlet of the housing.

In order to facilitate removal and replacement of the filter element, it is known to configure the filter housing to include a generally tubular wall section thereof, and provide a seal member mounted on the filter element that seals the juncture between an inner surface of the tubular wall section and the filter element, when the filter element is inserted into the housing, so that the fluid cannot bypass the filter element while flowing through the housing. Prior approaches to providing such sealing arrangement are disclosed in U.S. Pat. No. 6,190,432, to Gieske, et al., and in U.S. Pat. No. 6,517,598 B2, to Anderson, et al.

It is desirable to provide an improved filter element, and filter apparatus, having a filter element and sealing arrangement that are more robust than the arrangements used in prior filters. It is also desirable to provide such an improved filter element and filter apparatus in a form that can be manufactured in a more straight-forward and lower cost manner than prior filter elements and filter apparatuses.

BRIEF SUMMARY OF THE INVENTION

The invention provides an improved filter element and filter apparatus through use of a filter element that includes a filter pack, a seal member, and a seal support frame operatively connecting the seal member to the filter pack.

According to one aspect of the invention, the filter pack has first and second oppositely facing flow faces, and defines a longitudinal axis passing through the first and second flow faces. The seal support frame includes a canted annular extension thereof, for supporting the seal member. Having the seal support canted provides a more robust structure that is more inherently capable of withstanding radial and axial forces on the seal member during installation, removal, and operation of the filter element.

The canted annular extension projects from one of the first and second flow faces at an oblique angle to the longitudinal axis, and has a first end and a distal end thereof. The seal support frame further includes an inwardly canted intermediate annular segment that extends between the first end of the canted annular extension and the one of the first and second flow faces of the filter pack. The intersection of the first end of the canted annular extension and the inwardly canted intermediate annular section forms a V-shaped, outwardly opening, annular groove at the juncture of the canted annular extension and the inwardly canted intermediate annular segment.

According to another aspect of the invention, the filter pack has an outer periphery thereof joining first and second oppositely facing flow faces, and defining a longitudinal axis passing through the first and second flow faces. The seal support frame has an outer peripheral sidewall, adapted for circumscribing the outer periphery of the filter pack. The seal support frame may also have a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack. Having the filter pack disposed in the cavity of the seal support frame provides significant additional protection for the filter pack, during installation, removal, and operation of the filter element.

According to a further aspect of the invention, the outer peripheral sidewall may include a first and a second section thereof, with the first section extending from one of the first or second ends of the seal support frame and terminating in a distal end of the first section of the outer peripheral sidewall, and the second section thereof extending from the other of the first and second ends of the seal support frame and terminating in a distal end of the second section of the outer peripheral sidewall. The first and second sections of the outer peripheral sidewall are joined together by a hub extending from the distal end of one of the first or second sections of the outer peripheral sidewall, with the hub being adapted for receiving the distal end of the other of the first and second sections of the outer peripheral sidewall.

The distal ends of the first and second sections of the outer peripheral side wall may be joined and sealed to the outer periphery of the filter pack by a single bead of adhesive forming a common bond and seal between the distal ends of the first and second sections of the outer peripheral sidewall of the seal support frame and the outer periphery of the filter pack. Having the components of the filter element configured to allow use of a single adhesive bead for simultaneously joining the first and second sections of the outer sidewall of the seal support member to one another and to the outer periphery of the filter pack, according to the invention, significantly facilitates manufacture of the filter element by eliminating the need for applying multiple adhesive beads as is required in the manufacture of prior filter elements.

The invention may take the form of a filter apparatus including a housing and a filter element according to the invention. A filter element or filter apparatus, according to the invention, may include a filter pack having a plurality of flutes of porous filter media, and additional features for facilitating manufacture of a filter element or apparatus according to the invention. The invention may be practiced with efficacy in filters using elements formed in a variety of cross sectional shapes including circular, race-track-like, oblong or rectangular.

Other aspects, objectives and advantages of the invention will be apparent from the following detailed description and the accompanying drawings.

BRIEF DESCRIPTION OF THE DRAWINGS

FIG. 2 is an orthographic cross section of the exemplary embodiment of FIG. 1;

FIG. 3 is an orthographic partial cross section of an outwardly canted annular extension of a seal support frame of the exemplary embodiment of FIGS. 1 and 2, with a seal member not shown, for clarity of illustration;

FIG. 4 is an orthographic partial cross section of an outwardly canted annular extension of a seal support frame of the exemplary embodiment of FIGS. 1-3, that is identical to FIG. 3, but with the seal member shown;

FIG. 5 is a schematic cross section, similar to FIGS. 3 and 4, illustrating a method for molding the seal member onto the canted annular extension;

FIGS. 6 and 7 are orthographic cross sections taken respectively through, and between, raised locating ribs of the seal support frame;

FIG. 8 is a partial cross sectional view cutting transversely through one of the raised ribs of FIG. 7, along line 8-8 of FIG. 7;

FIGS. 10 and 11 are perspective illustrations of optional cross sectional shapes for a filter pack, according to the invention;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
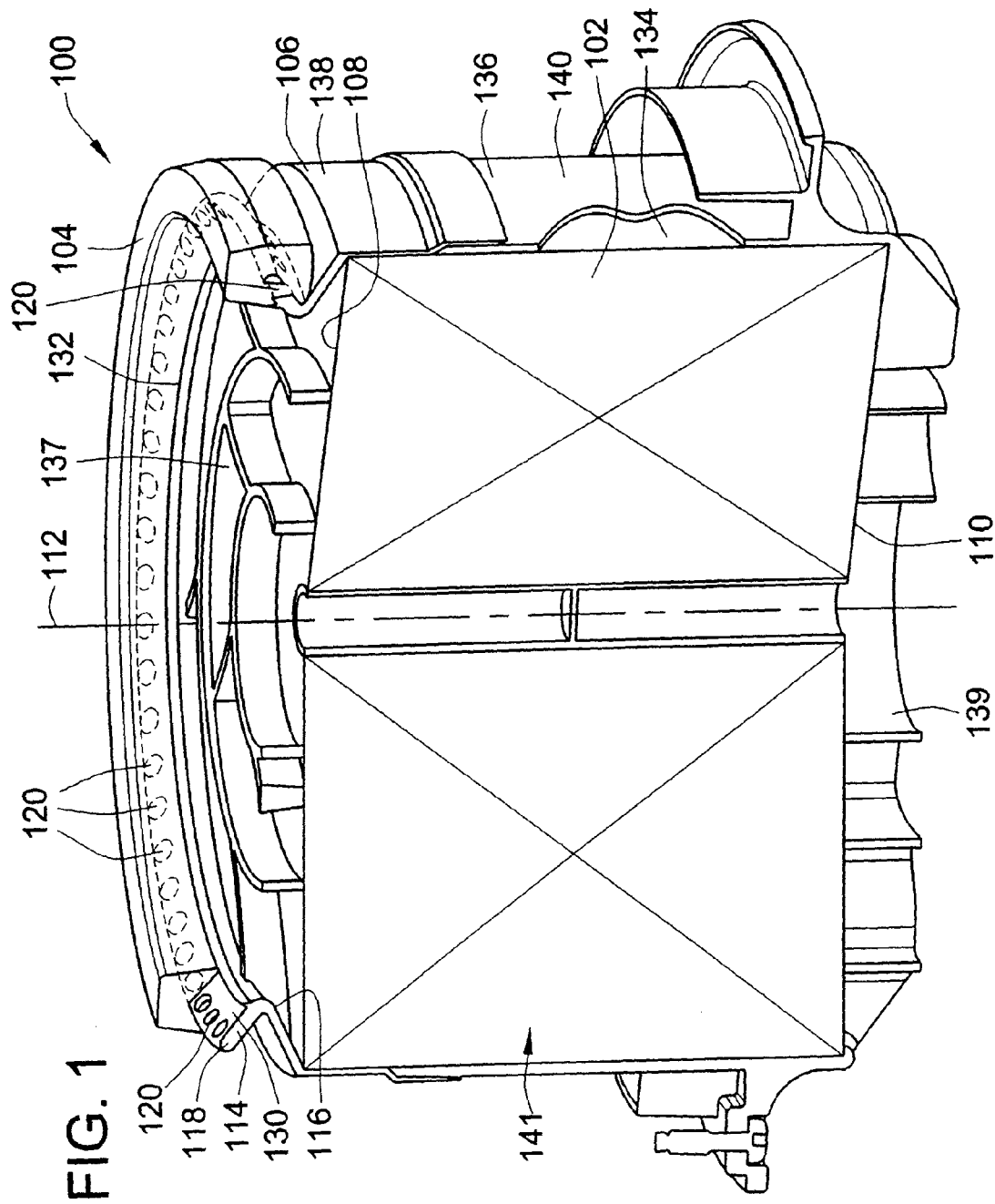
FIG. 1 is a perspective partial cross-sectional view of a first exemplary embodiment of the invention, in the form of a filter element, adapted for insertion into a filter housing, but not including the filter housing.

FIGS. 1 and 2 show a first exemplary embodiment of the invention in the form of a filter element 100, adapted for insertion into a filter housing, but not including the filter housing, for removing particulate matter from a flow of fluid passing through the filter housing. The term fluid as used herein is intended to include fluids in either liquid or gaseous forms. The exemplary embodiments shown herein specifically illustrate an air filter of the type used for filtering intake air for engines and air compressors.

The filter element 100 includes a filter pack 102, a seal member 104, and a seal support frame 106 operatively connecting the seal member 104 to the filter pack 102. The filter pack 102 includes first and second oppositely facing flow faces 108, 110, and defines a longitudinal axis 112 passing through the first and second flow faces 108, 110. The seal support frame 106 including a canted annular extension 114 thereof, projecting from the first flow face 108 at an oblique angle to the longitudinal axis 112, for supporting the seal member 104.

The term "oblique," is used herein in accordance with the common dictionary meaning of that word to indicate that the canted annular extension 114 extends at an angle, with respect to the longitudinal axis 112, which is neither parallel nor perpendicular to the longitudinal axis 112. The term "annular," is also used herein, according to its common dictionary definition, to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

In the filter element 100 of the first exemplary embodiment, the canted annular extension includes a first end 116 and a distal end 118 thereof, with the first end 116 of the canted annular extension 114 being disposed nearer than the distal end 118 thereof to both the longitudinal axis 112 and the first flow face 108 of the filter pack 102, such that the canted annular extension 114 is canted outward from the longitudinal axis 112.

The canted annular extension 114 includes a plurality of holes 120 extending therethrough, as best seen in FIG. 3, with the seal member 104 including a portion thereof extending through the holes 120 in the canted annular extension 114, as shown in FIG. 4, to help retain the seal member 104 on the canted annular extension 114. The seal support frame 106 of the filter element 100 also includes an inwardly canted intermediate annular segment 122 extending between the first end 116 of the canted annular extension 114 and the first flow face 108 of the filter pack 102, to thereby form a V-shaped, outwardly opening, annular groove 124 at the juncture of the canted annular extension 106 and the inwardly canted intermediate annular segment 122, for receipt therein of a portion 126 of the seal member 104.

As shown in FIG. 5, the seal member 104 in the filter element 100 is preferably formed from a material such as urethane foam, molded onto the canted annular extension 114 using a mold 128. During molding of the seal member 104, the filter element is placed into the mold 128 with the canted annular extension 114 facing downward, as shown in FIG. 5. A material used for forming the seal member 114 is placed in the mold 128 and allowed to foam and rise up around the canted annular extension 114, and through the holes 120 into the V-shaped groove 124 of the seal support frame 106. The canted annular extension 114 defines an inner surface 130 thereof, having a raised annular rib 132 extending therefrom for contacting and sealing against the mold 128, to thereby limit the extent of the seal member 104 along the inner surface 130 of the canted annular extension 114.

As shown in FIGS. 1 and 2, the filter pack 102 defines an outer periphery 134 thereof, and the seal support frame includes an outer peripheral sidewall 136 thereof adapted for circumscribing the outer periphery 134 of the filter pack 102. The seal support frame 106 includes a first end 138 thereof including the canted annular extension 114, and a second end 140 thereof, spaced from the first end thereof along the longitudinal axis 112. Each of the first and second ends 138, 140 of the seal support frame 106 include a skirt section thereof, which are joined together to form the outer peripheral sidewall 136 of the seal support frame 106, and to define a cavity 141 within the seal support frame 106 for receiving the filter pack 102. The first and second ends 138, 140 of the seal support frame are further configured such that, when the first and second ends 138, 140 of the seal support frame 106 are joined to one another, the filter pack 102 is retained within the cavity 141 of the seal support frame 106.

In the exemplary embodiment of the filter element 100, the first and second ends 138, 140 of the seal support frame 106 are joined to one another and sealed to the outer periphery 134 of the filter pack 106 by a single annular bead of adhesive 142, as best seen in FIGS. 6 and 7. The single annular bead of adhesive 142 performs the dual functions of simultaneously joining the first and second ends 138, 140 of the seal support frame 106 to the outer periphery 134 of the filter pack 106, and providing a seal blocking fluid flow between the outer periphery 134 of the filter pack 102 and an inner surface of the peripheral annular sidewall 136. In other embodiments of the invention, more than one bead of sealant may be used, or one or more non-continuous beads of sealant may be used. It is contemplated, however, that use of a single annular bead of adhesive 142 will generally be preferred, because the single annular bead 142 performing multiple functions will typically facilitate manufacture and reduce costs, in most embodiments of the invention.

By virtue of the construction of the seal support frame 106 of the filter 100, the outer peripheral sidewall 136 includes a first section 144 thereof extending from the first end 138 of the seal support frame 106, and terminating in a distal end 146 of the first section 144 of the outer peripheral sidewall 136. The outer peripheral sidewall 136 also includes a second section 148 thereof, that extends from the second end 140 of the seal support frame 106 and terminates in a distal end 150 of the second section 148 of the outer peripheral sidewall 106.

The first and second sections 144, 148 of the outer peripheral sidewall 136 are joined together with a joint formed by a hub 152 integrally formed with and extending from the distal end 146 of the first section 144 of the outer peripheral sidewall 136, with the hub 152 being adapted for receiving the distal end 150 of the second section 148 of the outer peripheral sidewall 136. The hub 152 is configured such that an inner surface 154 of the hub 152, is spaced from the distal end 150 of the second section 148 of the outer peripheral sidewall 136 to form a gap for receiving a portion of the bead of adhesive 142.

As shown by FIGS. 6-8, in the seal support frame 106 of the exemplary embodiment of the filter element 100, the second section 148 of the outer peripheral sidewall 136 includes a plurality of raised ribs 156 that extend outward from the second section 148 of the outer peripheral sidewall 136, adjacent the distal end 150 of the second section 148 of the outer peripheral sidewall 136, for spacing the inner surface 154 of the hub 152 from the distal end 150 of the second section 148 of the outer peripheral sidewall 136 of the seal support frame 106. The ribs 156 ensure that a gap of a predetermined size will be maintained between the inner surface 154 of the hub 152 and the distal end 150 of the second section 148 of the outer peripheral sidewall 136 to allow a portion of the bead of adhesive 142 to remain in the gap when the first and second ends 138, 140 of the seal support frame 106 are joined to one another and to the outer periphery 134 of the filter pack 102.

In the exemplary embodiment of the filter element 100, the ribs 156 also perform a second function, by being sized to provide a press fit of the distal end 150 of the second section 148 of the outer peripheral sidewall 136 into the hub 152. The press fit allows the seal support frame 106 to be self-fixturing, to that once the first and second ends 138, 140 of the seal support frame 106 are pressed together to a desired height, the press fit will hold the first and second ends 138, 140 together at the desired height while the adhesive 142 is curing. This allows the filter element 100 to be removed from any press equipment used for assembly, and set aside for curing of the adhesive, thereby freeing up the press equipment for use in assembling another filter element 100.

The hub 152, the distal end 150 of the second section 148 of the outer peripheral side wall 136, and the outer periphery 134 of the filter pack 102 are preferably joined to one another, after the filter pack 102 is inserted into the portion the cavity 141 formed by the first end 138 of the seal support frame 106, by placing a single bead of adhesive 142, of a judiciously selected size, at the juncture of the distal end 146 of the first section 144 of the peripheral sidewall 136 and the hub 152 and the outer periphery of the filter pack 102, prior to inserting the distal end 150 of the second section 148 of the peripheral sidewall 136 into the hub 152. After placement of the bead of adhesive 142 in the hub 152, the distal end 150 of the second section 148 of the peripheral sidewall 136 is then inserted into the hub 152, and pressure is applied to the second end 140 of the seal support frame 106 to urge it into contact with the second face 110 of the filter pack 102, and to push the distal end 150 of the second section 148 into the hub 152. As the distal end 150 of the second section of the peripheral sidewall 136 moves into the hub 152, the adhesive forming the single bead of adhesive 142 is squeezed into gaps between an inner surface 154 of the hub 152, that is spaced from the distal end 150 of the second section 148 of the outer peripheral sidewall 136 to form a space for receiving an adhesive sealant for joining together the distal ends of the first and second sections of the outer peripheral sidewall. Once the distal end 150 of the second section 148 of the peripheral sidewall 136 has been pressed far enough into the hub 152 to achieve a desired overall height of the filter element 100, the press fit features described above allow the filter element 100 to be self-fixturing while the adhesive 142 is curing.

The components of the filter element 100 need not, however, be assembled in the same order, or by the method described above, in practicing the invention. It will be understood, by those having skill in the art, that in other embodiments of the invention, other arrangements, sequences, or methods may be used for forming and/or joining together component parts of a seal support frame, according to the invention. In other embodiments of the invention, for example, it may be desirable to have a filter pack captured within a seal support frame, according to the invention, but to not have the outer periphery joined to the seal support frame by an adhesive. It will also be understood that, although the outer peripheral sidewall 136 of the seal support frame 106 of the exemplary embodiment the filter element 100 is imperforate, in other embodiments of the invention the outer peripheral sidewall may include one or more openings extending therethrough.

As shown in FIG. 1, the first and second ends 138, 140 of the seal support frame 106 of the exemplary embodiment of the filter element 100 also respectively include a first end flow face screen 137 and a second end flow face screen 139, that provide protection against physical damage for the first and second flow faces 108, 110 of the filter pack 102. The first and second flow face screens 137, 139 also serve to resist forces on the filter pack 102 that are exerted in a direction parallel to the longitudinal axis 112 by fluid flowing through the filter pack 102. In the exemplary embodiment of the filter element 100, the first and second flow face screens 137, 139 are formed integrally with the seal support frame 106. In other embodiments of the invention, however, such flow face screens may be separate components, attached to or held in place by the seal support frame, or may be eliminated.

Those having skill in the art will recognize that in embodiments of the invention having a canted annular extension, as described above, the canted extension provides a convoluted ring-like structure that is inherently stiff in the radial direction, for resisting compression forces imposed on the seal member when the filter element is inserted into a housing. As a result of this inherent stiffness, it is not necessary, in some embodiments of the invention, for the flow face screens 137, 139 to provide appreciable radial stiffening of the seal support.

Figure 9:
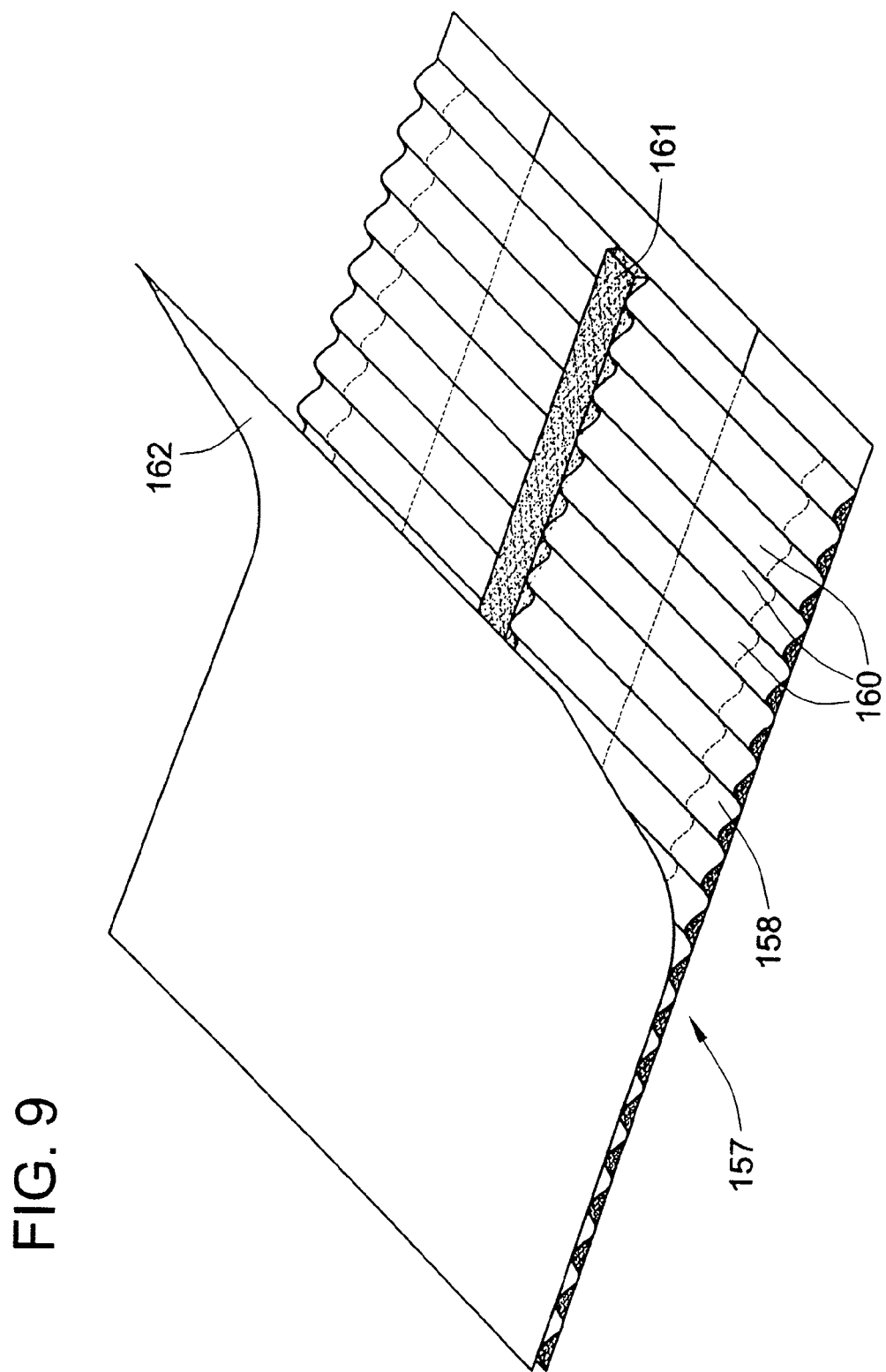
FIG. 9 is a perspective illustration of a fluted filter media, used in exemplary embodiments of the invention.

The filter pack 102 of the exemplary embodiment of the filter element 100 is formed from a filter media 157, as shown in FIG. 9, that includes a convoluted sheet 158 of porous filter material, for removing particulate matter from a fluid that is directed through the filter element 100. The convoluted sheet 158 may be formed by any appropriate process, such as corrugating or pleating, but preferably by gathering, as described in a United States patent application, entitled "Gathered Filter Media and Method of Making Same," bearing the attorney docket no. 502854, assigned to the Assignee of the present invention, filed concurrently herewith and incorporated herein by reference.

The convoluted sheet 158 of porous filter material, of the filter media 157, forms a plurality of contiguous adjacent convolutions 160, commonly known in the industry as flutes. Selected ends of the flutes 160 of the filter media 157 may be blocked, with a bead of adhesive for example, to cause fluid entering one end of some of the flutes 160 to flow through the porous filter media into other flutes 160 prior to exiting the filter media 157 at an opposite end of the flutes 160, in the manner known in the art. Selected flutes may also include an intermediate seal 161, as disclosed in a United States patent application, entitled "Fluted Filter Media with Intermediate Flow Restriction and Method of Making Same," bearing the attorney docket no. 502852, assigned to the Assignee of the present invention, filed concurrently herewith and incorporated herein by reference.

The fluted filter media 157 of the exemplary embodiment of the filter element 100 also includes a face sheet 162 attached to the convoluted sheet 158, for retaining the convoluted sheet 158 of porous filter material in a convoluted state. The term face sheet, as used herein, is intended to encompass any form of sheet or strip of generally flat, porous or non-porous, material attached to the convoluted sheet 158 of porous filter material. In the exemplary embodiment, it is contemplated that the face sheet 162 would preferably be formed of a porous filter material, in most embodiments of the invention.

As shown in FIG. 10, the filter pack 102 of the exemplary embodiment of the filter element 100 described above, is formed by coiling the filter media 157 to form a generally right-circular-cylinder-shaped structure, that is proportioned for insertion into a filter housing having a generally circular cross section. In other embodiments of the invention, however, a filter pack 102', and its associated filter element (not shown), may have a non-circular cross section, such as the race-track shaped filter shown in FIG. 11. Filter packs having other cross sectional shapes, such as square, rectangular, or polygonal, for example, may also be utilized, in other embodiments of the invention, by coiling or bonding together successive layers of a fluted filter media. It is also understood that the invention is not limited to filter packs of fluted filter media. Those having skill in the art will readily recognize that the invention may also be practiced with efficacy, using other types of filter media.

Figure 12:
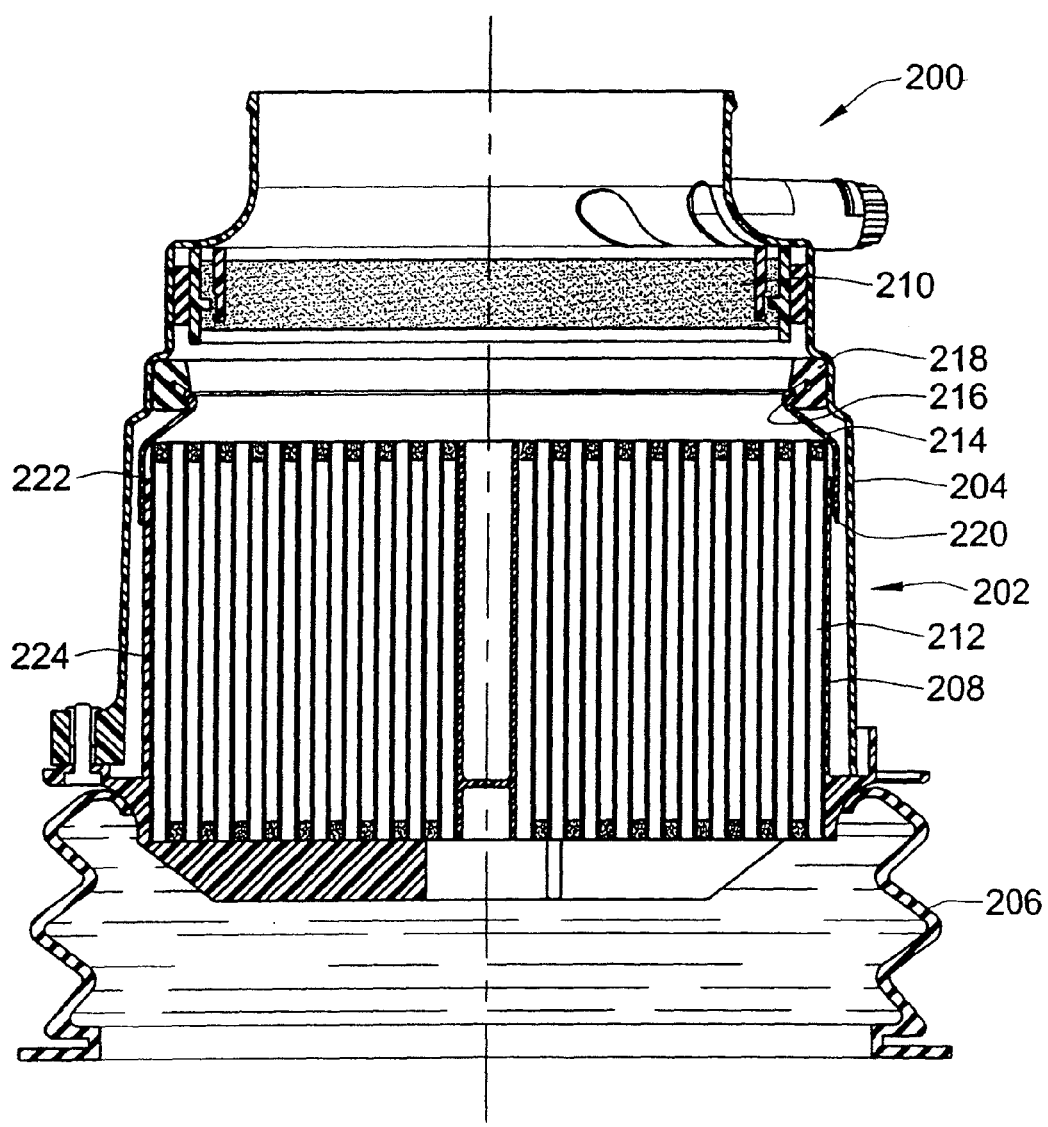
FIG. 12 is an orthographic cross section of a second exemplary embodiment of the invention, in the form of a filter apparatus including a filter housing and a filter element adapted for attachment to the filter housing.

FIG. 12 shows a second exemplary embodiment of the invention, in the form of a filter apparatus 200, having a filter housing assembly 202 including a filter housing 204 and a boot 206, adapted for attachment thereto of a filter element 208. The filter element 208 is of the cartridge type described herein. In contrast to the first exemplary embodiment of the invention, however, in which the filter apparatus included only the filter element 100, and not the filter assembly to which the filter element 100 is adapted to be attached, the second exemplary embodiment of the invention includes both the filter element 208 and the filter assembly 202 formed by the housing 204 and the boot 206. It should be further noted that the filter apparatus 200 of the second exemplary embodiment also includes a safety filter 210, mounted in the filter housing 204 at a point in the fluid flowpath downstream from the filter cartridge 208. Other embodiments of a filter apparatus, according to the invention, may include fewer or more components than the filter assembly 200 of the second exemplary embodiment.

The filter element 208 of the filter apparatus 200 is generally of the type described above in relation to the first exemplary embodiment. Specifically, the filter element 208 of the filter apparatus 200 includes a generally right-circular-cylinder shaped filter pack 212 of fluted filter media, and a seal support frame 214 having an outwardly canted annular extension 216 supporting a seal member 218 molded to the outwardly canted extension 216, in the same manner as described above in relation to the filter element 100 of the first exemplary embodiment. The seal support frame 214 of the filter element 208 of the filter apparatus 200 of the second exemplary embodiment is also a two part structure including a hub arrangement 220 for joining an upper frame section 222 and a lower frame section 224 (as oriented in FIG. 12) together and to the outer periphery of the filter pack with a single annular bead of adhesive (not shown) in the same manner as described above in relation to the first exemplary embodiment of the invention.

Figure 13:
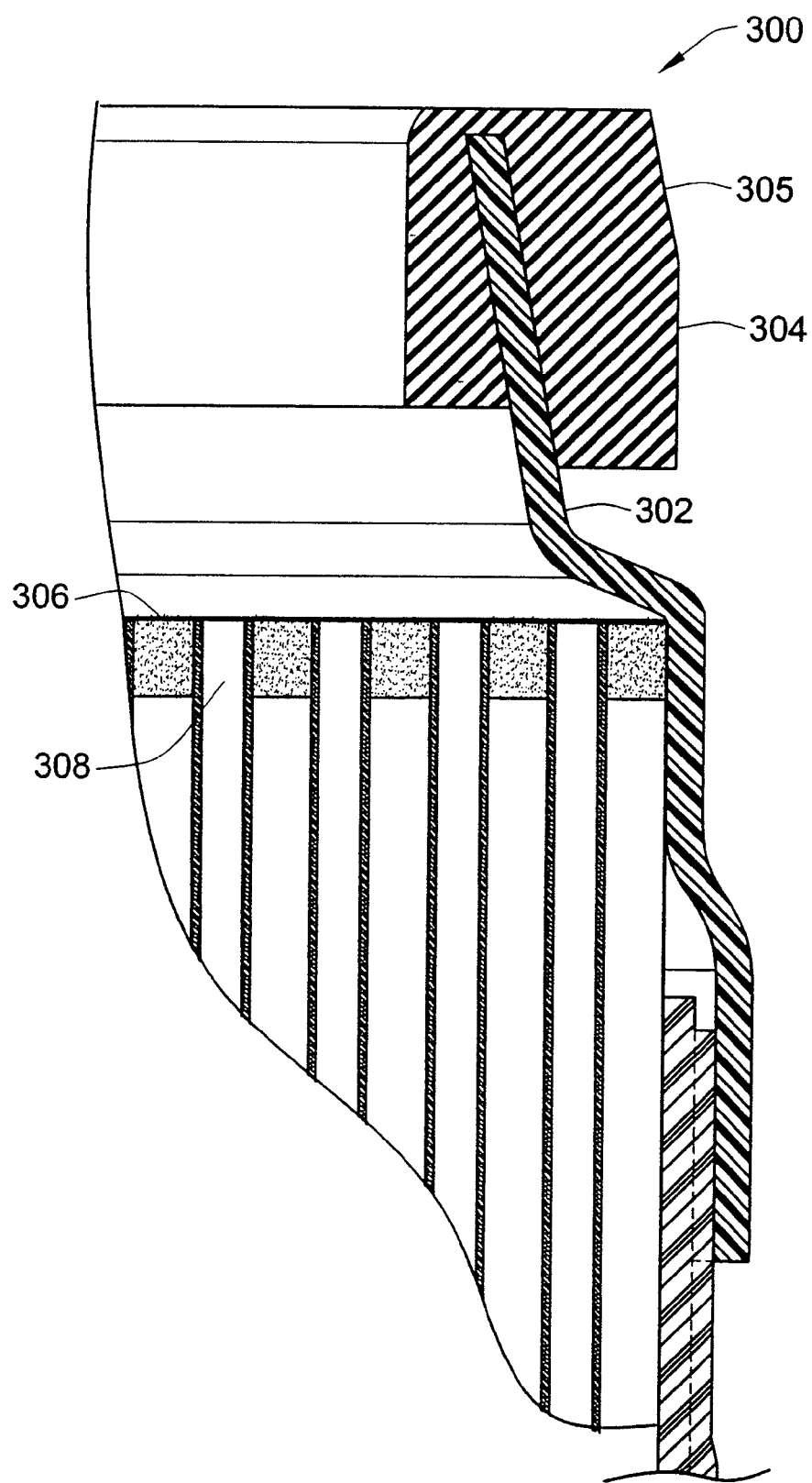
FIG. 13 is a partial orthographic cross section of an alternate embodiment of the invention, including an annular extension which is canted inward.

Those having skill in the art will recognize that, although invention has been described herein with reference to several exemplary embodiments, many other embodiments of the invention are possible. For example, as shown in FIG. 13, in other embodiments of invention, a filter element 300 may include an annular extension 302 that is canted inward, rather than being canted outward as shown and described in relation to the first and second exemplary embodiments of the invention described above. Such an inwardly canted annular extension may or may not include through holes for receiving and retaining a portion of a seal member 304 molded, in situ, onto the annular extension 302. Those having skill in the art will recognize that having the annular extension 302 canted inward results in the distal end of the annular extension 302 having a smaller periphery than the portion of the annular extension adjacent the flow face 306 of the filter pack 308. As a result of this construction, insertion and removal of the filter element 300 is facilitated by having the compressive forces on the seal 304 be generally proportional to the axial engagement length of the seal member 304 with an inside wall of a housing (not shown).

As shown in FIGS. 2 and 13, a seal member 104, 304 according to the invention may include a lead in chamfer 105, 305 to facilitate insertion of a filter element 100, 300, according to the invention, into a filter housing. It is also understood that, in an embodiment of the invention, the seal member may or may not be fixedly attached to the annular extension of a seal support frame according to the invention.

It is also contemplated that an embodiment of the invention including a seal support frame having an outer peripheral sidewall, adapted for circumscribing the outer periphery of the filter pack, a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack, may include an annular extension which is not canted either inward or outward.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
   a fluted filter media pack comprising a fluted sheet and a face sheet that are secured together and wound up, the fluted filter media pack having a plurality of flutes including a first set of flutes that are closed proximate a first flow face and a second set of flutes that are closed proximate a second flow face,
   a seal support disposed over the second flow face, the seal support including an annular extension having a distal end, and inner and outer surfaces defined on opposing sides of the distal end,
   an annular seal member molded around the annular extension to include portions along the inner surface and the outer surface, the portion of the annular seal member that is over the outer surface providing an annular sealing surface; and
   an annular rib integral with the seal support and projecting from the inner surface in a different direction than a direction of the annular extension, the annular rib disposed axially between the distal end and the second flow face.

2. The filter element of claim 1, wherein the annular seal member is molded of a foamed urethane material, the annular rib being continuous around the inner surface for preventing free rise of the foamed urethane material axially past the annular rib along the inner surface.

3. The filter element of claim 1, wherein the annular rib defines a smaller inner perimeter than an inner perimeter of the annular seal member.

4. The filter element of claim 1, wherein the annular rib has generally inclined surfaces that are inclined toward each other as the inclined surfaces project away from the inner surface.

5. The filter element of claim 4, wherein the annular rib has a generally triangular cross section.

6. The filter element of claim 1, further including a flow face screen integral with the seal support extending over the second flow face, the flow face screen disposed axially between the annular rib and the second flow face.

7. The filter element of claim 1, wherein the seal support further includes a canted annular segment joined to the annular extension at a corner and extending generally between the second flow face and the annular extension.

8. The filter element of claim 7, wherein the seal support further includes an annular sidewall joined to the canted annular segment, the annular sidewall extending around an outer periphery of the fluted filter media pack.

9. The filter element of claim 1, wherein the annular rib is arranged and positioned to contact a mold for the filter element.

10. The filter element of claim 1, wherein the seal support is arranged on an outlet side of the filter element.

11. A filter element and housing assembly, comprising:
    a housing having an annular sidewall with an interior surface;
    a filter element installed in the housing, the filter element including:
    a fluted filter media pack comprising a fluted sheet and a face sheet that are secured together and wound up, the fluted filter media pack having a plurality of flutes including a first set of flutes that are closed proximate a first flow face and a second set of flutes that are closed proximate a second flow face,
    a seal support disposed over the second flow face, the seal support including an annular extension having a distal end;
    an annular seal member molded around the annular extension providing an annular sealing surface radially sealing against and engaging the interior surface of the housing; and
    an annular rib integral with the seal support and projecting from the seal support on a side of the seal support opposite the side of the annular sealing surface, the annular rib disposed axially between the distal end and the second flow face.

12. The filter element of claim 11, wherein the annular seal member is molded of a foamed urethane material, the annular rib being continuous around an inner surface of the annular extension for preventing free rise of the foamed urethane material axially past the annular rib along the inner surface.

13. The filter element of claim 12, wherein the annular rib defines a smaller inner perimeter than an inner perimeter of the annular seal member.

14. The filter element of claim 13, wherein the annular rib is pointed in a direction that is different than an extending direction of the annular extension and wherein the annular rib has generally inclined surfaces that are inclined toward each other as the inclined surfaces project away from the inner surface.

15. The filter element of claim 14, wherein the annular rib has a generally triangular cross section.

16. A filter element, comprising:
   a fluted filter media pack comprising a fluted sheet and a face sheet that are secured together and wound up, the fluted filter media pack having a plurality of flutes including a first set of flutes that are closed proximate a first flow face and a second set of flutes that are closed proximate a second flow face,
   a seal support disposed over the second flow face, the seal support including an annular extension having a distal end, and inner and outer surfaces defined on opposing sides of the distal end,
   an annular seal member molded around the annular extension to include a portion over the outer surface providing an annular sealing surface; and
   an annular rib integral with the seal support, the annular rib disposed axially between the distal end and the second flow face and defining a smaller inner perimeter than an inner perimeter of the annular seal member.

17. The filter element of claim 16, wherein the annular seal member is molded of a foamed urethane material, the annular rib being continuous around the inner surface for preventing free rise of the foamed urethane material axially past the annular rib along the inner surface.

18. The filter element of claim 17, wherein the annular rib is pointed in a direction that is different than an extending direction of the annular extension and wherein the annular rib has generally inclined surfaces that are inclined toward each other as the inclined surfaces project away from the inner surface.

19. The filter element of claim 18, wherein the annular rib has a generally triangular cross section.

20. The filter element of claim 16, further including a flow face screen integral with the seal support extending over the second flow face, the flow face screen disposed axially between the annular rib and the second flow face, and wherein the seal support further includes a canted annular segment joined to the annular extension at a corner and extending generally between the second flow face and the annular extension, the flow face screen intersecting the canted annular segment.

* * * * *